US008526940B1

(12) United States Patent
Chowdhary et al.

(10) Patent No.: US 8,526,940 B1
(45) Date of Patent: Sep. 3, 2013

(54) CENTRALIZED RULES REPOSITORY FOR SMART PHONE CUSTOMER CARE

(75) Inventors: Yousuf Chowdhary, Maple (CA); Jeffrey Brunet, Toronto (CA); Ian Collins, Markham (CA)

(73) Assignee: Palm, Inc., Sunnyvale, CA (US)

( * ) Notice: Subject to any disclaimer, the term of this patent is extended or adjusted under 35 U.S.C. 154(b) by 1883 days.

(21) Appl. No.: 11/005,312

(22) Filed: Dec. 6, 2004

Related U.S. Application Data

(60) Provisional application No. 60/602,017, filed on Aug. 17, 2004.

(51) Int. Cl.
*H04W 24/00* (2009.01)

(52) U.S. Cl.
USPC .......................................... 455/425; 455/424

(58) Field of Classification Search
USPC .................. 455/423, 424, 425; 726/3; 707/6
See application file for complete search history.

(56) References Cited

U.S. PATENT DOCUMENTS

| | | |
|---|---|---|
| 4,337,376 A | 6/1982 | Gruenberg |
| 4,344,091 A | 8/1982 | Gardner et al. |
| 4,429,387 A | 1/1984 | Kaminski |
| 4,493,083 A | 1/1985 | Kinoshita |
| 4,645,916 A | 2/1987 | Raisleger |
| 4,783,841 A | 11/1988 | Crayson |
| 4,807,182 A | 2/1989 | Queen |
| 4,809,170 A | 2/1989 | Leblang et al. |
| 5,084,816 A | 1/1992 | Boese et al. |
| 5,155,847 A | 10/1992 | Kirouac et al. |
| 5,204,960 A | 4/1993 | Smith et al. |
| 5,261,055 A | 11/1993 | Moran et al. |
| 5,274,823 A | 12/1993 | Brenner et al. |
| 5,325,531 A | 6/1994 | McKeeman et al. |
| 5,333,320 A | 7/1994 | Seki |
| 5,392,353 A | 2/1995 | Morales |
| 5,394,534 A | 2/1995 | Kulakowski et al. |
| 5,410,703 A | 4/1995 | Nilsson et al. |
| 5,418,837 A | 5/1995 | Johansson et al. |
| 5,420,616 A | 5/1995 | Suemitsu et al. |
| 5,421,006 A | 5/1995 | Jablon et al. |
| 5,442,771 A | 8/1995 | Filepp et al. |

(Continued)

FOREIGN PATENT DOCUMENTS

| | | |
|---|---|---|
| CA | 2339923 | 3/2000 |
| CA | 2414281 | 5/2002 |

(Continued)

OTHER PUBLICATIONS

Bettini, L., "Software Update via Mobile Agent Based Programming," Proc. ACM SAC, Jan. 1, 2002, pp. 32-36.

(Continued)

*Primary Examiner* — Christopher M Brandt

(57) ABSTRACT

A telecommunications network includes a plurality of operators, each performing customer service activities. Each operator uses an analytics engine to apply troubleshooting rules to help diagnose customer problems. In addition to a local rules repository at each of the different operators, a centralized rules repository is used to collect domain knowledge of the different operators. Additionally, rules generated by software vendors and device manufacturers are also included in the centralized rules repository. By accessing this centralized rules repository, the local rules repositories can be updated with rules from these other sources, thereby increasing the rules available for each individual operator.

29 Claims, 6 Drawing Sheets

(56) References Cited

U.S. PATENT DOCUMENTS

| | | |
|---|---|---|
| 5,444,765 A | 8/1995 | Marui et al. |
| 5,450,589 A | 9/1995 | Maebayashi et al. |
| 5,455,576 A | 10/1995 | Clark, II et al. |
| 5,463,766 A | 10/1995 | Schieve et al. |
| 5,471,592 A | 11/1995 | Gove et al. |
| 5,479,637 A | 12/1995 | Lisimaque et al. |
| 5,479,654 A | 12/1995 | Squibb |
| 5,481,713 A | 1/1996 | Wetmore et al. |
| 5,491,807 A | 2/1996 | Freeman et al. |
| 5,491,821 A | 2/1996 | Kilis |
| 5,535,357 A | 7/1996 | Moran et al. |
| 5,537,483 A | 7/1996 | Stapleton et al. |
| 5,563,931 A | 10/1996 | Bishop et al. |
| 5,579,522 A | 11/1996 | Christeson et al. |
| 5,586,304 A | 12/1996 | Stupek, Jr. et al. |
| 5,586,328 A | 12/1996 | Caron et al. |
| 5,590,277 A | 12/1996 | Fuchs et al. |
| 5,594,903 A | 1/1997 | Bunnell et al. |
| 5,596,738 A | 1/1997 | Pope |
| 5,598,531 A | 1/1997 | Hill |
| 5,598,534 A | 1/1997 | Haas |
| 5,600,844 A | 2/1997 | Shaw et al. |
| 5,606,693 A | 2/1997 | Nilsen et al. |
| 5,608,910 A | 3/1997 | Shimakura |
| 5,623,604 A | 4/1997 | Russell et al. |
| 5,628,016 A | 5/1997 | Kukol |
| 5,638,066 A | 6/1997 | Horiuchi et al. |
| 5,649,112 A | 7/1997 | Yeager et al. |
| 5,649,200 A | 7/1997 | Leblang et al. |
| 5,666,293 A | 9/1997 | Metz et al. |
| 5,666,364 A | 9/1997 | Pierce et al. |
| 5,675,628 A | 10/1997 | Hokkanen |
| 5,677,708 A | 10/1997 | Matthews, III |
| 5,684,944 A | 11/1997 | Lubbers |
| 5,689,712 A | 11/1997 | Heisch |
| 5,694,538 A | 12/1997 | Okazaki et al. |
| 5,699,275 A | 12/1997 | Kennedy, III et al. |
| 5,699,548 A | 12/1997 | Choudhury et al. |
| 5,704,031 A | 12/1997 | Mikami et al. |
| 5,708,709 A | 1/1998 | Rose |
| 5,708,776 A | 1/1998 | Kikinis |
| 5,715,462 A | 2/1998 | Iwamoto et al. |
| 5,717,737 A | 2/1998 | Doviak et al. |
| 5,721,824 A | 2/1998 | Taylor |
| 5,724,526 A | 3/1998 | Kunita |
| 5,727,202 A | 3/1998 | Kucala |
| 5,729,472 A * | 3/1998 | Seiffert et al. .................. 702/188 |
| 5,729,735 A | 3/1998 | Meyering |
| 5,751,231 A | 5/1998 | Iverson |
| 5,752,039 A | 5/1998 | Tanimura |
| 5,752,042 A | 5/1998 | Cole et al. |
| 5,764,658 A | 6/1998 | Sekiguchi et al. |
| 5,765,211 A | 6/1998 | Luck |
| 5,768,382 A | 6/1998 | Schneier et al. |
| 5,774,715 A | 6/1998 | Madany et al. |
| 5,778,440 A | 7/1998 | Yiu et al. |
| 5,781,921 A | 7/1998 | Nichols |
| 5,790,800 A | 8/1998 | Gauvin et al. |
| 5,790,860 A | 8/1998 | Wetmore et al. |
| 5,790,974 A | 8/1998 | Tognazzini |
| 5,794,254 A | 8/1998 | McClain |
| 5,802,338 A | 9/1998 | Rechtschaffen et al. |
| 5,802,554 A | 9/1998 | Caceres et al. |
| 5,805,899 A | 9/1998 | Evans et al. |
| 5,809,251 A | 9/1998 | May et al. |
| 5,812,753 A | 9/1998 | Chiariotti |
| 5,812,768 A | 9/1998 | Page et al. |
| 5,815,722 A | 9/1998 | Kalwitz et al. |
| 5,822,578 A | 10/1998 | Frank et al. |
| 5,822,692 A | 10/1998 | Krishan et al. |
| 5,826,012 A | 10/1998 | Lettvin |
| 5,832,000 A | 11/1998 | Lin et al. |
| 5,832,520 A | 11/1998 | Miller |
| 5,835,777 A | 11/1998 | Staelin |
| 5,835,911 A | 11/1998 | Nakagawa et al. |
| 5,838,981 A | 11/1998 | Gotoh |
| 5,845,077 A | 12/1998 | Fawcett |
| 5,848,064 A | 12/1998 | Cowan |
| 5,864,681 A | 1/1999 | Proctor et al. |
| 5,875,404 A | 2/1999 | Messiet |
| 5,878,124 A | 3/1999 | Griesmer et al. |
| 5,878,256 A | 3/1999 | Bealkowski et al. |
| 5,881,292 A | 3/1999 | Sigal et al. |
| 5,887,253 A | 3/1999 | O'Neil et al. |
| 5,896,566 A | 4/1999 | Averbuch et al. |
| 5,901,310 A | 5/1999 | Rahman et al. |
| 5,901,330 A | 5/1999 | Sun et al. |
| 5,903,669 A | 5/1999 | Hirabayashi |
| 5,909,581 A | 6/1999 | Park |
| 5,913,021 A | 6/1999 | Masubuchi |
| 5,913,027 A | 6/1999 | Matsuda et al. |
| 5,919,247 A | 7/1999 | Van Hoff et al. |
| 5,930,504 A | 7/1999 | Gabel |
| 5,931,909 A | 8/1999 | Taylor |
| 5,933,498 A | 8/1999 | Schneck et al. |
| 5,933,604 A | 8/1999 | Inakoshi |
| 5,937,019 A | 8/1999 | Padovani |
| 5,943,406 A | 8/1999 | Leta et al. |
| 5,944,839 A | 8/1999 | Isenberg |
| 5,946,686 A | 8/1999 | Schmuck et al. |
| 5,950,199 A | 9/1999 | Schmuck et al. |
| 5,953,653 A | 9/1999 | Josenhans et al. |
| 5,954,817 A | 9/1999 | Janssen et al. |
| 5,960,189 A | 9/1999 | Stupek, Jr. et al. |
| 5,960,445 A | 9/1999 | Tamori et al. |
| 5,968,182 A | 10/1999 | Chen et al. |
| 5,973,626 A | 10/1999 | Berger et al. |
| 5,974,179 A | 10/1999 | Caklovic |
| 5,974,250 A | 10/1999 | Angelo et al. |
| 5,974,311 A | 10/1999 | Lipsit |
| 5,974,312 A | 10/1999 | Hayes, Jr. et al. |
| 5,974,454 A | 10/1999 | Apfel et al. |
| 5,974,574 A | 10/1999 | Lennie et al. |
| 5,983,289 A | 11/1999 | Ishikawa et al. |
| 5,987,325 A | 11/1999 | Tayloe |
| 5,987,477 A | 11/1999 | Schmuck et al. |
| 5,987,506 A | 11/1999 | Carter et al. |
| 5,999,740 A | 12/1999 | Rowley |
| 5,999,978 A | 12/1999 | Angal et al. |
| 6,006,034 A | 12/1999 | Heath et al. |
| 6,009,274 A | 12/1999 | Fletcher et al. |
| 6,009,497 A | 12/1999 | Wells et al. |
| 6,011,973 A | 1/2000 | Valentine et al. |
| 6,014,561 A | 1/2000 | Molne |
| 6,018,747 A | 1/2000 | Burns et al. |
| 6,021,275 A | 2/2000 | Horwat |
| 6,021,415 A | 2/2000 | Cannon et al. |
| 6,021,428 A | 2/2000 | Miloslavsky |
| 6,029,004 A | 2/2000 | Bortnikov et al. |
| 6,029,065 A | 2/2000 | Shah |
| 6,029,196 A | 2/2000 | Lenz |
| 6,031,830 A | 2/2000 | Cowan |
| 6,032,044 A | 2/2000 | Shannon et al. |
| 6,032,216 A | 2/2000 | Schmuck et al. |
| 6,038,636 A | 3/2000 | Brown, III et al. |
| 6,040,781 A | 3/2000 | Murray |
| 6,041,333 A | 3/2000 | Bretschneider et al. |
| 6,044,270 A | 3/2000 | Raith |
| 6,044,403 A | 3/2000 | Gerszberg |
| 6,047,071 A | 4/2000 | Shah |
| 6,047,242 A | 4/2000 | Benson |
| 6,047,279 A | 4/2000 | Barrack et al. |
| 6,052,531 A | 4/2000 | Waldin et al. |
| 6,052,600 A | 4/2000 | Fette et al. |
| 6,058,435 A | 5/2000 | Sassin et al. |
| 6,064,814 A | 5/2000 | Capriles et al. |
| 6,070,012 A | 5/2000 | Eitner et al. |
| 6,070,142 A | 5/2000 | McDonough et al. |
| 6,073,206 A | 6/2000 | Piwonka et al. |
| 6,073,214 A | 6/2000 | Fawcett |
| 6,077,315 A | 6/2000 | Greenbaum et al. |
| 6,080,207 A | 6/2000 | Kroening et al. |
| 6,081,518 A | 6/2000 | Bowman-Amuah |
| 6,081,731 A | 6/2000 | Boltz et al. |

| | | |
|---|---|---|
| 6,088,759 A | 7/2000 | Hasbun et al. |
| 6,097,942 A | 8/2000 | Laiho |
| 6,097,966 A | 8/2000 | Hanley |
| 6,104,506 A | 8/2000 | Hirokawa |
| 6,105,063 A | 8/2000 | Hayes, Jr. |
| 6,106,570 A | 8/2000 | Mizuhara |
| 6,112,024 A | 8/2000 | Almond et al. |
| 6,112,197 A | 8/2000 | Chatterjee et al. |
| 6,115,693 A | 9/2000 | McDonough et al. |
| 6,115,737 A | 9/2000 | Ely et al. |
| 6,117,187 A | 9/2000 | Staelin |
| 6,123,737 A | 9/2000 | Sadowsky |
| 6,126,327 A | 10/2000 | Bi et al. |
| 6,128,695 A | 10/2000 | Estakhri et al. |
| 6,128,713 A | 10/2000 | Eisler et al. |
| 6,131,096 A | 10/2000 | Ng et al. |
| 6,134,530 A | 10/2000 | Bunting et al. |
| 6,138,002 A | 10/2000 | Alperovich et al. |
| 6,138,239 A | 10/2000 | Veil |
| 6,138,249 A | 10/2000 | Nolet |
| 6,141,564 A | 10/2000 | Bruner et al. |
| 6,144,849 A | 11/2000 | Nodoushani et al. |
| 6,145,012 A | 11/2000 | Small |
| 6,148,192 A | 11/2000 | Ahvenainen |
| 6,148,441 A | 11/2000 | Woodward |
| 6,151,643 A | 11/2000 | Cheng et al. |
| 6,157,559 A | 12/2000 | Yoo |
| 6,163,274 A | 12/2000 | Lindgren |
| 6,167,567 A | 12/2000 | Chiles et al. |
| 6,178,452 B1 | 1/2001 | Miyamoyo |
| 6,189,096 B1 | 2/2001 | Haverty |
| 6,195,546 B1 | 2/2001 | Leung et al. |
| 6,195,946 B1 | 3/2001 | Lott et al. |
| 6,198,946 B1 | 3/2001 | Shin et al. |
| 6,199,203 B1 | 3/2001 | Saboff |
| 6,199,204 B1 | 3/2001 | Donohue |
| 6,202,207 B1 | 3/2001 | Donohue |
| 6,202,208 B1 | 3/2001 | Holiday |
| 6,209,111 B1 | 3/2001 | Kadyk et al. |
| 6,209,127 B1 | 3/2001 | Mori et al. |
| 6,212,281 B1 | 4/2001 | Vanstone |
| 6,212,489 B1 | 4/2001 | Klein et al. |
| 6,212,557 B1 | 4/2001 | Oran |
| 6,212,659 B1 | 4/2001 | Zehavi |
| 6,223,039 B1 | 4/2001 | Holm et al. |
| 6,223,301 B1 | 4/2001 | Santeler et al. |
| 6,223,343 B1 | 4/2001 | Hopwood et al. |
| 6,230,190 B1 | 5/2001 | Edmonds et al. |
| 6,230,319 B1 | 5/2001 | Britt, Jr. et al. |
| 6,233,332 B1 | 5/2001 | Anderson et al. |
| 6,247,168 B1 | 6/2001 | Green |
| 6,249,817 B1 | 6/2001 | Nakabayashi et al. |
| 6,256,497 B1 | 7/2001 | Chambers |
| 6,260,156 B1 | 7/2001 | Garvin et al. |
| 6,262,973 B1 | 7/2001 | Shiraishi et al. |
| 6,263,214 B1 | 7/2001 | Yazaki et al. |
| 6,266,513 B1 | 7/2001 | Briancon |
| 6,266,809 B1 | 7/2001 | Craig et al. |
| 6,272,333 B1 | 8/2001 | Smith |
| 6,272,545 B1 | 8/2001 | Flanagan et al. |
| 6,278,449 B1 | 8/2001 | Sugiarto et al. |
| 6,279,153 B1 | 8/2001 | Bi et al. |
| 6,282,709 B1 | 8/2001 | Reha et al. |
| 6,289,509 B1 | 9/2001 | Kryloff |
| 6,292,492 B1 | 9/2001 | Bonomi et al. |
| 6,292,934 B1 | 9/2001 | Davidson et al. |
| 6,301,710 B1 | 10/2001 | Fujiwara |
| 6,308,061 B1 | 10/2001 | Criss et al. |
| 6,311,322 B1 | 10/2001 | Ikeda et al. |
| 6,314,425 B1 | 11/2001 | Serbinis et al. |
| 6,317,872 B1 | 11/2001 | Gee et al. |
| 6,317,880 B1 | 11/2001 | Chamberlain et al. |
| 6,321,263 B1 | 11/2001 | Luzzi et al. |
| 6,321,348 B1 | 11/2001 | Kobata |
| 6,324,402 B1 | 11/2001 | Waugh et al. |
| 6,324,693 B1 | 11/2001 | Brodersen et al. |
| 6,333,980 B1 | 12/2001 | Hollatz et al. |
| 6,334,212 B1 | 12/2001 | Nakajma |
| 6,343,379 B1 | 1/2002 | Ozawa et al. |
| 6,345,288 B1 | 2/2002 | Reed et al. |
| 6,347,331 B1 | 2/2002 | Dutcher et al. |
| 6,349,205 B1 | 2/2002 | Fang et al. |
| 6,353,737 B1 | 3/2002 | Herzog |
| 6,357,021 B1 | 3/2002 | Kitagawa et al. |
| 6,360,362 B1 | 3/2002 | Fichtner et al. |
| 6,360,366 B1 | 3/2002 | Heath et al. |
| 6,363,524 B1 | 3/2002 | Loy |
| 6,366,584 B1 | 4/2002 | Gulliford et al. |
| 6,366,777 B1 | 4/2002 | Uusitalo |
| 6,367,072 B1 | 4/2002 | Justice et al. |
| 6,374,250 B2 | 4/2002 | Ajtai et al. |
| 6,381,456 B1 | 4/2002 | Ko |
| 6,381,740 B1 | 4/2002 | Miller et al. |
| 6,381,742 B2 | 4/2002 | Forbes et al. |
| 6,389,464 B1 | 5/2002 | Krishnamurthy et al. |
| 6,389,592 B1 | 5/2002 | Ayres et al. |
| 6,393,018 B2 | 5/2002 | Miloslavsky |
| 6,393,585 B1 | 5/2002 | Houha et al. |
| 6,397,385 B1 | 5/2002 | Kravitz |
| 6,400,965 B1 | 6/2002 | Phillips et al. |
| 6,405,364 B1 | 6/2002 | Bowman-Amuah |
| 6,408,175 B1 | 6/2002 | Park |
| 6,408,434 B1 | 6/2002 | Fujiwara |
| 6,412,079 B1 | 6/2002 | Edmonds et al. |
| 6,418,311 B1 | 7/2002 | Chmaytelli et al. |
| 6,421,325 B1 | 7/2002 | Kikinis |
| 6,421,776 B1 | 7/2002 | Hillis et al. |
| 6,424,966 B1 | 7/2002 | Meyerzon et al. |
| 6,425,125 B1 | 7/2002 | Fries et al. |
| 6,426,955 B1 | 7/2002 | Gossett-Dalton, Jr. et al. |
| 6,434,537 B1 | 8/2002 | Grimes |
| 6,434,695 B1 | 8/2002 | Esfahani et al. |
| 6,438,585 B2 | 8/2002 | Mousseau et al. |
| 6,442,358 B1 | 8/2002 | Regelsberger et al. |
| 6,442,660 B1 | 8/2002 | Henerlau et al. |
| 6,442,754 B1 | 8/2002 | Curtis |
| 6,445,914 B1 | 9/2002 | Findikli et al. |
| 6,446,206 B1 | 9/2002 | Feldbaum |
| 6,449,270 B1 | 9/2002 | Miloslavsky |
| 6,452,602 B1 | 9/2002 | Morein |
| 6,456,732 B1 | 9/2002 | Kimbell et al. |
| 6,456,843 B1 | 9/2002 | Daly |
| 6,457,175 B1 | 9/2002 | Lerche |
| 6,463,300 B1 | 10/2002 | Oshima |
| 6,466,999 B1 | 10/2002 | Sliger et al. |
| 6,467,087 B1 | 10/2002 | Yang |
| 6,477,531 B1 | 11/2002 | Sullivan et al. |
| 6,477,703 B1 | 11/2002 | Smith et al. |
| 6,487,403 B2 | 11/2002 | Carroll |
| 6,487,717 B1 | 11/2002 | Brunemann et al. |
| 6,487,723 B1 | 11/2002 | MacInnis |
| 6,493,871 B1 | 12/2002 | McGuire et al. |
| 6,496,875 B2 | 12/2002 | Cheng et al. |
| 6,496,979 B1 | 12/2002 | Chen et al. |
| 6,502,193 B1 | 12/2002 | Barber |
| 6,504,932 B1 | 1/2003 | Vasnier et al. |
| 6,505,228 B1 | 1/2003 | Schoening et al. |
| 6,512,919 B2 | 1/2003 | Ogasawara |
| 6,526,574 B1 | 2/2003 | Jones |
| 6,529,729 B1 | 3/2003 | Nodoushani et al. |
| 6,530,036 B1 | 3/2003 | Frey, Jr. |
| 6,535,894 B1 | 3/2003 | Schmidt et al. |
| 6,536,038 B1 | 3/2003 | Ewertz et al. |
| 6,542,504 B1 | 4/2003 | Mahler et al. |
| 6,542,906 B2 | 4/2003 | Korn |
| 6,546,243 B2 | 4/2003 | Tiedemann, Jr. et al. |
| 6,546,419 B1 | 4/2003 | Humpleman et al. |
| 6,546,492 B1 | 4/2003 | Walker et al. |
| 6,546,552 B1 | 4/2003 | Peleg |
| 6,549,770 B1 * | 4/2003 | Marran .................. 455/419 |
| 6,553,113 B1 | 4/2003 | Dhir et al. |
| 6,553,375 B1 | 4/2003 | Huang et al. |
| 6,553,490 B1 | 4/2003 | Kottapurath et al. |
| 6,556,842 B1 | 4/2003 | Ericsson |
| 6,564,055 B1 | 5/2003 | Hronek et al. |
| 6,564,369 B1 | 5/2003 | Hove et al. |
| 6,564,371 B1 | 5/2003 | Goldman et al. |
| 6,571,244 B1 | 5/2003 | Larson |

| | | |
|---|---|---|
| 6,574,657 B1 | 6/2003 | Dickenson |
| 6,577,229 B1 | 6/2003 | Bonneau et al. |
| 6,581,105 B2 | 6/2003 | Miloslavsky et al. |
| 6,587,684 B1 | 7/2003 | Hsu et al. |
| 6,587,685 B2 | 7/2003 | Mittal et al. |
| 6,591,095 B1 | 7/2003 | Palaniswamy et al. |
| 6,591,098 B1 | 7/2003 | Shieh et al. |
| 6,594,723 B1 | 7/2003 | Chapman et al. |
| 6,594,822 B1 | 7/2003 | Schweitz et al. |
| 6,595,856 B1 | 7/2003 | Ginsburg et al. |
| 6,601,153 B1 | 7/2003 | Engelbrecht et al. |
| 6,601,212 B1 | 7/2003 | Guha et al. |
| 6,603,854 B1 | 8/2003 | Judkins et al. |
| 6,603,968 B2 | 8/2003 | Anvekar et al. |
| 6,606,744 B1 | 8/2003 | Mikurak |
| 6,615,038 B1 | 9/2003 | Moles et al. |
| 6,615,240 B1 | 9/2003 | Sullivan et al. |
| 6,615,404 B1 | 9/2003 | Garfunkel et al. |
| 6,615,405 B1 | 9/2003 | Goldman et al. |
| 6,622,017 B1 | 9/2003 | Hoffman |
| 6,625,451 B1 | 9/2003 | La Medica et al. |
| 6,625,641 B1 | 9/2003 | Hare et al. |
| 6,636,958 B2 | 10/2003 | Abboud et al. |
| 6,640,334 B1 | 10/2003 | Rasmussen |
| 6,643,506 B1 | 11/2003 | Criss et al. |
| 6,643,697 B1 | 11/2003 | Eves |
| 6,647,260 B2 | 11/2003 | Dusse et al. |
| 6,647,480 B1 | 11/2003 | Bolan et al. |
| 6,651,249 B2 | 11/2003 | Waldin et al. |
| 6,658,090 B1 | 12/2003 | Harjunen et al. |
| 6,659,345 B2 | 12/2003 | Sukeda et al. |
| 6,665,376 B1 | 12/2003 | Brown |
| 6,665,861 B1 | 12/2003 | Francis et al. |
| 6,668,049 B1 | 12/2003 | Koch et al. |
| 6,668,336 B2 | 12/2003 | Lasser |
| 6,671,265 B1 | 12/2003 | Hwang et al. |
| 6,671,703 B2 | 12/2003 | Thompson et al. |
| 6,671,818 B1 | 12/2003 | Mikurak |
| 6,675,201 B1 | 1/2004 | Parkkinen |
| 6,675,382 B1 | 1/2004 | Foster |
| 6,683,993 B1 | 1/2004 | Mead |
| 6,684,396 B1 | 1/2004 | Brittain et al. |
| 6,687,341 B1 | 2/2004 | Koch et al. |
| 6,687,901 B1 | 2/2004 | Imamatsu |
| 6,690,390 B1 | 2/2004 | Walters et al. |
| 6,690,788 B1 | 2/2004 | Bauer et al. |
| 6,694,314 B1 | 2/2004 | Sullivan et al. |
| 6,694,336 B1 | 2/2004 | Multer et al. |
| 6,697,808 B1 | 2/2004 | Hurwood et al. |
| 6,697,969 B1 | 2/2004 | Merriam |
| 6,698,013 B1 | 2/2004 | Bertero et al. |
| 6,701,521 B1 | 3/2004 | McLlroy et al. |
| 6,704,303 B1 | 3/2004 | Bowman-Amuah |
| 6,704,864 B1 | 3/2004 | Philyaw |
| 6,711,520 B2 | 3/2004 | Arnaout et al. |
| 6,714,642 B2 | 3/2004 | Dhir et al. |
| 6,721,713 B1 | 4/2004 | Guheen et al. |
| 6,721,946 B1 | 4/2004 | Fogarty et al. |
| 6,725,048 B2 | 4/2004 | Mao et al. |
| 6,725,056 B1 | 4/2004 | Moles et al. |
| 6,725,268 B1 | 4/2004 | Jackel et al. |
| 6,725,392 B1 | 4/2004 | Frey et al. |
| 6,728,531 B1 | 4/2004 | Lee et al. |
| 6,728,950 B2 | 4/2004 | Davies et al. |
| 6,730,027 B2 | 5/2004 | Iliff |
| 6,731,932 B1 | 5/2004 | Rune et al. |
| 6,735,434 B2 | 5/2004 | Criss et al. |
| 6,738,803 B1 | 5/2004 | Dodrill et al. |
| 6,741,848 B2 | 5/2004 | Timonen et al. |
| 6,741,934 B2 | 5/2004 | Chen et al. |
| 6,741,980 B1 | 5/2004 | Langseth et al. |
| 6,742,025 B2 | 5/2004 | Jennery et al. |
| 6,748,209 B2 | 6/2004 | Lipsit |
| 6,754,181 B1 | 6/2004 | Elliott et al. |
| 6,754,714 B1 | 6/2004 | Chebrolu |
| 6,754,722 B2 | 6/2004 | Herzi |
| 6,754,723 B2 | 6/2004 | Kato |
| 6,754,894 B1 | 6/2004 | Costello et al. |
| 6,754,895 B1 | 6/2004 | Bartel et al. |
| 6,754,896 B2 | 6/2004 | Mishra et al. |
| 6,757,263 B1 | 6/2004 | Olds |
| 6,757,893 B1 | 6/2004 | Haikin |
| 6,760,730 B1 | 7/2004 | Kataoka |
| 6,760,908 B2 | 7/2004 | Ren |
| 6,763,104 B1 | 7/2004 | Judkins et al. |
| 6,763,403 B2 | 7/2004 | Cheng et al. |
| 6,772,338 B1 | 8/2004 | Hull |
| 6,775,267 B1 | 8/2004 | Kung et al. |
| 6,775,423 B2 | 8/2004 | Kulkarni et al. |
| 6,778,821 B1 * | 8/2004 | Shunk .......................... 455/419 |
| 6,779,177 B1 | 8/2004 | Bahrs et al. |
| 6,785,834 B2 | 8/2004 | Chefalas et al. |
| 6,789,110 B1 | 9/2004 | Short et al. |
| 6,789,158 B2 | 9/2004 | Takahashi |
| 6,789,215 B1 | 9/2004 | Rupp et al. |
| 6,789,255 B1 | 9/2004 | Pedrizetti et al. |
| 6,791,877 B2 | 9/2004 | Miura et al. |
| 6,798,876 B1 | 9/2004 | Bala |
| 6,799,155 B1 | 9/2004 | Lindemann et al. |
| 6,802,061 B1 | 10/2004 | Parthasarathy et al. |
| 6,807,558 B1 | 10/2004 | Hassett et al. |
| 6,807,574 B1 | 10/2004 | Partovi et al. |
| 6,813,571 B2 | 11/2004 | Lightbody et al. |
| 6,816,719 B1 | 11/2004 | Heinonen et al. |
| 6,820,214 B1 | 11/2004 | Cabrera et al. |
| 6,820,259 B1 | 11/2004 | Kawamata et al. |
| 6,823,432 B2 | 11/2004 | Chen et al. |
| 6,832,373 B2 | 12/2004 | O'Neill |
| 6,836,657 B2 | 12/2004 | Ji et al. |
| 6,836,859 B2 | 12/2004 | Berg et al. |
| 6,839,841 B1 | 1/2005 | Medvinsky et al. |
| 6,842,628 B1 | 1/2005 | Arnold et al. |
| 6,845,370 B2 | 1/2005 | Burkey et al. |
| 6,845,434 B2 | 1/2005 | Lin |
| 6,847,970 B2 | 1/2005 | Keller et al. |
| 6,850,533 B2 | 2/2005 | Gerszberg et al. |
| 6,850,614 B1 | 2/2005 | Collins |
| 6,856,676 B1 | 2/2005 | Pirot et al. |
| 6,865,387 B2 | 3/2005 | Bucknell et al. |
| 6,873,988 B2 | 3/2005 | Herrmann et al. |
| 6,879,685 B1 | 4/2005 | Peterson et al. |
| 6,880,051 B2 | 4/2005 | Timpanaro-Perrotta |
| 6,883,168 B1 | 4/2005 | James et al. |
| 6,885,862 B1 | 4/2005 | Pearson |
| 6,889,054 B2 | 5/2005 | Himmel et al. |
| 6,892,207 B2 | 5/2005 | McKay et al. |
| 6,895,387 B1 | 5/2005 | Roberts et al. |
| 6,904,405 B2 | 6/2005 | Suominen |
| 6,907,478 B2 | 6/2005 | Li et al. |
| 6,912,591 B2 | 6/2005 | Lash |
| 6,915,265 B1 | 7/2005 | Johnson |
| 6,915,325 B1 | 7/2005 | Lee et al. |
| 6,915,452 B2 | 7/2005 | Froehlich et al. |
| 6,918,112 B2 | 7/2005 | Bourke-Dunphy et al. |
| 6,922,722 B1 | 7/2005 | Mann et al. |
| 6,925,300 B2 | 8/2005 | Horne |
| 6,925,467 B2 | 8/2005 | Gu et al. |
| 6,928,108 B2 | 8/2005 | Nelson et al. |
| 6,928,468 B2 | 8/2005 | Leermakers |
| 6,934,028 B2 | 8/2005 | Ho et al. |
| 6,938,076 B2 | 8/2005 | Meyer et al. |
| 6,938,109 B1 | 8/2005 | Sliger et al. |
| 6,941,129 B2 | 9/2005 | Marce et al. |
| 6,941,136 B2 | 9/2005 | Study et al. |
| 6,941,453 B2 | 9/2005 | Rao |
| 6,944,621 B1 | 9/2005 | Collart |
| 6,948,099 B1 | 9/2005 | Tallam |
| 6,948,104 B2 | 9/2005 | Herley et al. |
| 6,950,660 B1 | 9/2005 | Hsu et al. |
| 6,952,823 B2 | 10/2005 | Kryloff et al. |
| 6,956,846 B2 | 10/2005 | Lewis et al. |
| 6,957,041 B2 | 10/2005 | Christensen et al. |
| 6,957,062 B2 | 10/2005 | Castrogiovanni et al. |
| 6,957,066 B1 | 10/2005 | Stammers et al. |
| 6,959,436 B2 | 10/2005 | Peng |
| 6,961,417 B2 | 11/2005 | Koch |
| 6,966,058 B2 | 11/2005 | Earl et al. |
| 6,968,179 B1 | 11/2005 | De Vries |

| Patent No. | Date | Inventor |
|---|---|---|
| 6,968,184 B2 | 11/2005 | Criss et al. |
| 6,968,543 B2 | 11/2005 | Takahara et al. |
| 6,970,181 B1 | 11/2005 | Fadel |
| 6,970,189 B1 | 11/2005 | Bernstein et al. |
| 6,970,917 B1 | 11/2005 | Kushwaha et al. |
| 6,976,058 B1 | 12/2005 | Brown et al. |
| 6,976,251 B2 | 12/2005 | Meyerson |
| 6,978,453 B2 | 12/2005 | Rao et al. |
| 6,979,253 B2 | 12/2005 | Thyssen |
| 6,981,020 B2 | 12/2005 | Miloslavsky et al. |
| 6,983,458 B1 | 1/2006 | Honda |
| 6,986,133 B2 | 1/2006 | O'Brien et al. |
| 6,988,182 B2 | 1/2006 | Teachman et al. |
| 6,990,656 B2 | 1/2006 | Ersek et al. |
| 6,990,659 B1 | 1/2006 | Imai |
| 6,990,660 B2 | 1/2006 | Moshir et al. |
| 6,996,603 B1 | 2/2006 | Srinivasan |
| 6,996,818 B2 | 2/2006 | Jacobi et al. |
| 6,999,976 B2 | 2/2006 | Abdallah et al. |
| 6,999,990 B1 | 2/2006 | Sullivan et al. |
| 7,002,919 B1 | 2/2006 | El-Sayed |
| 7,003,534 B2 | 2/2006 | Peng |
| 7,007,049 B2 | 2/2006 | Peng |
| 7,007,083 B1 | 2/2006 | Chesley |
| 7,010,303 B2 | 3/2006 | Lewis et al. |
| 7,024,187 B2 * | 4/2006 | Moles et al. ............. 455/423 |
| 7,024,557 B1 | 4/2006 | Moles et al. |
| 7,027,586 B2 | 4/2006 | Bushey et al. |
| 7,031,972 B2 | 4/2006 | Ren et al. |
| 7,032,033 B1 | 4/2006 | Ledoux et al. |
| 7,039,594 B1 | 5/2006 | Gersting |
| 7,039,796 B2 | 5/2006 | Ballard |
| 7,047,448 B2 | 5/2006 | Rao et al. |
| 7,050,566 B2 | 5/2006 | Becerra et al. |
| 7,055,098 B2 | 5/2006 | Hull et al. |
| 7,055,148 B2 | 5/2006 | Marsh et al. |
| 7,058,849 B2 | 6/2006 | Erstad |
| 7,058,860 B2 | 6/2006 | Miller et al. |
| 7,058,941 B1 | 6/2006 | Venkatesan |
| 7,058,978 B2 | 6/2006 | Feuerstein et al. |
| 7,061,891 B1 | 6/2006 | Kilfoyle et al. |
| 7,062,031 B2 | 6/2006 | Becerra et al. |
| 7,065,347 B1 | 6/2006 | Vikse et al. |
| 7,069,452 B1 | 6/2006 | Hind et al. |
| 7,069,545 B2 | 6/2006 | Wang et al. |
| 7,069,578 B1 | 6/2006 | Prus et al. |
| 7,073,017 B2 | 7/2006 | Yamamoto |
| 7,073,172 B2 | 7/2006 | Chamberlain |
| 7,076,051 B2 | 7/2006 | Brown et al. |
| 7,080,371 B1 | 7/2006 | Arnaiz et al. |
| 7,080,372 B1 | 7/2006 | Cole |
| 7,082,549 B2 | 7/2006 | Rao et al. |
| 7,086,049 B2 | 8/2006 | Goodman |
| 7,089,036 B2 | 8/2006 | Prise |
| 7,089,259 B1 | 8/2006 | Kouznetsov et al. |
| 7,089,549 B2 | 8/2006 | Venkiteswaran |
| 7,089,550 B2 | 8/2006 | Bakke et al. |
| 7,092,734 B2 | 8/2006 | Herle et al. |
| 7,093,244 B2 | 8/2006 | Lajoie et al. |
| 7,096,311 B2 | 8/2006 | Chiang |
| 7,099,896 B2 | 8/2006 | Fields et al. |
| 7,100,083 B2 | 8/2006 | Little et al. |
| 7,103,172 B2 | 9/2006 | Brown et al. |
| 7,103,779 B2 | 9/2006 | Kiehtreiber et al. |
| 7,106,843 B1 | 9/2006 | Gainsboro et al. |
| 7,107,329 B1 | 9/2006 | Schroder et al. |
| 7,110,525 B1 | 9/2006 | Heller et al. |
| 7,111,201 B2 | 9/2006 | Largman et al. |
| 7,111,292 B2 | 9/2006 | Bonnett et al. |
| 7,117,172 B1 | 10/2006 | Black |
| 7,117,195 B2 | 10/2006 | Chantrain et al. |
| 7,120,909 B1 | 10/2006 | Shibuya |
| 7,127,250 B2 | 10/2006 | Gallagher et al. |
| 7,130,807 B1 | 10/2006 | Mikurak |
| 7,130,896 B2 | 10/2006 | Engel et al. |
| 7,134,050 B2 | 11/2006 | Wenzel |
| 7,136,857 B2 | 11/2006 | Chen et al. |
| 7,137,034 B2 | 11/2006 | Largman et al. |
| 7,143,115 B2 | 11/2006 | Jones et al. |
| 7,143,153 B1 | 11/2006 | Black et al. |
| 7,143,405 B2 | 11/2006 | Liu et al. |
| 7,145,898 B1 | 12/2006 | Elliott |
| 7,146,002 B1 | 12/2006 | Smith et al. |
| 7,146,609 B2 | 12/2006 | Thurston et al. |
| 7,149,508 B2 | 12/2006 | Herle |
| 7,150,015 B2 | 12/2006 | Pace et al. |
| 7,165,109 B2 | 1/2007 | Chiloyan et al. |
| 7,165,173 B1 | 1/2007 | Herle |
| 7,171,660 B2 | 1/2007 | McCaleb et al. |
| 7,174,563 B1 * | 2/2007 | Brownlie et al. ............. 726/1 |
| 7,178,141 B2 | 2/2007 | Piazza |
| 7,181,731 B2 | 2/2007 | Pace et al. |
| 7,188,214 B1 | 3/2007 | Kasriel et al. |
| 7,194,728 B1 | 3/2007 | Sirota et al. |
| 7,200,390 B1 | 4/2007 | Henager et al. |
| 7,203,723 B2 | 4/2007 | Ogawa |
| 7,206,576 B2 | 4/2007 | Jain et al. |
| 7,210,010 B2 | 4/2007 | Ogle |
| 7,215,961 B2 | 5/2007 | Gallagher et al. |
| 7,216,343 B2 | 5/2007 | Das et al. |
| 7,222,340 B2 | 5/2007 | Willis, II |
| 7,230,951 B2 | 6/2007 | Mizell et al. |
| 7,231,411 B1 | 6/2007 | Lu |
| 7,240,102 B1 | 7/2007 | Kouznetsov et al. |
| 7,240,356 B2 | 7/2007 | Iki et al. |
| 7,242,929 B2 | 7/2007 | Draluk et al. |
| 7,247,671 B2 | 7/2007 | Overbeek et al. |
| 7,251,697 B2 | 7/2007 | Piotrowski |
| 7,263,379 B1 | 8/2007 | Parkulo et al. |
| 7,266,371 B1 | 9/2007 | Amin et al. |
| 7,269,821 B2 | 9/2007 | Sahinoja et al. |
| 7,272,711 B2 | 9/2007 | Suda et al. |
| 7,274,911 B2 | 9/2007 | Li |
| 7,275,243 B2 | 9/2007 | Gibbons et al. |
| 7,277,529 B1 | 10/2007 | Wuthnow et al. |
| 7,287,068 B1 | 10/2007 | Eriksson et al. |
| 7,292,846 B2 | 11/2007 | Mittal |
| 7,293,115 B2 | 11/2007 | DaCosta et al. |
| 7,310,720 B2 | 12/2007 | Cornett |
| 7,310,801 B2 | 12/2007 | Burkhardt et al. |
| 7,313,791 B1 | 12/2007 | Chen et al. |
| 7,324,514 B1 | 1/2008 | Haq et al. |
| 7,324,815 B2 | 1/2008 | Ross et al. |
| 7,325,233 B2 | 1/2008 | Kuck et al. |
| 7,346,683 B2 | 3/2008 | Inoue |
| 7,349,695 B2 | 3/2008 | Oommen et al. |
| 7,350,205 B2 | 3/2008 | Ji |
| 7,353,533 B2 | 4/2008 | Wright et al. |
| 7,367,027 B1 | 4/2008 | Chen et al. |
| 7,369,851 B2 | 5/2008 | Okonnen et al. |
| 7,373,109 B2 | 5/2008 | Pohja et al. |
| 7,376,711 B2 | 5/2008 | Du et al. |
| 7,376,944 B2 | 5/2008 | Crisan et al. |
| 7,405,537 B2 | 7/2008 | Hoffman et al. |
| 7,409,685 B2 | 8/2008 | Chen et al. |
| 7,415,706 B1 | 8/2008 | Raju et al. |
| 7,433,936 B2 | 10/2008 | Zhu et al. |
| 7,461,294 B2 | 12/2008 | Sano |
| 7,469,306 B2 | 12/2008 | Ng |
| 7,480,907 B1 | 1/2009 | Marolia et al. |
| 7,493,128 B2 | 2/2009 | Tang et al. |
| 7,500,143 B2 | 3/2009 | Buia et al. |
| 7,509,496 B2 | 3/2009 | Skog et al. |
| 7,509,652 B2 | 3/2009 | Niemi |
| 7,518,504 B2 | 4/2009 | Peeters |
| 7,523,155 B2 | 4/2009 | Hayes, Jr. |
| 7,526,563 B2 | 4/2009 | Ingimundarson et al. |
| 7,555,750 B1 | 6/2009 | Lilley |
| 7,577,722 B1 | 8/2009 | Khandekar et al. |
| 7,584,466 B1 | 9/2009 | Rao |
| 7,644,404 B2 | 1/2010 | Rao et al. |
| 7,657,884 B2 | 2/2010 | Okonnen et al. |
| 7,657,886 B1 | 2/2010 | Chen et al. |
| 7,664,923 B2 | 2/2010 | Kim et al. |
| 7,673,300 B2 | 3/2010 | Herle et al. |
| 7,673,325 B2 | 3/2010 | Vincent et al. |
| 7,680,828 B2 | 3/2010 | Gorelik |
| 7,689,981 B1 | 3/2010 | Gustafson |

| Patent/Pub No. | Date | Inventor |
|---|---|---|
| 7,698,698 B2 | 4/2010 | Skan |
| 7,707,570 B2 | 4/2010 | Yoshimura et al. |
| 7,711,782 B2 | 5/2010 | Kim et al. |
| 7,725,889 B2 | 5/2010 | Gustafson et al. |
| 7,739,679 B2 | 6/2010 | Qumei |
| 7,784,065 B2 | 8/2010 | Polivy et al. |
| 7,797,693 B1 | 9/2010 | Gustafson et al. |
| 7,797,695 B2 | 9/2010 | Motta |
| 7,810,088 B2 | 10/2010 | Herle et al. |
| 7,818,556 B2 | 10/2010 | Lima et al. |
| 7,823,148 B2 | 10/2010 | Deshpande et al. |
| 7,823,155 B2 | 10/2010 | Misra et al. |
| 7,844,964 B2 | 11/2010 | Marolia |
| 7,873,714 B2 | 1/2011 | Kaappa et al. |
| 7,889,869 B2 | 2/2011 | Ypya et al. |
| 8,063,929 B2 | 11/2011 | Kurtz et al. |
| 8,099,078 B2 | 1/2012 | Lazaridis |
| 2001/0008024 A1 | 7/2001 | Inaba |
| 2001/0018673 A1 | 8/2001 | Goldband et al. |
| 2001/0029178 A1 | 10/2001 | Criss et al. |
| 2001/0041556 A1 | 11/2001 | Laursen et al. |
| 2001/0042112 A1 | 11/2001 | Slivka et al. |
| 2001/0044934 A1 | 11/2001 | Hirai et al. |
| 2001/0047363 A1 | 11/2001 | Peng |
| 2001/0047441 A1 | 11/2001 | Robertson |
| 2001/0048728 A1 | 12/2001 | Peng |
| 2001/0049263 A1* | 12/2001 | Zhang .................. 455/67.1 |
| 2001/0052052 A1 | 12/2001 | Peng |
| 2001/0052066 A1 | 12/2001 | Lee et al. |
| 2001/0053688 A1 | 12/2001 | Rignell et al. |
| 2001/0055414 A1 | 12/2001 | Thieme |
| 2001/0056348 A1 | 12/2001 | Hyde-Thomson et al. |
| 2002/0010702 A1 | 1/2002 | Ajtai et al. |
| 2002/0013831 A1 | 1/2002 | Astala et al. |
| 2002/0023258 A1 | 2/2002 | Elwahab et al. |
| 2002/0028673 A1 | 3/2002 | Chang et al. |
| 2002/0030634 A1 | 3/2002 | Noda et al. |
| 2002/0039394 A1 | 4/2002 | Buchwald et al. |
| 2002/0046400 A1 | 4/2002 | Burch |
| 2002/0052938 A1 | 5/2002 | Kanemitsu |
| 2002/0053044 A1 | 5/2002 | Gold et al. |
| 2002/0059526 A1 | 5/2002 | Dillon et al. |
| 2002/0065950 A1 | 5/2002 | Katz et al. |
| 2002/0069259 A1 | 6/2002 | Kushwaha et al. |
| 2002/0072359 A1 | 6/2002 | Moles et al. |
| 2002/0073304 A1 | 6/2002 | Marsh et al. |
| 2002/0073309 A1 | 6/2002 | Kurn et al. |
| 2002/0075824 A1 | 6/2002 | Willekes et al. |
| 2002/0077094 A1 | 6/2002 | Leppanen |
| 2002/0078142 A1 | 6/2002 | Moore et al. |
| 2002/0078185 A1 | 6/2002 | Swerup et al. |
| 2002/0078209 A1 | 6/2002 | Peng |
| 2002/0085704 A1 | 7/2002 | Shires |
| 2002/0087668 A1 | 7/2002 | San Martin et al. |
| 2002/0090934 A1 | 7/2002 | Mitchelmore |
| 2002/0091568 A1 | 7/2002 | Kraft et al. |
| 2002/0091807 A1 | 7/2002 | Goodman |
| 2002/0091815 A1 | 7/2002 | Anderson et al. |
| 2002/0092008 A1 | 7/2002 | Kehne et al. |
| 2002/0092010 A1 | 7/2002 | Fiske |
| 2002/0092011 A1 | 7/2002 | Liu et al. |
| 2002/0095501 A1 | 7/2002 | Chiloyan et al. |
| 2002/0095615 A1 | 7/2002 | Hastings et al. |
| 2002/0099726 A1 | 7/2002 | Crudele et al. |
| 2002/0099950 A1 | 7/2002 | Smith |
| 2002/0100028 A1 | 7/2002 | Kosaka et al. |
| 2002/0100036 A1 | 7/2002 | Mishir et al. |
| 2002/0107795 A1 | 8/2002 | Minear et al. |
| 2002/0112046 A1 | 8/2002 | Kushwaha et al. |
| 2002/0112047 A1 | 8/2002 | Kushwaha et al. |
| 2002/0114384 A1 | 8/2002 | Nelson et al. |
| 2002/0116261 A1 | 8/2002 | Moskowitz et al. |
| 2002/0116665 A1 | 8/2002 | Pickover et al. |
| 2002/0120776 A1 | 8/2002 | Eggebraaten et al. |
| 2002/0120810 A1 | 8/2002 | Brouwer |
| 2002/0123335 A1 | 9/2002 | Luna et al. |
| 2002/0123359 A1 | 9/2002 | Wei et al. |
| 2002/0123934 A1 | 9/2002 | Tanaka et al. |
| 2002/0124007 A1 | 9/2002 | Zhao |
| 2002/0124209 A1 | 9/2002 | Faust et al. |
| 2002/0129355 A1 | 9/2002 | Velten et al. |
| 2002/0131404 A1 | 9/2002 | Mehta et al. |
| 2002/0138567 A1 | 9/2002 | Ogawa |
| 2002/0144005 A1 | 10/2002 | Mae et al. |
| 2002/0144254 A1 | 10/2002 | Owada |
| 2002/0152005 A1 | 10/2002 | Bagnordi |
| 2002/0156863 A1 | 10/2002 | Peng |
| 2002/0157089 A1 | 10/2002 | Patel |
| 2002/0157090 A1 | 10/2002 | Anton, Jr. |
| 2002/0159479 A1 | 10/2002 | Watanuki et al. |
| 2002/0161658 A1 | 10/2002 | Sussman |
| 2002/0162098 A1 | 10/2002 | Suzuki |
| 2002/0166001 A1 | 11/2002 | Cheng et al. |
| 2002/0166027 A1 | 11/2002 | Shirasawa et al. |
| 2002/0170052 A1 | 11/2002 | Radatti |
| 2002/0174338 A1 | 11/2002 | Tomita et al. |
| 2002/0174422 A1 | 11/2002 | Kelley et al. |
| 2002/0178241 A1 | 11/2002 | Eriksson |
| 2002/0184208 A1 | 12/2002 | Kato |
| 2002/0184619 A1 | 12/2002 | Meyerson |
| 2002/0188886 A1 | 12/2002 | Liu et al. |
| 2002/0193100 A1 | 12/2002 | Riffe et al. |
| 2002/0194532 A1 | 12/2002 | Nagasawa |
| 2002/0197991 A1 | 12/2002 | Anvekar et al. |
| 2002/0198971 A1 | 12/2002 | Resnick et al. |
| 2002/0198976 A1 | 12/2002 | Davenport |
| 2003/0005108 A1 | 1/2003 | Bartley et al. |
| 2003/0005362 A1 | 1/2003 | Miller et al. |
| 2003/0005426 A1 | 1/2003 | Scholtens et al. |
| 2003/0009752 A1 | 1/2003 | Gupta |
| 2003/0013434 A1 | 1/2003 | Rosenberg et al. |
| 2003/0018524 A1 | 1/2003 | Fishman et al. |
| 2003/0018764 A1 | 1/2003 | Shell et al. |
| 2003/0018810 A1 | 1/2003 | Karagiannis et al. |
| 2003/0018889 A1 | 1/2003 | Burnett et al. |
| 2003/0022657 A1 | 1/2003 | Herschberg et al. |
| 2003/0022661 A1* | 1/2003 | Guterman .................. 455/418 |
| 2003/0022663 A1 | 1/2003 | Rajaram et al. |
| 2003/0023573 A1 | 1/2003 | Chan et al. |
| 2003/0023849 A1 | 1/2003 | Martin, Jr. |
| 2003/0023964 A1 | 1/2003 | Rajaram et al. |
| 2003/0027563 A1 | 2/2003 | Herle et al. |
| 2003/0027581 A1 | 2/2003 | Jokinen et al. |
| 2003/0031306 A1 | 2/2003 | Pedersen et al. |
| 2003/0033358 A1 | 2/2003 | Tran et al. |
| 2003/0033525 A1 | 2/2003 | Rajaram |
| 2003/0033599 A1 | 2/2003 | Rajaram et al. |
| 2003/0036919 A1 | 2/2003 | Felt et al. |
| 2003/0037075 A1 | 2/2003 | Hannigan et al. |
| 2003/0041125 A1 | 2/2003 | Salomon |
| 2003/0041127 A1 | 2/2003 | Turnbull |
| 2003/0043180 A1 | 3/2003 | Gusler et al. |
| 2003/0044086 A1 | 3/2003 | Jia et al. |
| 2003/0046485 A1 | 3/2003 | Zitlaw |
| 2003/0046524 A1 | 3/2003 | Zimmer et al. |
| 2003/0046680 A1 | 3/2003 | Gentry |
| 2003/0054811 A1 | 3/2003 | Han et al. |
| 2003/0055919 A1 | 3/2003 | Fong et al. |
| 2003/0055931 A1 | 3/2003 | Cravo De Almeida et al. |
| 2003/0061323 A1 | 3/2003 | East et al. |
| 2003/0061384 A1 | 3/2003 | Nakatani |
| 2003/0065738 A1 | 4/2003 | Yang et al. |
| 2003/0066062 A1 | 4/2003 | Brannock et al. |
| 2003/0068162 A1 | 4/2003 | Tsai et al. |
| 2003/0074658 A1 | 4/2003 | Kim |
| 2003/0074672 A1 | 4/2003 | Daniels |
| 2003/0081557 A1 | 5/2003 | Mettala et al. |
| 2003/0081786 A1 | 5/2003 | Nakano et al. |
| 2003/0084138 A1 | 5/2003 | Tavis et al. |
| 2003/0084177 A1 | 5/2003 | Mulligan |
| 2003/0084283 A1 | 5/2003 | Pixton |
| 2003/0084434 A1 | 5/2003 | Ren et al. |
| 2003/0084435 A1 | 5/2003 | Messer et al. |
| 2003/0088868 A1 | 5/2003 | Chang et al. |
| 2003/0092438 A1 | 5/2003 | Moore et al. |
| 2003/0093545 A1 | 5/2003 | Liu et al. |
| 2003/0095648 A1 | 5/2003 | Kaib et al. |
| 2003/0097431 A1 | 5/2003 | Dill |

| | | |
|---|---|---|
| 2003/0100303 A1 | 5/2003 | Armbruster et al. |
| 2003/0101246 A1 | 5/2003 | Lahti |
| 2003/0101446 A1 | 5/2003 | McManus et al. |
| 2003/0103484 A1 | 6/2003 | Oommen et al. |
| 2003/0110412 A1 | 6/2003 | Neville |
| 2003/0112752 A1 | 6/2003 | Irifune et al. |
| 2003/0117956 A1 | 6/2003 | Lee |
| 2003/0121032 A1 | 6/2003 | Cho et al. |
| 2003/0131087 A1 | 7/2003 | Shippy et al. |
| 2003/0131226 A1 | 7/2003 | Spencer et al. |
| 2003/0133552 A1 | 7/2003 | Pillai et al. |
| 2003/0143991 A1 | 7/2003 | Minear et al. |
| 2003/0149735 A1 | 8/2003 | Stark et al. |
| 2003/0154471 A1 | 8/2003 | Teachman et al. |
| 2003/0156719 A1 | 8/2003 | Cronce |
| 2003/0158973 A1 | 8/2003 | Tsukada |
| 2003/0162533 A1 | 8/2003 | Moles et al. |
| 2003/0163508 A1 | 8/2003 | Goodman |
| 2003/0163551 A1 | 8/2003 | Riordan |
| 2003/0163805 A1 | 8/2003 | Hata et al. |
| 2003/0172094 A1 | 9/2003 | Lauria et al. |
| 2003/0172138 A1 | 9/2003 | McCormack et al. |
| 2003/0172175 A1 | 9/2003 | McCormack et al. |
| 2003/0177255 A1 | 9/2003 | Yun |
| 2003/0177485 A1 | 9/2003 | Waldin et al. |
| 2003/0182414 A1 | 9/2003 | O'Neill |
| 2003/0186689 A1 | 10/2003 | Herle et al. |
| 2003/0186695 A1 | 10/2003 | Bridges et al. |
| 2003/0186722 A1 | 10/2003 | Weiner |
| 2003/0188120 A1 | 10/2003 | Maeda |
| 2003/0188156 A1 | 10/2003 | Yasala et al. |
| 2003/0191955 A1 | 10/2003 | Wagner et al. |
| 2003/0194033 A1 | 10/2003 | Tiedemann et al. |
| 2003/0195110 A1 | 10/2003 | Moody et al. |
| 2003/0195753 A1 | 10/2003 | Homuth |
| 2003/0195951 A1 | 10/2003 | Wittel et al. |
| 2003/0196110 A1 | 10/2003 | Lampson et al. |
| 2003/0198282 A1 | 10/2003 | Tujkovic et al. |
| 2003/0204640 A1 | 10/2003 | Sahinoja et al. |
| 2003/0212742 A1 | 11/2003 | Hochmuth et al. |
| 2003/0214919 A1 | 11/2003 | Kilfoyle et al. |
| 2003/0217193 A1 | 11/2003 | Thurston et al. |
| 2003/0217358 A1 | 11/2003 | Thurston et al. |
| 2003/0221190 A1 | 11/2003 | Deshpande et al. |
| 2003/0224761 A1 | 12/2003 | Goto |
| 2003/0226030 A1 | 12/2003 | Hurst et al. |
| 2003/0226137 A1 | 12/2003 | Nagao |
| 2003/0233649 A1 | 12/2003 | Reimert |
| 2004/0002943 A1 | 1/2004 | Merrill et al. |
| 2004/0003266 A1 | 1/2004 | Moshir et al. |
| 2004/0005906 A1 | 1/2004 | Okumura et al. |
| 2004/0006723 A1 | 1/2004 | Erstad |
| 2004/0006760 A1 | 1/2004 | Gove et al. |
| 2004/0008113 A1 | 1/2004 | Pradhan et al. |
| 2004/0015857 A1 | 1/2004 | Cornelius et al. |
| 2004/0015940 A1 | 1/2004 | Heisey et al. |
| 2004/0015952 A1 | 1/2004 | Lajoie et al. |
| 2004/0017831 A1 | 1/2004 | Shen et al. |
| 2004/0018831 A1 | 1/2004 | Majmundar et al. |
| 2004/0026008 A1 | 2/2004 | Delisle |
| 2004/0031027 A1 | 2/2004 | Hiltgen |
| 2004/0031029 A1 | 2/2004 | Lee et al. |
| 2004/0031031 A1 | 2/2004 | Rudelic |
| 2004/0034765 A1 | 2/2004 | James |
| 2004/0034850 A1 | 2/2004 | Burkhardt et al. |
| 2004/0034853 A1 | 2/2004 | Gibbons et al. |
| 2004/0038692 A1 | 2/2004 | Muzaffar |
| 2004/0039801 A9 | 2/2004 | Srinivasan et al. |
| 2004/0040020 A1 | 2/2004 | Yang |
| 2004/0041800 A1 | 3/2004 | Daniels |
| 2004/0043788 A1 | 3/2004 | Mittal |
| 2004/0049394 A1 | 3/2004 | Burger et al. |
| 2004/0049609 A1 | 3/2004 | Simonson et al. |
| 2004/0054764 A1 | 3/2004 | Aderton et al. |
| 2004/0054995 A1 | 3/2004 | Lee |
| 2004/0058651 A1 | 3/2004 | Ross et al. |
| 2004/0058652 A1* | 3/2004 | McGregor et al. ......... 455/67.13 |
| 2004/0059725 A1 | 3/2004 | Sharangpani et al. |
| 2004/0062130 A1 | 4/2004 | Chiang |
| 2004/0068363 A1 | 4/2004 | Goto |
| 2004/0068721 A1 | 4/2004 | O'Neill et al. |
| 2004/0068724 A1 | 4/2004 | Gardner et al. |
| 2004/0072578 A1 | 4/2004 | Keutmann et al. |
| 2004/0073901 A1 | 4/2004 | Imamatsu |
| 2004/0073912 A1 | 4/2004 | Meza |
| 2004/0078427 A1 | 4/2004 | Gil et al. |
| 2004/0078455 A1 | 4/2004 | Eide et al. |
| 2004/0082346 A1 | 4/2004 | Skytt et al. |
| 2004/0083469 A1 | 4/2004 | Chen et al. |
| 2004/0083472 A1 | 4/2004 | Rao et al. |
| 2004/0088281 A1 | 5/2004 | Matsuishi |
| 2004/0088473 A1 | 5/2004 | Ogle |
| 2004/0088694 A1 | 5/2004 | Ho |
| 2004/0092255 A1 | 5/2004 | Ji et al. |
| 2004/0093342 A1 | 5/2004 | Arbo et al. |
| 2004/0093421 A1 | 5/2004 | Peng et al. |
| 2004/0093523 A1 | 5/2004 | Matsuzaki et al. |
| 2004/0093557 A1 | 5/2004 | Kawatani |
| 2004/0093597 A1 | 5/2004 | Rao et al. |
| 2004/0095457 A1 | 5/2004 | Pokorny et al. |
| 2004/0098413 A1 | 5/2004 | Peng |
| 2004/0098421 A1 | 5/2004 | Peng |
| 2004/0098427 A1 | 5/2004 | Peng |
| 2004/0098715 A1 | 5/2004 | Aghera et al. |
| 2004/0103214 A1 | 5/2004 | Adwankar et al. |
| 2004/0103340 A1 | 5/2004 | Sundareson et al. |
| 2004/0103347 A1 | 5/2004 | Sneed et al. |
| 2004/0107416 A1 | 6/2004 | Buban et al. |
| 2004/0110497 A1 | 6/2004 | Little |
| 2004/0111582 A1 | 6/2004 | Maeda et al. |
| 2004/0111702 A1 | 6/2004 | Chan |
| 2004/0111723 A1 | 6/2004 | Moles et al. |
| 2004/0116165 A1* | 6/2004 | Ahvonen et al. ......... 455/432.3 |
| 2004/0117322 A1 | 6/2004 | Bjorksten et al. |
| 2004/0117760 A1 | 6/2004 | McFarling |
| 2004/0117785 A1 | 6/2004 | Kincaid |
| 2004/0123153 A1 | 6/2004 | Wright et al. |
| 2004/0123188 A1 | 6/2004 | Srinivasan et al. |
| 2004/0123270 A1 | 6/2004 | Zhuang et al. |
| 2004/0123282 A1 | 6/2004 | Rao |
| 2004/0126803 A1 | 7/2004 | Cash et al. |
| 2004/0133887 A1 | 7/2004 | Herle et al. |
| 2004/0143573 A1 | 7/2004 | Burkey et al. |
| 2004/0143828 A1 | 7/2004 | Liu et al. |
| 2004/0143836 A1 | 7/2004 | McCormack et al. |
| 2004/0148379 A1 | 7/2004 | Ogura |
| 2004/0150519 A1 | 8/2004 | Husain et al. |
| 2004/0152455 A1 | 8/2004 | Herle et al. |
| 2004/0153327 A1 | 8/2004 | Liu et al. |
| 2004/0153356 A1 | 8/2004 | Lockwood et al. |
| 2004/0153549 A1 | 8/2004 | Naito et al. |
| 2004/0158583 A1 | 8/2004 | Kaappa |
| 2004/0158817 A1 | 8/2004 | Okachi et al. |
| 2004/0158829 A1 | 8/2004 | Beresin et al. |
| 2004/0166839 A1 | 8/2004 | Okkonen et al. |
| 2004/0168165 A1 | 8/2004 | Kokkinen |
| 2004/0174264 A1 | 9/2004 | Reisman et al. |
| 2004/0177060 A1* | 9/2004 | Nixon et al. ............. 707/3 |
| 2004/0180676 A1 | 9/2004 | Haumont et al. |
| 2004/0190693 A1 | 9/2004 | Beiermeister |
| 2004/0192280 A1 | 9/2004 | Dalton et al. |
| 2004/0192299 A1 | 9/2004 | Wilson et al. |
| 2004/0192306 A1 | 9/2004 | Elkarat et al. |
| 2004/0194081 A1 | 9/2004 | Qumei et al. |
| 2004/0198447 A1 | 10/2004 | Larsson |
| 2004/0203593 A1 | 10/2004 | Whelan et al. |
| 2004/0203655 A1 | 10/2004 | Sinnarajah et al. |
| 2004/0204117 A1 | 10/2004 | Weiner |
| 2004/0205709 A1 | 10/2004 | Hiltgen et al. |
| 2004/0208182 A1 | 10/2004 | Boles et al. |
| 2004/0209643 A1* | 10/2004 | Adwankar et al. ......... 455/419 |
| 2004/0210608 A1 | 10/2004 | Lee et al. |
| 2004/0215702 A1 | 10/2004 | Hamasaki et al. |
| 2004/0215755 A1 | 10/2004 | O'Neill |
| 2004/0215830 A1 | 10/2004 | Shenfield |
| 2004/0218034 A1 | 11/2004 | Wang et al. |
| 2004/0224679 A1 | 11/2004 | Okoro et al. |
| 2004/0226008 A1 | 11/2004 | Jacobi et al. |

| | | | | | | |
|---|---|---|---|---|---|---|
| 2004/0229684 A1 | 11/2004 | Blackburn et al. | | 2005/0204353 A1 | 9/2005 | Ji |
| 2004/0230963 A1 | 11/2004 | Rothman et al. | | 2005/0216718 A1 | 9/2005 | Rao |
| 2004/0230965 A1 | 11/2004 | Okkonen | | 2005/0216902 A1 | 9/2005 | Schaefer |
| 2004/0237079 A1 | 11/2004 | Cox et al. | | 2005/0216903 A1 | 9/2005 | Schaefer |
| 2004/0237081 A1 | 11/2004 | Homiller | | 2005/0220079 A1 | 10/2005 | Asokan |
| 2004/0237083 A1 | 11/2004 | Alcazar et al. | | 2005/0227677 A1 | 10/2005 | Kallio |
| 2004/0239975 A1 | 12/2004 | Kawaura et al. | | 2005/0227683 A1 | 10/2005 | Draluk et al. |
| 2004/0242286 A1 | 12/2004 | Benco et al. | | 2005/0228847 A1 | 10/2005 | Hayes Jr. |
| 2004/0243991 A1 | 12/2004 | Gustafson et al. | | 2005/0228874 A1 | 10/2005 | Edgett et al. |
| 2004/0243992 A1 | 12/2004 | Gustafson et al. | | 2005/0233733 A1 | 10/2005 | Roundtree et al. |
| 2004/0243993 A1 | 12/2004 | Okkonen et al. | | 2005/0234967 A1 | 10/2005 | Draluk et al. |
| 2004/0244008 A1 | 12/2004 | Lee | | 2005/0234997 A1 | 10/2005 | Gu et al. |
| 2004/0250245 A1 | 12/2004 | Rao et al. | | 2005/0239447 A1 | 10/2005 | Holzman et al. |
| 2004/0250294 A1 | 12/2004 | Kim | | 2005/0246703 A1 | 11/2005 | Ahonen |
| 2004/0255191 A1 | 12/2004 | Fox et al. | | 2005/0251848 A1 | 11/2005 | Al-Janabi |
| 2004/0255291 A1 | 12/2004 | Sierer et al. | | 2005/0257214 A1 | 11/2005 | Moshir et al. |
| 2004/0257208 A1 | 12/2004 | Huang et al. | | 2005/0264404 A1 | 12/2005 | Franczyk et al. |
| 2004/0260734 A1 | 12/2004 | Ren et al. | | 2005/0268296 A1 | 12/2005 | Marolia et al. |
| 2004/0261072 A1 | 12/2004 | Herle et al. | | 2005/0272455 A1 | 12/2005 | Oommen |
| 2004/0261073 A1 | 12/2004 | Herle et al. | | 2005/0278399 A1 | 12/2005 | Herle et al. |
| 2004/0267481 A1 | 12/2004 | Resnick et al. | | 2005/0278715 A1 | 12/2005 | Herle et al. |
| 2004/0267833 A1 | 12/2004 | Meller et al. | | 2005/0282533 A1 | 12/2005 | Draluk et al. |
| 2004/0268041 A1 | 12/2004 | Smith | | 2005/0289533 A1 | 12/2005 | Wang et al. |
| 2005/0005268 A1 | 1/2005 | Zilvay et al. | | 2006/0007901 A1 | 1/2006 | Roskowski et al. |
| 2005/0010552 A1 | 1/2005 | Kaappa et al. | | 2006/0010437 A1 | 1/2006 | Marolia |
| 2005/0010576 A1 | 1/2005 | Ren et al. | | 2006/0015626 A1 | 1/2006 | Hallamaa et al. |
| 2005/0010585 A1 | 1/2005 | Sahinoja et al. | | 2006/0015860 A1 | 1/2006 | Liu et al. |
| 2005/0022175 A1 | 1/2005 | Sliger et al. | | 2006/0020947 A1 | 1/2006 | Hallamaa et al. |
| 2005/0027867 A1 | 2/2005 | Mueller et al. | | 2006/0026228 A1 | 2/2006 | Kim |
| 2005/0033774 A1 | 2/2005 | Brentano et al. | | 2006/0031449 A1 | 2/2006 | Hallamaa et al. |
| 2005/0033829 A1 | 2/2005 | Oommen | | 2006/0036493 A1 | 2/2006 | Aufricht et al. |
| 2005/0037762 A1 | 2/2005 | Gurbani et al. | | 2006/0036874 A1 | 2/2006 | Cockerille et al. |
| 2005/0038916 A1 | 2/2005 | Nguyen | | 2006/0036941 A1 | 2/2006 | Neil |
| 2005/0038955 A1 | 2/2005 | Chen | | 2006/0039313 A1 | 2/2006 | Chou et al. |
| 2005/0039178 A1 | 2/2005 | Marolia et al. | | 2006/0039561 A1 | 2/2006 | Ypya et al. |
| 2005/0055397 A1 | 3/2005 | Zhu et al. | | 2006/0052089 A1 | 3/2006 | Khurana et al. |
| 2005/0055453 A1 | 3/2005 | Zhu | | 2006/0053066 A1 | 3/2006 | Sherr et al. |
| 2005/0055595 A1 | 3/2005 | Frazer et al. | | 2006/0059481 A1 | 3/2006 | Smith et al. |
| 2005/0055684 A1 | 3/2005 | Rao et al. | | 2006/0068786 A1 | 3/2006 | Florence |
| 2005/0060361 A1 | 3/2005 | Chatrath et al. | | 2006/0072847 A1 | 4/2006 | Chor et al. |
| 2005/0060699 A1 | 3/2005 | Kim et al. | | 2006/0079224 A1 | 4/2006 | Welnick et al. |
| 2005/0060711 A1 | 3/2005 | Ericsson et al. | | 2006/0080635 A1 | 4/2006 | Anwar et al. |
| 2005/0063242 A1 | 3/2005 | Ren | | 2006/0080650 A1 | 4/2006 | Winters et al. |
| 2005/0066019 A1 | 3/2005 | Egan et al. | | 2006/0080659 A1 | 4/2006 | Ganji |
| 2005/0071385 A1 | 3/2005 | Rao | | 2006/0080681 A1 | 4/2006 | Anwar et al. |
| 2005/0073438 A1 | 4/2005 | Rodgers et al. | | 2006/0087982 A1 | 4/2006 | Kuure et al. |
| 2005/0079863 A1 | 4/2005 | Macaluso | | 2006/0089999 A1 | 4/2006 | Xiang et al. |
| 2005/0084079 A1 | 4/2005 | Lang | | 2006/0100928 A1 | 5/2006 | Walczak et al. |
| 2005/0086328 A1 | 4/2005 | Landram et al. | | 2006/0101040 A1 | 5/2006 | Ren et al. |
| 2005/0091367 A1 | 4/2005 | Pyhalammi et al. | | 2006/0106806 A1 | 5/2006 | Sperling et al. |
| 2005/0091501 A1 | 4/2005 | Osthoff et al. | | 2006/0106888 A1 | 5/2006 | Iida et al. |
| 2005/0096025 A1 | 5/2005 | Qumei et al. | | 2006/0129414 A1 | 6/2006 | Hallamaa et al. |
| 2005/0097544 A1 | 5/2005 | Kim | | 2006/0130046 A1 | 6/2006 | O'Neill |
| 2005/0102615 A1 | 5/2005 | Roman et al. | | 2006/0158510 A1 | 7/2006 | Lia et al. |
| 2005/0102660 A1 | 5/2005 | Chen et al. | | 2006/0160533 A1 | 7/2006 | Chou et al. |
| 2005/0114493 A1 | 5/2005 | Mandato et al. | | 2006/0161599 A1 | 7/2006 | Rosen |
| 2005/0114504 A1 | 5/2005 | Marolia et al. | | 2006/0172742 A1 | 8/2006 | Chou et al. |
| 2005/0114852 A1 | 5/2005 | Chen et al. | | 2006/0173976 A1 | 8/2006 | Vincent et al. |
| 2005/0132179 A1 | 6/2005 | Glaum et al. | | 2006/0174242 A1 | 8/2006 | Zhu et al. |
| 2005/0132349 A1 | 6/2005 | Roberts et al. | | 2006/0176397 A1 | 8/2006 | Panabaker |
| 2005/0132351 A1 | 6/2005 | Randall et al. | | 2006/0181553 A1 | 8/2006 | Choe et al. |
| 2005/0135286 A1 | 6/2005 | Nurminen et al. | | 2006/0190608 A1 | 8/2006 | Sahinoja et al. |
| 2005/0136942 A1 | 6/2005 | Timiri et al. | | 2006/0190939 A1 | 8/2006 | Chen et al. |
| 2005/0138232 A1 | 6/2005 | Tamura et al. | | 2006/0193337 A1 | 8/2006 | Paila et al. |
| 2005/0144609 A1 | 6/2005 | Rothman et al. | | 2006/0200658 A1 | 9/2006 | Penkethman |
| 2005/0144612 A1 | 6/2005 | Wang et al. | | 2006/0200814 A1 | 9/2006 | Kontinen et al. |
| 2005/0148323 A1 | 7/2005 | Little et al. | | 2006/0203722 A1 | 9/2006 | Oommen |
| 2005/0148359 A1 | 7/2005 | Joeressen | | 2006/0203738 A1 | 9/2006 | Fok et al. |
| 2005/0149335 A1 | 7/2005 | Mesbah et al. | | 2006/0212561 A1 | 9/2006 | Feng |
| 2005/0153741 A1 | 7/2005 | Chen et al. | | 2006/0212937 A1 | 9/2006 | Natarajan |
| 2005/0160195 A1 | 7/2005 | Bruner et al. | | 2006/0217111 A1 | 9/2006 | Marolia et al. |
| 2005/0165706 A1 | 7/2005 | Giacchetti | | 2006/0223528 A1 | 10/2006 | Smith |
| 2005/0170863 A1 | 8/2005 | Shostak | | 2006/0224712 A1 | 10/2006 | Aho |
| 2005/0172117 A1 | 8/2005 | Aura | | 2006/0236325 A1 | 10/2006 | Rao et al. |
| 2005/0172141 A1 | 8/2005 | Gayde et al. | | 2006/0242305 A1 | 10/2006 | Alnas |
| 2005/0182697 A1 | 8/2005 | Rao | | 2006/0246922 A1 | 11/2006 | Gasbarro et al. |
| 2005/0198062 A1 | 9/2005 | Shapiro | | 2006/0248172 A1 | 11/2006 | Zurawka et al. |
| 2005/0198379 A1 | 9/2005 | Panasyuk et al. | | 2006/0258344 A1 | 11/2006 | Chen |
| 2005/0204068 A1 | 9/2005 | Zhu et al. | | 2006/0271659 A1 | 11/2006 | Mittal et al. |

| | | | | | | |
|---|---|---|---|---|---|---|
| 2006/0277590 | A1 | 12/2006 | Limont et al. | EP | 1052571 | 11/2000 |
| 2006/0282834 | A1 | 12/2006 | Cheng et al. | EP | 1077407 | 2/2001 |
| 2007/0014243 | A1 | 1/2007 | Meyer et al. | EP | 1152338 | 11/2001 |
| 2007/0028226 | A1 | 2/2007 | Chen et al. | EP | 1176840 | 1/2002 |
| 2007/0036294 | A1 | 2/2007 | Chaudhuri et al. | EP | 1184785 | 3/2002 |
| 2007/0041545 | A1 | 2/2007 | Gainsboro | EP | 1256865 | 11/2002 |
| 2007/0043849 | A1 | 2/2007 | Lill et al. | EP | 1333375 | 6/2003 |
| 2007/0049265 | A1 | 3/2007 | Kaimal et al. | EP | 1331833 | 7/2003 |
| 2007/0067765 | A1 | 3/2007 | Motta et al. | EP | 1584005 | 7/2004 |
| 2007/0089108 | A1 | 4/2007 | Chen et al. | EP | 1597668 | 8/2004 |
| 2007/0093243 | A1 | 4/2007 | Kapadekar et al. | EP | 1654640 | 12/2004 |
| 2007/0100585 | A1 | 5/2007 | Dulberg et al. | EP | 1639435 | 1/2005 |
| 2007/0106806 | A1 | 5/2007 | Tu et al. | EP | 1652100 | 1/2005 |
| 2007/0132774 | A1 | 6/2007 | Fan et al. | EP | 1652075 | 2/2005 |
| 2007/0133484 | A1 | 6/2007 | Albal et al. | EP | 1513317 | 3/2005 |
| 2007/0150444 | A1 | 6/2007 | Chesnais et al. | EP | 1515571 | 3/2005 |
| 2007/0150524 | A1 | 6/2007 | Eker et al. | EP | 1519600 | 3/2005 |
| 2007/0169073 | A1 | 7/2007 | O'Neill et al. | EP | 1660996 | 3/2005 |
| 2007/0169075 | A1 | 7/2007 | Lill et al. | EP | 1665041 | 4/2005 |
| 2007/0169089 | A1 | 7/2007 | Bantz et al. | EP | 1668951 | 6/2005 |
| 2007/0169099 | A1 | 7/2007 | Rao et al. | EP | 1563436 | 8/2005 |
| 2007/0186108 | A1 | 8/2007 | Passarella et al. | EP | 1584016 | 10/2005 |
| 2007/0190939 | A1 | 8/2007 | Abel | EP | 1691282 | 8/2006 |
| 2007/0192158 | A1 | 8/2007 | Kim | EP | 1705832 | 9/2006 |
| 2007/0192453 | A1 | 8/2007 | Copeland et al. | EP | 1732037 | 12/2006 |
| 2007/0200713 | A1 | 8/2007 | Weber et al. | EP | 2024850 | 2/2009 |
| 2007/0220504 | A1 | 9/2007 | Eker | EP | 2025095 | 2/2009 |
| 2007/0226805 | A1 | 9/2007 | Jeal et al. | EP | 2047420 | 4/2009 |
| 2007/0259633 | A1 | 11/2007 | Rao | EP | 2087644 | 8/2009 |
| 2007/0277169 | A1 | 11/2007 | Rao et al. | EP | 2104992 | 9/2009 |
| 2007/0282621 | A1 | 12/2007 | Altman et al. | EP | 1614034 | 1/2012 |
| 2007/0283003 | A1 | 12/2007 | Broyles et al. | GB | 2426151 | 11/2006 |
| 2007/0294173 | A1* | 12/2007 | Levy et al. .................. 705/51 | GB | 2458047 | 9/2009 |
| 2007/0294684 | A1 | 12/2007 | Kumashiro et al. | GB | 2468225 | 9/2010 |
| 2008/0032763 | A1 | 2/2008 | Bari et al. | JP | 61173360 | 8/1986 |
| 2008/0043726 | A1 | 2/2008 | Herrero-Veron et al. | JP | 07160490 | 6/1995 |
| 2008/0046583 | A1 | 2/2008 | Rao | JP | 07219780 | 8/1995 |
| 2008/0062900 | A1 | 3/2008 | Rao | JP | 08202626 | 8/1996 |
| 2008/0062926 | A1 | 3/2008 | Oba | JP | 11003223 | 1/1999 |
| 2008/0108321 | A1 | 5/2008 | Taaghol et al. | JP | 11161479 | 6/1999 |
| 2008/0114925 | A1 | 5/2008 | Yang | JP | 11272454 | 10/1999 |
| 2008/0127320 | A1 | 5/2008 | De Lutiis et al. | JP | 11345127 | 12/1999 |
| 2008/0144590 | A1 | 6/2008 | Rantanen et al. | JP | 2001233353 | 2/2003 |
| 2008/0154633 | A1 | 6/2008 | Ishibashi et al. | KR | 19990050594 | 11/1999 |
| 2008/0160983 | A1 | 7/2008 | Poplett et al. | KR | 20010046714 | 6/2001 |
| 2008/0184220 | A1 | 7/2008 | Chen et al. | KR | 20010076555 | 8/2001 |
| 2008/0196019 | A1 | 8/2008 | Meller et al. | KR | 20010100328 | 11/2001 |
| 2008/0205419 | A1 | 8/2008 | Shin et al. | KR | 20020034228 | 5/2002 |
| 2008/0208928 | A1 | 8/2008 | Hernandez | KR | 100506785 | 8/2005 |
| 2008/0244049 | A1 | 10/2008 | Normark et al. | KR | 1020050088193 | 9/2005 |
| 2008/0271023 | A1 | 10/2008 | Bone et al. | KR | 1020080008425 | 3/2006 |
| 2009/0030965 | A1 | 1/2009 | Hayes, Jr. | KR | 1020060064660 | 6/2006 |
| 2009/0064341 | A1 | 3/2009 | Hartung et al. | KR | 1020060064663 | 6/2006 |
| 2009/0113386 | A1 | 4/2009 | Eker et al. | KR | 1020060089229 | 8/2006 |
| 2009/0190757 | A1 | 7/2009 | Chen et al. | KR | 20090035044 | 4/2009 |
| 2009/0204845 | A1 | 8/2009 | Herscovitz et al. | KR | 100986487 | 10/2010 |
| 2009/0219848 | A1 | 9/2009 | Lohmar et al. | KR | 101085987 | 11/2011 |
| 2009/0328099 | A1 | 12/2009 | Praden et al. | TW | 090107418 | 1/2003 |
| 2010/0185727 | A1 | 7/2010 | Mittal | WO | WO9632679 | 10/1996 |
| 2010/0275010 | A1 | 10/2010 | Ghirardi | WO | WO9838823 | 9/1998 |
| 2010/0279733 | A1 | 11/2010 | Karsten et al. | WO | WO9856149 | 12/1998 |
| 2010/0287308 | A1 | 11/2010 | Robbin et al. | WO | WO9921382 | 4/1999 |
| 2011/0022948 | A1 | 1/2011 | Brown et al. | WO | WO9957900 | 11/1999 |
| 2011/0209055 | A1 | 8/2011 | Plestid et al. | WO | WO0001187 | 1/2000 |
| | | | | WO | WO0002358 | 1/2000 |
| | | FOREIGN PATENT DOCUMENTS | | WO | WO0022860 | 4/2000 |
| | | | | WO | WO0106798 | 1/2001 |
| CN | | 1864429 | 11/2006 | WO | WO0186985 | 11/2001 |
| CN | | 1906574 | 1/2007 | WO | WO0223925 | 3/2002 |
| CN | | 101043372 | 9/2007 | WO | WO0225438 | 3/2002 |
| CN | | 101543016 | 9/2009 | WO | WO0241147 | 5/2002 |
| CN | | 101595469 | 12/2009 | WO | WO03010656 | 2/2003 |
| CN | | 101904105 | 12/2010 | WO | WO03012574 | 2/2003 |
| DE | | 10115729 | 10/2001 | WO | WO03025742 | 3/2003 |
| DE | | 112007002863 | 10/2009 | WO | WO03034765 | 4/2003 |
| DE | | 112008002767 | 10/2010 | WO | WO03049381 | 6/2003 |
| EP | | 0717353 | 6/1996 | WO | WO2004031889 | 4/2004 |
| EP | | 0803812 | 10/1997 | WO | WO2004038546 | 5/2004 |
| EP | | 0811942 | 12/1997 | WO | WO2004042538 | 5/2004 |
| EP | | 1049346 | 11/2000 | | | |

| | | |
|---|---|---|
| WO | WO2004049104 | 6/2004 |
| WO | WO2004049115 | 6/2004 |
| WO | WO2004049314 | 6/2004 |
| WO | WO2004059956 | 7/2004 |
| WO | WO2004061551 | 7/2004 |
| WO | WO2004061615 | 7/2004 |
| WO | WO2004063899 | 7/2004 |
| WO | WO2004066091 | 8/2004 |
| WO | WO2004070571 | 8/2004 |
| WO | WO2004072773 | 8/2004 |
| WO | WO2004086196 | 10/2004 |
| WO | WO2004095457 | 11/2004 |
| WO | WO2004109510 | 12/2004 |
| WO | WO2005001665 | 1/2005 |
| WO | WO2005004395 | 1/2005 |
| WO | WO2005008940 | 1/2005 |
| WO | WO2005013123 | 2/2005 |
| WO | WO2005015343 | 2/2005 |
| WO | WO2005024628 | 3/2005 |
| WO | WO2005031570 | 4/2005 |
| WO | WO2005036916 | 4/2005 |
| WO | WO2005041459 | 5/2005 |
| WO | WO2005079334 | 9/2005 |
| WO | WO2006003254 | 1/2006 |
| WO | WO2007112108 | 10/2007 |
| WO | WO2007117514 | 10/2007 |
| WO | WO2007146710 | 12/2007 |
| WO | WO2008003081 | 1/2008 |
| WO | WO2008008880 | 1/2008 |
| WO | WO2008014454 | 1/2008 |
| WO | WO2008022195 | 2/2008 |
| WO | WO2008022198 | 2/2008 |
| WO | WO2008028072 | 3/2008 |
| WO | WO2008033962 | 3/2008 |
| WO | WO2008045700 | 4/2008 |
| WO | WO2008048905 | 4/2008 |
| WO | WO2008067446 | 6/2008 |
| WO | WO2009051760 | 4/2009 |

OTHER PUBLICATIONS

Bitfone Corp., CA Office Action Jun. 8, 2007, CA App. No. 2,414,281, 4 p.
Bitfone Corp., CN Office Action Jun. 5, 2009, CN App. No. 200610067641.4, 12 p.
Bitfone Corp., CN Office Action Dec. 20, 2010, CN App. No. 200610067641.4, 3 p.
Bitfone Corp., EP Office Action Mar. 16, 2010, EP App. No. EP04777313.0, 8 p.
Bitfone Corp., EP Search Report Mar. 22, 2012, EP App. No. 06251423.7, 6 p.
Bitfone Corp., EP Office Action Mar. 26, 2010, EP App. No. 04785381.7, 5 p.
Bitfone Corp., EP Office Action May 11, 2012, EP App. No. 04777313.0, 9 p.
Bitfone Corp., EP Search Report Jan. 18, 2008, EP App No. 04759830.5, 5 p.
Bitfone Corp., EP Search Report Mar. 30, 2011, EP App. No. 06251423.7, 7 p.
Bitfone Corp., EP Search Report Jul. 1, 2011, EP App. No. 06251423.7, 11 p.
Bitfone Corp., EP Search Report Jul. 4, 2006, EP App. No. EP06250739.7, 7 p.
Bitfone Corp., EP Search Report Jul. 19, 2006, EP App. No. 06251512.7, 8 p.
Bitfone Corp., EP Search Report Nov. 26, 2009, EP App. No. EP04777313.0, 3 p.
Bitfone Corp., Int'l Prelim Rpt Jan. 9, 2006, PCT App. No. PCT/US2004/022598, 7 p.
Bitfone Corp., Int'l Prelim Rpt Jan. 30, 2006, PCT App. No. PCT/US2004/024876, 8 p.
Bitfone Corp., Int'l Prelim Rpt Mar. 6, 2006, PCT App. No. PCT/US2004/028433, 8 p.
Bitfone Corp., Int'l Prelim Rpt Mar. 13, 2006, PCT App. No. PCT/US2004/021037, 7 p.
Bitfone Corp., Int'l Prelim Rpt Mar. 27, 2006, PCT App. No. PCT/US2004/031547, 9 p.
Bitfone Corp., Int'l Prelim Rpt Aug. 5, 2005, PCT App No. PCT/US2004/002950, 6 p.
Bitfone Corp., Int'l Prelim Rpt Aug. 12, 2005, PCT App. No. PCT/US2004/002084, 4 p.
Bitfone Corp., Int'l Prelim Rpt Sep. 30, 2008, PCT App. No. PCT/US2007/007489, 4 p.
Bitfone Corp., Int'l Prelim Rpt Oct. 1, 2005, PCT App. No. PCT/US2004/008918, 4 p.
Bitfone Corp., Int'l Prelim Rpt Oct. 28, 2008, PCT App. No. PCT/US2004/000694, 4 p.
Bitfone Corp., Int'l Prelim Rpt Nov. 7, 2006, PCT App. No. PCT/US2005/004520, 4 p.
Bitfone Corp., Int'l Prelim Rpt Dec. 8, 2005, PCT App. No. PCT/US2004/017731, 8 p.
Bitfone Corp., Int'l Prelim Rpt Dec. 10, 2008, PCT App. No. PCT/US2007/070534, 9 p.
Bitfone Corp., Int'l Prelim Rpt, Apr. 3, 2006, PCT App. No. PCT/US2004/033071, 9 p.
Bitfone Corp., Int'l Search Report & Written Opinion Jan. 4, 2005, PCT App. No. PCT/US2004/002084, 8 p.
Bitfone Corp., Int'l Search Report & Written Opinion Jan. 14, 2005, PCT App. No. PCT/US2004/011219, 9 p.
Bitfone Corp., Int'l Search Report & Written Opinion Jul. 14, 2008, PCT App. No. PCT/US2004/001574, 16 p.
Bitfone Corp., Int'l Search Report Jan. 10, 2005, PCT App. No. PCT/US2003/033241, 3 p.
Bitfone Corp., Int'l Search Report Jan. 19, 2005, PCT App. No. PCT/US2004/024876, 1 p.
Bitfone Corp., Int'l Search Report Jan. 25, 2005, PCT App. No. PCT/US2003/037265, 3 p.
Bitfone Corp., Int'l Search Report Jan. 25, 2005, PCT App. No. PCT/US2004/033071, 3 p.
Bitfone Corp., Int'l Search Report Jan. 30, 2006, PCT App. No. PCT/US2004/021037, 3 p.
Bitfone Corp., Int'l Search Report Feb. 10, 2005, PCT App. No. PCT/US2004/031547, 3 p.
Bitfone Corp., Int'l Search Report Mar. 7, 2005, PCT App. No. PCT/US2004/002950, 4 p.
Bitfone Corp., Int'l Search Report Mar. 16, 2005, PCT App. No. PCT/US2004/008918, 3 p.
Bitfone Corp., Int'l Search Report Apr. 12, 2008, PCT App. No. PCT/US2004/063899, 3 p.
Bitfone Corp., Int'l Search Report Apr. 22, 2004, PCT App. No. PCT/US2003/027620, 4 p.
Bitfone Corp., Int'l Search Report Apr. 23, 2008, PCT App. No. PCT/US2007/007489, 3 p.
Bitfone Corp., Int'l Search Report May 26, 2005, PCT App. No. PCT/US2004/028433, 7 p.
Bitfone Corp., Int'l Search Report Jun. 22, 2005, PCT App. No. PCT/US2003/041555, 3 p.
Bitfone Corp., Int'l Search Report Jul. 20, 2005, PCT App. No. PCT/US2004/022598, 3 p.
Bitfone Corp., Int'l Search Report Jul. 27, 2005, PCT App No. PCT/US2003/035934, 3 p.
Bitfone Corp., Int'l Search Report Aug. 23, 2005, PCT App. No. PCT/US2004/017731, 6 p.
Bitfone Corp., Int'l Search Report Oct. 3, 2006, PCT App. No. PCT/US2005/004520, 3 p.
Bitfone Corp., Int'l Search Report Oct. 3, 2008, PCT App. No. PCT/US2004/000694, 3 p.
Bitfone Corp., Int'l Search Report Oct. 14, 2004, PCT App. No. PCT/US2003/035377, 4 p.
Bitfone Corp., Int'l Search Report Dec. 3, 2004, PCT App. No. PCT/US2003/036995, 4 p.
Bitfone Corp., Int'l Search Report, Jul. 20, 2006, PCT App. No. PCT/US2003/027727, 8 p.
Bitfone Corp., JP Final Office Action Jun. 6, 2006, Jap. App. No. 2002-543291, 10 p.
Bitfone Corp., JP Office Action Nov. 8, 2005, Jp App. No. 2002-543291, 13 p.

Bitfone Corp., KR Office Action Feb. 16, 2011, KR App. No. KR-10-2006-7006350, 4 p.
Bitfone Corp., KR Office Action Apr. 10, 2008, KR App. No. KR10-2006-7004343, 7 p.
Bitfone Corp., KR Office Action May 21, 2008, KR App. No. KR10-2006-7004488, 8 p.
Bitfone Corp., KR Office Action Aug. 21, 2007, KR App. No. KR10-2006-7004343, 5 p.
Bitfone Corp., KR Office Action Aug. 21, 2007, KR App. No. KR10-2006-7004488, 5 p.
Bitfone Corp., Written Opinion Jan. 19, 2005, PCT App. No. PCT/US2004/017731, 7 p.
Bitfone Corp., Written Opinion Jan. 30, 2006, PCT App. No. PCT/US2004/021037, 6 p.
Bitfone Corp., Written Opinion Mar. 26, 2006, PCT App. No. PCT/US2004/031547, 8 p.
Bitfone Corp., Written Opinion Jul. 20, 2005, PCT App. No. PCT/US2004/022598, 6 p.
Bitfone Corp., Written Opinion Dec. 4, 2005, PCT App. No. PCT/US2004/017731, 7 p.
Burns et al., "In-Place Reconstruction of Version Differences," IEEE Transactions on Knowledge and Data Engineering, Vo. 15. No. 4, Jul./Aug. 2003, pp. 973-984.
Ciancarini et al., "Using a Coordination Language to Specify and Analyze Systems Containing Modile Components," ACM Transactions, vol. 9. No. 2, Apr. 2000, pp. 167-198.
Claise et al., "IPFIX Protocol Specification", IPFIX Working Group, Jun. 2003, retrieved from: http://tools.ietf.org/html/draft-ietf-ipfix-protocol-00.
CRC Press LLC., "Overview of Cryptography," Copyright 1997 CRC Press LLC, 48 p.
Fasbender et al., "Any Network, Any Terminal, Anywhere," IEEE Personal Communications, Apr. 1999, pp. 22-30, IEEE Press. 1999.
Hadjiefthymiades et al., "ESW4: Enhanced Scheme for WWW Computing in Wireless Communication Environments," ACM SIGCOMM Computer Communication Review, vol. 29, Issue 5, pp. 24-35, ACM Press, Oct. 1999.
Hoffmeyer et al., "Radio Software Download for Commercial Wireless Reconfigurable Devices," IEEE Communications Magazine, IEEE Service Center, New York NY, US. vol. 42, No. 3, Mar. 2004, pp. S26-S32.
HPC, Int'l Search Report Sep. 5, 2007, PCT App. No. PCT/US2007/008415, 2 p.
HPDC, CN Office Action Sep. 22. 2011, CN App. No. 200780044370.3, 9 p.
HPDC, EP Office Action Jan. 22, 2010, EP App. No. 04701739.7, 7 p.
HPDC, EP Office Action Feb. 4, 2011, EP App. No. 07843502.1, 4 p.
HPDC, EP Office Action Feb. 9, 2011, EP App. No. 04759830.5, 3 p.
HPDC, EP Office Action Mar. 4, 2011, EP App. No. 07813468.1, 9 p.
HPDC, EP Office Action Mar. 23, 2010, EP App. No. 04705590.0, 10 p.
HPDC, EP Office Action Apr. 3, 2009, EP App. No. 04779823.6, 7 p.
HPDC, EP Office Action Apr. 11, 2008, EP App. No. 04759830.5, 5 p.
HPDC, EP Office Action Apr. 23, 2009, EP App. No. 04701739.7, 7 p.
HPDC, EP Office Action May 4, 2011, EP App. No. 04759830.5, 3 p.
HPDC, EP Office Action May 11, 2010, EP App. No. 03759224.3, 6 p.
HPDC, EP Office Action Jun. 3, 2009, EP App. No. 01991949.7, 7p.
HPDC, EP Office Action Jun. 30, 2009, EP App. No. 07798184.3, 5 p.
HPDC, EP Office Action Jul. 27, 2011, EP App. No. 07844241.5, 6 p.
HPDC, EP Office Action Aug. 12, 2011, EP App. No. 04759830.5. 56 p.
HPDC, EP Office Action Aug. 30, 2011, EP App. No. 04779823.6, 6 p.
HPDC, EP Office Action Sep. 2, 2010, EP App. No. 04759830.5, 4 p.
HPDC, EP Office Action Sep. 7, 2009, EP App. No. 07844241.5, 3 p.
HPDC, EP Office Action Sep. 18, 2009, EP App. No. 07843502.1, 2 p.
HPDC, EP Office Action Oct. 15, 2009, EP App. No. 04785067.2, 6 p.
HPDC, EP Office Action Oct. 27, 2009, EP App. No. 04782849.6, 3 p.
HPDC, EP Office Action Nov. 10, 2009, EP App. No. 07798184.3, 4 p.
HPDC, EP Supp. Search Report Feb. 6, 2009, EP App. No. 04701739, 3 p.
HPDC, EP Search Report Feb. 23, 2010, EP App. No. 03789910.1, 5 p.
HPDC, EP Search Report Mar. 6, 2009, EP App. No. 01991949.7, 7 p.
HPDC, EP Search Report Jun. 3, 2009, EP App. No. 01991949.7, 7 p.
HPDC, EP Search Report Aug. 9, 2009, EP App. No. 03789910.1, 6 p.
HPDC, EP Search Report Oct. 19, 2009, EP App. No. 07813468.1, 10 p.
HPDC, EP Search Report Nov. 13, 2009, EP App. No. 04756990.0, 4 p.
HPDC, EP Search Report Nov. 24, 2008, EP App. No. 04779823.6, 3 p.
HPDC, EP Search Report Nov. 25, 2009, EP App. No. 04705590.0, 6 p.
HPDC, EP Supp. Search Report Feb. 6, 2009, EP App. No. 004701739.7, 3 p.
HPDC, EP Supp. Search Report Jan. 26, 2010, EP App. No. 03759224.3, 3 p.
HPDC, EP Supp. Search Report Dec. 22, 2009, EP App. No. 03789910.1, 7 p.
HPDC, GB Office Action Feb. 25, 2011, GB App. No. 0910190.8, 6 p.
HPDC, GB Office Action Jul. 26, 2011, GB App. No. 0910190.8, 1 p.
HPDC, GB Office Action Sep. 20, 2011, GB App. No. 1007372.4, 3 p.
HPDC, GB Office Action Dec. 22, 2011, GB App. No. 1007372.4, 2 p.
HPDC, Int'l Prelim Rpt Jan. 6, 2009, PCT App. No. PCT/US2007/072493, 8 p.
HPDC, Int'l Prelim Rpt Jan. 13, 2009, PCT App. No. PCT/US2007/073340, 8 p.
HPDC, Int'l Prelim Rpt Jan. 27, 2009, PCT App. No. PCT/US2007/074586, 5 p.
HPDC, Int'l Prelim Rpt Feb. 17, 2009, PCT App. No. PCT/US2007/076001, 7 p.
HPDC, Int'l Prelim Rpt Feb. 17, 2009, PCT App. No. PCT/US2007/076006, 7 p.
HPDC, Int'l Prelim Rpt Mar. 3, 2009, PCT App. No. PCT/US2007/077288, 7 p.
HPDC, Int'l Prelim Rpt Mar. 17, 2009, PCT App. No. PCT/US2007/078326, 7 p.
HPDC, Int'l Prelim Rpt Apr. 7, 2009, PCT App. No. PCT/US2007/079920, 8 p.
HPDC, Int'l Prelim Rpt Apr. 20, 2010, PCT App. No. PCT/US2008/011824, 6 p.
HPDC, Int'l Prelim Rpt Apr. 22, 2009, PCT App. No. PCT/U52007/081273, 8 p.
HPDC, Int'l Prelim Rpt Jun. 3, 1999, PCT App. No. PCT/US2007/085903, 6 p.
HPDC, Int'l Prelim Rpt Sep. 30, 2008, PCT App. No. PCT/US2007/008415, 7 p.
HPDC, Int'l Search Report Jan. 3, 2008, PCT App. No. US2007/073340, 5 p.
HPDC, Int'l Search Report Jan. 31, 2008, PCT App. No. PCT/US2007/076001, 3 p.
HPDC, Int'l Search Report Feb. 14, 2008, PCT App. No. PCT/US2007/072493, 5 p.
HPDC, Int'l Search Report Mar. 5, 2008, PCT App. No. PCT/US2007/078326, 5 p.
HPDC, Int'l Search Report Mar. 25, 2009, PCT App. No. PCT/US2008/011824, 2p.
HPDC, Int'l Search Report Mar. 27, 2008, PCT App. No. PCT/US2007/079920, 3 p.

HPDC, Int'l Search Report Apr. 10, 2008, PCT App No. PCT/US2007/070534, 7 p.
HPDC, Int'l Search Report Jun. 26, 2008, PCT App. No. PCT/US2007/076006, 5 p.
HPDC, Int'l Search Report Jul. 18, 2008, PCT App. No. PCT/US2007/077288, 5 p.
HPDC, Int'l Search Report Aug. 13, 2008, PCT App. No. PCT/US2007/085903, 3 p.
HPDC, Int'l Search Report Sep. 2, 2008, PCT App. No. PCT/US2007/081273, 5 p.
HPDC, Int'l Search Report Oct. 24, 2008, PCT App. No. PCT/US2007/074586, 3 p.
HPDC, JP Office Action Nov. 8, 2005, JP App. No. 2002-543291, 13 p.
HPDC, KR Office Action May 6, 2010, KR App. No. 10-2009-7005363, 3 p.
HPDC, KR Office Action Nov. 11, 2009, KR App. No. 10-2009-7005363, 2 p.
HPDC, Written Opinion Apr. 17, 2010, PCT App. No. PCT/US2008/011824, 4 p.
IBM, "System Firmware Update Method Before Rebooting the Operating System," Research Disclosure, Mason Publications, vol. 425, No. 86, Sep. 1, 1999, 2 p.
Jing et al., "Client Server Computing in Mobile Environments," ACM Computing Surveys, vol. 31, No. 2, Jun. 1999, pp. 117-157.
Jones, F., "Jambala-Intelligence beyond digital wireless," Ericsson Review No. 3, 1998, pp. 126-131.
Klein et al., "Compressed Delta Encoding for LZSS Encoded Files," 2007 Data Compression Conference (DCC'07) IEEE Computer Society, 10 p.
Koenig et al., "Re: ext2—available+used not equal to total," Dec. 31, 1998, accessed on Oct. 9, 2007 from <http://www.uwsg.iu.edu/hypermail/linux/kernel/9901.0/0270.html>, Linux Kernel Archive, 2 p.
Lindholm et al., "Fast and Simple XML Tree Dfferencing by Sequence Alignment," DocEng '06, Oct. 10-13, 2006, Amsterdam, The Netherlands, Copyright 2006 ACM, pp. 75-84.
Memorymanagement.Org, http://web.archive.org/web/20020313115607/http://www.memorymanagement.org/glossary, 3 p. 2003.
Meng et al., "Schema-Guided Wrapper Maintenance for Web-Data Extraction," WIDM'03, Nov. 7-8, 2003, pp. 1-8.
Meyers, W. J., "Design of a Microcode Link Editor," Proceedings of the 13th Annual Workshop on Microprogramming, pp. 165-170.
Microsoft, "Computer Dictionary," Microsoft Press, 2002, pp. 372, 373, 380, 423 and 565.
Oommen, P., "A Framework for Integrated Management of Mobile-Stations Over-the-Air," Integrated Network Management Proceedings, 2001 IEEE/IFIP International Symposium on May 14-18, 2001, pp. 247-256.
Oommen, P., "Over the Air Handset Management," Emerging Technologies Symposium; Broadband, Wireless Internet Access, 2000 IEEE Apr. 10-11, 2000, 4 p.
Open Mobile Alliance, "Device Management Protocol, Candidate," Ver 1.2, Jun. 2, 2006.
Open Mobile Alliance, "Generic Content Download Over the Air Specification," Version 1.0, Sep. 12, 2002, 42 p.
Pant et al., Software Reliability Predictions for Distributed Software, IEEE, 1998, pp. 11-21.
Park et al., "A Low-cost Memory Architecture with NAND XIP for Mobile Embedded Systems," CODES+ISSS'03, Oct. 1-3, 2003, pp. 138-143.
Pedram, M., "Power Optimization and Management in Embedded Systems," Jan. 2001, pp. 239-244.
Peymandoust et al., "Low Power Embedded Software Optimization Using Symbolic Algebra," Mar. 2002, pp. 1-7.
Raskar et al., "Image Fusion for Context Enhancement and Video Surrealism," Proceedings of the Third Int'l. Symposium on Non-Photorealistic Animation and Rendering (NPAR2004), Jun. 7-9, 2004, 9 p.
Satoh et al., Experiment of Component-Based Software Development on Multiple Distributed Object Environments, IEEE, 1998, 8 p.

Sevanto et al., "Introducing Quality-of-Service and Traffic Classes into Wireless Mobile Networks," WOWMOM 98 Dallas, Texas, USA, Copyright ACM 1998 pp. 21-30.
Symborski, C. W., "Updating Softwaare and Configuration Data in a Distributed Communications Nev.'Vork". 1988 Computer NetworKing Symposium, 8 p.
Varshney et al., "Emerging Mobile and Wireless Networks," Communications of the ACM Jun. 2000, vol. 43, No. 6, pp. 73-81.
W3C, XML Signature Syntax and Processing, (2nd edition), Jun. 10, 2008, 1 p. [Online] http://www.w3.org/TR/xmldsig-core/.
White, Ron, "How Computers Work," Millennium Ed., Que Corporation, Indianapolis, IN, 1999, 284 p.
Yergeau, F., "UTF-8, a transformation format of ISO 10646," Jan. 1998, Alis Technologies, 10 p.
Yoshimura et al., "Mobile Streaming Media CDN Enabled by Dynamic SMIL," WWW2003, May 7-11, 2002, Honolulu, Hawaii, ACM, pp. 651 - 661.
Wheatley, Office Action Dec. 27, 2011, U.S. Appl. No. 12/057,044, filed Mar. 27, 2008, 6 p.
Rao, Office Action Nov. 14, 2008, U.S. Appl. No. 11/057,361, filed Feb. 14, 2005, 8 p.
Insun, Office Action Feb. 3, 2010, U.S. Appl. No. 11/111,276, filed Apr. 21, 2005, 10 p.
Insun, Office Action Jul. 12, 2010, U.S. Appl. No. 11/111,276, filed Apr. 21, 2005, 11 p.
Iyad, Office Action Jan. 28, 2008, U.S. Appl. No. 11/100,305, Apr. 6, 2005, 20 p.
Iyad, Final Office Action Jul. 22, 2008, U.S. Appl. No. 11/100,305, Apr. 6, 2005, 11 p.
Iyad, Office Action Jan. 21, 2009, U.S. Appl. No. 11/100,305, Apr. 6, 2005, 7 p.
Iyad, Final Office Action Jul. 8, 2009, U.S. Appl. No. 11/100,305, filed Apr. 6, 2005, 25 p.
Shao-Chun, Office Action Dec. 11, 2008, U.S. Appl. No. 11/120,556, filed May 3, 2005, 28 p.
Shao-Chun, Final Office Action May 26, 2009, U.S. Appl. No. 11/120,556, filed May 3, 2005, 30 p.
Shao-Chun, Office Action Oct. 28, 2009, U.S. Appl. No. 11/120,556, filed May 3, 2005, 31 p.
Shao-Chun, Final Office Action May 13, 2010, U.S. Appl. No. 11/120,556, filed May 3, 2005 32 p.
Shao-Chun, Office Action Nov. 29, 2010, U.S. Appl. No. 11/120,556, filed May 3, 2005, 26 p.
Shao-Chun, Office Action Oct. 29, 2008, U.S. Appl. No. 11/124,866, filed May 9, 2005, 13 p.
Shao-Chun, Office Action May 5, 2009, U.S. Appl. No. 11/124,866, filed May 9, 2005, 14 p.
Shao-Chun, Office Action Nov. 12, 2008, U.S. Appl. No. 11/144,537, filed Jun. 3, 2005, 16 p.
Shao-Chun, Final Office Action Apr. 29, 2009, U.S. Appl. No. 11/144,537, filed Jun. 3, 2005, 22 p.
Sunil, Office Action Aug. 20, 2008, U.S. Appl. No. 11/189,344, filed Jul. 26, 2005, 12 p.
Sunil, Final Office Action Feb. 19, 2009, U.S. Appl. No. 11/189,344, filed Jul. 26, 2005, 13 p.
Sunil, Office Action Aug. 19, 2009, U.S. Appl. No. 11/189,344, filed Jul. 26, 2005, 10 p.
Sunil, Office Action Sep. 4, 2008, U.S. Appl. No. 11/226,032, filed Sep. 14, 2005, 17 p.
Sunil, Final Office Action Jul. 6, 2009, U.S. Appl. No. 11/226,032, filed Sep. 14, 2005, 17 p.
Sunil, Office Action Dec. 14, 2009, U.S. Appl. No. 11/226,032, filed Sep. 14 2005, 23 p.
Sunil, Final Office Action Apr. 29, 2010, U.S. Appl. No. 11/226,032, filed Sep. 14, 2005, 16 p.
Rao, Office Action Aug. 21, 2009, U.S. Appl. No. 11/247,463, filed Oct. 11, 2005, 18 p.
Rao, Final Office Action Jul. 13, 2010, U.S. Appl. No. 11/247,463, filed Oct. 11, 2005, 19 p.
Rao, Office Action Mar. 8, 2011, U.S. Appl. No. 11/247,463, filed Oct. 11, 2005, 20 p.
Rao, Final Office Action Aug. 30, 2011, U.S. Appl. No. 11/247,463, filed Oct. 11, 2005, 20 p.

Shao-Chun, Office Action Jul. 8, 2009, U.S. Appl. No. 11/316,291, filed Dec. 21, 2005, 18 p.
Shao-Chun, Final Office Action Dec. 2, 2009, U.S. Appl. No. 11/316,291, Dec. 21, 2005, 18 p.
Giovanni, Office Action Jul. 8, 2009, U.S. Appl. No. 11/316,292, filed Dec. 21, 2005, 8 p.
Giovanni, Office Action Jan. 25, 2010, U.S. Appl. No. 11/316,292, filed Dec. 21, 2005, 7 p.
Shao-Chun, Office Action May 27, 2009, U.S. Appl. No. 11/352,813, filed Feb. 13, 2006, 31 p.
Sunil, Office Action Jun. 10, 2008, U.S. Appl. No. 11/352,702, Feb. 13, 2006, 8 p.
Sunil, Final Office Action Mar. 30, 2009, U.S. Appl. No. 11/352,702, filed Feb. 13, 2006, 11 p.
Sunil, Office Action Sep. 28, 2009, U.S. Appl. No. 11/352,702, filed Feb. 13, 2006, 9 p.
Sunil, Final Office Action Mar. 16, 2010, U.S. Appl. No. 11/352,702, filed Feb. 13, 2006, 11 p.
Rao, Office Action Feb. 17, 2009, U.S. Appl. No. 11/374,481, Mar. 9, 2006, 17 p.
Rao, Final Office Action Jul. 21, 2009, U.S. Appl. No. 11/374,481, Mar. 9, 2006, 18 p.
Rao, Office Action Jan. 4, 2010, U.S. Appl. No. 11/374,481, filed Mar. 9, 2006, 10 p.
Jason, Office Action Oct. 16, 2008, U.S. Appl. No. 11/369,561, filed Mar. 7, 2006, 13 p.
Jason, Final Office Action May 8, 2009, U.S. Appl. No. 11/369,561, filed Mar. 7, 2006, 14 p.
Rao, Office Action Mar. 12, 2009, U.S. Appl. No. 11/385,162, filed Mar. 21, 2006, 6 p.
Rao, Office Action Sep. 25, 2009, U.S. Appl. No. 11/385,162, filed Mar. 21, 2006, 8 p.
Rao, Final Office Action May 4, 2010, U.S. Appl. No. 11/385,162, filed Mar. 21, 2006, 8 p.
Sunil, Office Action Nov. 13, 2008, U.S. Appl. No. 11/189,944, filed Jul. 26, 2005, 19 p.
Sunil, Final Office Action Apr. 27, 2009, U.S. Appl. No. 11/189,944, filed Jul. 26, 2005, 21 p.
Glenn, Office Action May 29, 2009, U.S. Appl. No. 11/478,108, filed Jun. 28, 2006, 19 p.
Glenn, Office Action Dec. 18, 2009, U.S. Appl. No. 11/478,108, filed Jun. 28, 2006, 17 p.
Glenn, Final Office Action Apr. 27, 2010, U.S. Appl. No. 11/478,108, filed Jun. 28, 2006, 17 p.
Glenn, Office Action Sep. 2, 2010, U.S. Appl. No. 11/478,108, filed Jun. 28, 2006, 21 p.
Glenn, Office Action Dec. 29, 2010, U.S. Appl. No. 11/478,108, filed Jun. 28, 2006, 16 p.
Rao, Office Action Apr. 6, 2010, U.S. Appl. No. 11/397,187, filed Apr. 4, 2006, 12 p.
Giovanni, Office Action May 26, 2010, U.S. Appl. No. 11/500,754, filed Aug. 7, 2006, 12 p.
Giovanni, Final Office Action Sep. 2, 2010, U.S. Appl. No. 11/500,754, filed Aug. 7, 2006, 17 p.
Uma, Office Action Oct. 6, 2009, U.S. Appl. No. 11/707,505, filed Feb. 16, 2007, 16 p.
Uma, Final Office Action Mar. 8, 2010, U.S. Appl. No. 11/707,505, filed Feb. 16, 2007 17 p.
Uma, Office Action Dec. 10, 2010, U.S. Appl. No. 11/707,505, filed Feb. 16, 2007 12 p.
Sunil, Office Action Oct. 7, 2010, U.S. Appl. No. 11/824,344, filed Jun. 29, 2007, 7 p.
Marko, Office Action Apr. 6, 2009, U.S. Appl. No. 11/732,267, filed Apr. 2, 2007, 23 p.
Marko, Final Office Action Oct. 19, 2009, U.S. Appl. No. 11/732,267, filed Apr. 2, 2007, 10 p.
Rao, Office Action Oct. 19, 2009, U.S. Appl. No. 11/799,586, filed May 2, 2007, 18 p.
Rao, Final Office Action Mar. 8, 2010, U.S. Appl. No. 11/799,586, filed May 2, 2007, 18 p.
Rao, Office Action Aug. 18, 2010, U.S. Appl. No. 11/799,586, filed May 2, 2008, 19 p.
Rao, Office Action Mar. 21, 2008, U.S. Appl. No. 11/728,517, filed Mar. 26, 2007, 17 p.
Rao, Office Action Oct. 20, 2008, U.S. Appl. No. 11/728,517, filed Mar. 26, 2007, 21 p.
Rao, Office Action Apr. 13, 2009, U.S. Appl. No. 11/728,517, filed Mar. 26, 2007, 23 p.
Rao, Office Action Dec. 3, 2009, U.S. Appl. No. 11/728,517, filed Mar. 26, 2007, 19 p.
Rao, Final Office Action Jun. 24, 1970, U.S. Appl. No. 11/728,517, filed Mar. 26, 2007, 25 p.
Marolia, Office Action Jul. 28, 2009, U.S. Appl. No. 11/827,583, filed Jul. 12, 2007, 18 p.
Rao, Office Action Jun. 16, 2009, U.S. Appl. No. 11/839,143, filed Aug. 15, 2007, 11 p.
Rao, Final Office Action Jan. 8, 2010, U.S. Appl. No. 11/839,143, filed Aug. 15, 2007, 15 p.
Rao, Office Action Aug. 4, 2010, U.S. Appl. No. 11/839,143, filed Aug. 15, 2007, 16 p.
Rao, Final Office Action Oct. 5, 2011, U.S. Appl. No. 11/839,143, filed Aug. 15, 2007, 20 p.
Rao, Office Action May 13, 2011, U.S. Appl. No. 11/839,143, filed Aug. 15, 2007, 17 p.
Rao, Final Office Action Aug. 23, 2011, U.S. Appl. No. 11/839,143, filed Aug. 15, 2007, 17 p.
Rao, Office Action Sep. 17, 2009, U.S. Appl. No. 11/847,658, filed Aug. 30, 2007, 10 p.
Rao, Office Action Mar. 25, 2010, U.S. Appl. No. 11/847,658, filed Aug. 30, 2007, 11 p.
Rao, Office Action Aug. 25, 2010, U.S. Appl. No. 11/847,658, filed Aug. 30, 2007, 13 p.
Rao, Office Action Nov. 18, 2010, U.S. Appl. No. 11/847,658, filed Aug. 30, 2007, 11 p.
Rao, Office Action Aug. 24, 2010, U.S. Appl. No. 11/854,414, filed Sep. 12, 2007, 14 p.
Rao, Office Action Nov. 17, 2009, U.S. Appl. No. 11/947,322, filed Nov. 29, 2007, 15 p.
Rao, Final Office Action May 14, 2010, U.S. Appl. No. 11/947,322, filed Nov. 29, 2007, 22 p.
Rao, Office Action Dec. 27, 2010, U.S. Appl. No. 11/947,322, filed Nov. 29, 2007, 43 p.
Rao, Final Office Action May 26, 2011, U.S. Appl. No. 11/947,322, filed Nov. 29, 2007, 40 p.
Rao, Office Action Jan. 9, 2012, U.S. Appl. No. 11/947,322, filed Nov. 29, 2007, 40 p.
Brunet, Office Action Jan. 25, 2006, U.S. Appl. No. 10/822,092, filed Apr. 9, 2004, 14 p.
Brunet, Final Office Action Aug. 23, 2006, U.S. Appl. No. 10/822,092, filed Apr. 9, 2004, 13 p.
Brunet, Office Action Feb. 22, 2007, U.S. Appl. No. 10/822,092, filed Apr. 9, 2004, 19 p.
Brunet, Final Office Action Nov. 15, 2007, U.S. Appl. No. 10/822,092, filed Apr. 9, 2004, 22 p.
Brunet, Office Action Apr. 4, 2008, U.S. Appl. No. 10/822,092, filed Apr. 9, 2004, 27 p.
Brunet, Final Office Action Sep. 23, 2008, U.S. Appl. No. 10/822,092, filed Apr. 9, 2004, 28 p.
Brunet, Office Action Mar. 8, 2007, U.S. Appl. No. 10/889,693, filed Jul. 12, 2004, 17 p.
Brunet, Final Office Action Nov. 28, 2007, U.S. Appl. No. 10/889,693, filed Jul. 12, 2004, 19 p.
Brunet, Office Action Jun. 25, 2008, U.S. Appl. No. 10/889,693, filed Jul. 12, 2004, 69 p.
Brunet, Final Office Action Dec. 23, 2008, U.S. Appl. No. 10/889,693, filed Jul. 12, 2004, 23 p.
Brunet, Office Action Jun. 29, 2006, U.S. Appl. No. 10/999,606, filed Nov. 29, 2004, 9 p.
Brunet, Final Office Action Mar. 7, 2007, U.S. Appl. No. 10/999,606, filed Nov. 29, 2004, 10 p.
Brunet, Office Action Apr. 18, 2008, U.S. Appl. No. 10/999,606, Nov. 29, 2004, 6 p.
Brunet, Office Action Apr. 24, 2009, U.S. Appl. No. 10/999,606, filed Nov. 29, 2004, 12 p.

Brunet, Final Office Action Aug. 20, 2009, U.S. Appl. No. 10/999,606, Nov. 29, 2004, 16 p.
Brunet, Office Action Nov. 10, 2009, U.S. Appl. No. 10/999,606, filed Nov. 29, 2004, 16 p.
Brunet, Final Office Action Feb. 18, 2010, U.S. Appl. No. 10/999,606, filed Nov. 29, 2004, 16 p.
Shao-Chun, Office Action Jun. 6, 2007, U.S. Appl. No. 11/125,974, filed May 9, 2005, 9 p.
Shao-Chun, Office Action Jan. 17, 2008, U.S. Appl. No. 11/125,974, filed May 9, 2005, 9 p.
Shao-Chun, Final Office Action Aug. 18, 2008, U.S. Appl. No. 11/125,974, filed May 9, 2005, 13 p.
Jeffrey, Office Action Jul. 26, 2006, U.S. Appl. No. 11/247,459, filed Oct. 11, 2005, 9 p.
Jeffrey, Office Action May 15, 2007, U.S. Appl. No. 11/247,459, filed Oct. 11, 2005, 10 p.
Jeffrey, Office Action Oct. 31, 2007, U.S. Appl. No. 11/247,459, filed Oct. 11, 2005, 26 p.
O'Neill, Office Action Aug. 25, 2006, U.S. Appl. No. 10/311,462, filed May 13, 2003, 24 p.
O'Neill, Office Action Mar. 5, 2010, U.S. Appl. No. 10/311,462, filed May 13, 2003, 23 p.
O'Neill, Final Office Action Jul. 23, 2010, U.S. Appl. No. 10/311,462, filed May 13, 2003, 24 p.
O'Neill, Office Action Nov. 18, 2009, U.S. Appl. No. 11/335,312, filed Jan. 19, 2006, 12 p.
O'Neill, Office Action Mar. 12, 2004, U.S. Appl. No. 10/404,601, filed Apr. 1, 2003, 28 p.
Shao-Chun, Final Office Action Jul. 25, 2006, U.S. Appl. No. 10/411,784, filed Apr. 11, 2003, 22 p.
Shao-Chun, Office Action Mar. 27, 2007, U.S. Appl. No. 10/411,784, filed Apr. 11, 2003, 16 p.
Shao-Chun, Final Office Action Oct. 18, 2007, U.S. Appl. No. 10/411,784, filed Apr. 11, 2003, 15 p.
Rao, Examiner's Answer Dec. 6, 2011, U.S. Appl. No. 11/427,635, filed Jan. 24, 2005, 19 p.
Rao, Final Office Action Jun. 10, 2011, U.S. Appl. No. 11/427,635, filed Jan. 24, 2005, 18 p.
Rao, Office Action Dec. 27, 2010, U.S. Appl. No. 11/427,635, filed Jan. 24, 2005, 13 p.
Rao, Office Action Mar. 31, 2010, U.S. Appl. No. 11/427,635, filed Jan. 24, 2005, 14 p.
Rao, Office Action Oct. 15, 2009, U.S. Appl. No. 11/427,635, filed Jan. 24, 2005, 11 p.
Rao, Final Office Action Apr. 30, 2009, U.S. Appl. No. 11/427,635, filed Jan. 24, 2005, 13 p.
Rao, Office Action Nov. 26, 2008, U.S. Appl. No. 11/427,635, filed Jan. 24, 2005, 15 p.
Rao, Examiner's Answer Mar. 16, 2011, U.S. Appl. No. 11/043,813, filed Jan. 26, 2005, 16 p.
Rao, Final Office Action Aug. 20, 2010, U.S. Appl. No. 11/043,813, filed Jan. 26, 2005, 16 p.
Rao, Office Action Mar. 9, 2010, U.S. Appl. No. 11/043,813, filed Jan. 26, 2005, 14 p.
Rao, Final Office Action Nov. 13, 2009, U.S. Appl. No. 11/043,813, filed Jan. 26, 2005, 15 p.
Rao, Office Action Mar. 30, 2009, U.S. Appl. No. 11/043,813, filed Jan. 26, 2005, 11 p.
Rao, Office Action Oct. 3, 2008, U.S. Appl. No. 11/043,813, filed Jan. 26, 2005, 23 p.
Chen, Examiner's Answer Aug. 16, 2012, U.S. Appl. No. 11/099,870, filed Apr. 6, 2005, 12 p.
Chen, Final Office Action Dec. 23, 2011, U.S. Appl. No. 11/099,870, filed Apr. 6, 2005, 12 p.
Chen, Office Action Jul. 6, 2011, U.S. Appl. No. 11/099,870, filed Apr. 6, 2005, 13 p.
Chen, Final Office Action Nov. 26, 2010, U.S. Appl. No. 11/099,870, filed Apr. 6, 2005, 9 p.
Chen, Office Action Jan. 24, 2010, U.S. Appl. No. 11/099,870, filed Apr. 6, 2005, 7 p.
Chen, Office Action Nov. 30, 2009, U.S. Appl. No. 11/099,870, filed Apr. 6, 2005, 8 p.
Chen, Final Office Action Apr. 14, 2009, U.S. Appl. No. 11/099,870, filed Apr. 6, 2005, 19 p.
Chen, Office Action Sep. 24, 2008, U.S. Appl. No. 11/099,870, filed Apr. 6, 2005, 7 p.
Chen, Office Action Apr. 25, 2008, U.S. Appl. No. 11/099,870, filed Apr. 6, 2005, 5 p.
Chen, Final Office Action Oct. 11, 2007, U.S. Appl. No. 11/099,870, filed Apr. 6, 2005, 16 p.
Chen, Office Action Aug. 24, 2006, U.S. Appl. No. 11/099,870, filed Apr. 6, 2005, 15 p.
Zhu, Examiner's Answer Aug. 16, 2012, U.S. Appl. No. 11/386,560, filed Mar. 22, 2006, 9 p.
Zhu, Final Office Action Feb. 16, 2012, U.S. Appl. No. 11/386,560, filed Mar. 22, 2006, 23 p.
Zhu, Office Action Sep. 30, 2011, U.S. Appl. No. 11/386,560, filed Mar. 22, 2006, 19 p.
Zhu, Final Office Action Mar. 3, 2011, U.S. Appl. No. 11/386,560, filed Mar. 22, 2006, 24 p.
Zhu, Office Action Sep. 15, 2010, U.S. Appl. No. 11/386,560, filed Mar. 22, 2006, 21 p.
Zhu, Office Action Mar. 31, 2010, U.S. Appl. No. 11/386,560, filed Mar. 22, 2006, 17 p.
Chen, Decision on Appeal Jun. 29, 2012, U.S. Appl. No. 11/637,550, filed Dec. 12, 2006, 9 p.
Chen, Examiner's Answer Mar. 30, 2009, U.S. Appl. No. 11/637,550, filed Dec. 12, 2006, 18 p.
Chen, Final Office Action May 22, 2008, U.S. Appl. No. 11/637,550, filed Dec. 12, 2006, 18 p.
Chen, Office Action Oct. 5, 2007, U.S. Appl. No. 11/637,550, filed Dec. 12, 2006, 20 p.
Chen, Final Office Action Jul. 27, 2012, U.S. Appl. No. 12/057,067, filed Mar. 27, 2008, 20 p.
Chen, Office Action Feb. 2, 2012, U.S. Appl. No. 12/057,067, filed Mar. 27, 2008, 18 p.
Chen, Final Office Action Jul. 28, 2011, U.S. Appl. No. 12/057,067, filed Mar. 27, 2008, 17 p.
Chen, Office Action Feb. 16, 2011, U.S. Appl. No. 12/057,067, filed Mar. 27, 2008, 22 p.
O'Neill, Final Office Action Jul. 17, 2012, U.S. Appl. No. 10/411,835, filed Apr. 11, 2003, 32 p.
O'Neill, Office Action Feb. 10, 2012, U.S. Appl. No. 10/411,835, filed Apr. 11, 2003, 26 p.
O'Neill, Advisory Action Jul. 29, 2011, U.S. Appl. No. 10/411,835, filed Apr. 11, 2003, 3 p.
O'Neill, Advisory Action Jun. 28, 2011, U.S. Appl. No. 10/411,835, filed Apr. 11, 2003, 3 p.
O'Neill, Final Office Action Apr. 11, 2011, U.S. Appl. No. 10/411,835, filed Apr. 11, 2003, 29 p.
O'Neill, Office Action Nov. 8, 2010, U.S. Appl. No. 10/411,835, filed Apr. 11, 2003, 26 p.
O'Neill, Office Action Aug. 26, 2009, U.S. Appl. No. 10/411,835, filed Apr. 11, 2003, 25 p.
Chen, Notice of Allowance Aug. 31, 2012, U.S. Appl. No. 10/412,045, filed Apr. 11, 2013, 10 p.
Chen, Final Office Action Jan. 25, 2012, U.S. Appl. No. 10/412,045, filed Apr. 11, 2003, 18 p.
Chen, Office Action Aug. 3, 2011, U.S. Appl. No. 10/412,045, filed Apr. 11, 2003, 18 p.
Chen, Final Office Action Apr. 19, 2010, U.S. Appl. No. 10/412,045, filed Apr. 11, 2003, 25 p.
Chen, Office Action Aug. 26, 2009, U.S. Appl. No. 10/412,045, filed Apr. 11, 2003, 17 p.
O'Neill, Office Action Jul. 23, 2012, U.S. Appl. No. 12/636,600, filed Dec. 11, 2009, 17 p.
Rao, Examiner's Answer May 26, 2011, U.S. Appl. No. 11/637,435, filed Dec. 12, 2006, 20 p.
Rao, Final Office Action Sep. 15, 2010, U.S. Appl. No. 11/637,435, filed Dec. 12, 2006, 15 p.
Rao, Office Action Sep. 10, 2009, U.S. Appl. No. 11/637,435, filed Dec. 12, 2006, 16 p.
Rao, Final Office Action Mar. 17, 2009, U.S. Appl. No. 11/637,435, filed Dec. 12, 2006, 15 p.

Rao, Office Action Sep. 22, 2008, U.S. Appl. No. 11/637,435, filed Dec. 12, 2006, 14 p.
Rao, Decision on Appeal Jun. 29, 2012, U.S. Appl. No. 10/706,362, filed Nov. 12, 2003, 6 p.
Rao, Examiner Answer Oct. 30, 2009, U.S. Appl. No. 10/706,362, filed Nov. 12, 2003, 24 p.
Rao, Final Office Action Apr. 15, 2009, U.S. Appl. No. 10/706,362, filed Nov. 12, 2003, 20 p.
Rao, Office Action Oct. 1, 2008, U.S. Appl. No. 10/706,362, filed Nov. 12, 2003, 19 p.
Rao, Office Action Jan. 9, 2008, U.S. Appl. No. 10/706,362, filed Nov. 12, 2003, 16 p.
Rao, Office Action Jul. 31, 2007, U.S. Appl. No. 10/706,362, filed Nov. 12, 2003, 17 p.
Rao, Office Action Dec. 5, 2006, U.S. Appl. No. 10/706,362, filed Nov. 12, 2003, 15 p.
McGhee, Decision on Appeal Jun. 6, 2012, U.S. Appl. No. 10/774,027, filed Feb. 6, 2004, 8 p.
McGhee, Examiner's Answer Oct. 30, 2009, U.S. Appl. No. 10/774,027, filed Feb. 6, 2004, 31 p.
McGhee, Final Office Action Apr. 24, 2009, U.S. Appl. No. 10/774,027, filed Feb. 6, 2004, 23 p.
McGhee, Office Action Oct. 15, 2008, U.S. Appl. No. 10/774,027, filed Feb. 6, 2004, 25 p.
McGhee, Office Action Mar. 4, 2008, U.S. Appl. No. 10/774,027, filed Feb. 6, 2004, 26 p.
Yang, Corrected Examiner's Answer Nov. 21, 2011, U.S. Appl. No. 12/030,757, filed Feb. 13, 2008, 2 p.
Yang, Examiner's Answer Nov. 10, 2011, U.S. Appl. No. 12/030,757, filed Feb. 13, 2008, 19 p.
Yang, Advisory Action Sep. 29, 2011, U.S. Appl. No. 12/030,757, filed Feb. 13, 2008, 3 p.
Yang, Final Office Action Jul. 14, 2011, U.S. Appl. No. 12/030,757, filed Feb. 13, 2008, 17 p.
Yang, Office Action Mar. 9, 2011, U.S. Appl. No. 12/030,757, filed Feb. 13, 2008, 33 p.
Rao, Final Office Action Nov. 20, 2012, U.S. Appl. No. 10/909,550, filed Aug. 2, 2004, 20 p.
Rao, Office Action Jun. 19, 2012, U.S. Appl. No. 10/909,550, filed Aug. 2, 2004, 24 p.
Rao, Advisory Action Oct. 8, 2010, U.S. Appl. No. 10/909,550, filed Aug. 2, 2004, 3 p.
Rao, Advisory Action Sep. 1, 2010, U.S. Appl. No. 10/909,550, filed Aug. 2, 2004, 3 p.
Rao, Final Office Action Jun. 3, 2010, U.S. Appl. No. 10/909,550, filed Aug. 2, 2004, 26 p.
Rao, Office Action Nov. 27, 2009, U.S. Appl. No. 10/909,550, filed Aug. 2, 2004, 17 p.
Rao, Office Action Jun. 23, 2009, U.S. Appl. No. 10/909,550,filed Aug. 2, 2004, 7 p.
Rao, Final Office Action Sep. 25, 2008, U.S. Appl. No. 10/909,550, filed Aug. 2, 2004, 19 p.
Rao, Office Action Apr. 23, 2008, U.S. Appl. No. 10/909,550, filed Aug. 2, 2004, 29 p.
Chia, Notice of Allowance May 31, 2012, U.S. Appl. No. 10/943,455, filed Sep. 17, 2004, 11 p.
Chia, Final Office Action Dec. 8, 2011, U.S. Appl. No. 10/943,455, filed Sep. 17, 2004, 23 p.
Chia, Office Action Jun. 22, 2010, U.S. Appl. No. 10/943,455, filed Sep. 17, 2004, 34 p.
Chia, Office Action Jan. 7, 2010, U.S. Appl. No. 10/943,455, filed Sep. 17, 2004, 21 p.
Chia, Office Action Jun. 11, 2009, U.S. Appl. No. 10/943,455, filed Sep. 17, 2004, 18 p.
Chia, Final Office Action Dec. 24, 2008, U.S. Appl. No. 10/943,455, filed Sep. 17, 2004, 17 p.
Chia, Office Action Mar. 21, 2008, U.S. Appl. No. 10/943,455, filed Sep. 17, 2004, 22 p.
Wang, Examiner's Answer Aug. 19, 2011, U.S. Appl. No. 11/183,199, filed Jul. 15, 2005, 23 p.
Wang, Advisory Action Feb. 23, 2011, U.S. Appl. No. 11/183,199, filed Jul. 15, 2005, 2 p.
Wang, Final Office Action Nov. 1, 2010, U.S. Appl. No. 11/183,199, filed Jul. 15, 2005, 19 p.
Wang, Office Action Apr. 28, 2010, U.S. Appl. No. 11/183,199, filed Jul. 15, 2005, 17 p.
Wang, Final Office Action Aug. 17, 2009, U.S. Appl. No. 11/183,199, filed Jul. 15, 2005, 16 p.
Wang, Office Action Feb. 13, 2009, U.S. Appl. No. 11/183,199, filed Jul. 15, 2005, 16 p.
Wang, Interview Summary Feb. 5, 2009, U.S. Appl. No. 11/183,199, filed Jul. 15, 2005, 2 p.
Wang, Final Office Action Oct. 28, 2008, U.S. Appl. No. 11/183,199, filed Jul. 15, 2005, 19 p.
Wang, Office Action Apr. 17, 2008, U.S. Appl. No. 11/183,199, filed Jul. 15, 2005, 41 p.
Wang, Final Office Action Oct. 9, 2007, U.S. Appl. No. 11/183,199, filed Jul. 15, 2005, 13 p.
Wang, Office Action Jan. 9, 2007, U.S. Appl. No. 11/183,199, filed Jul. 15, 2005, 15 p.
Randall, Examiner's Answer Jun. 9, 2010, U.S. Appl. No. 10/955,021, filed Sep. 30, 2004, 22 p.
Randall, Final Office Action Nov. 6, 2009, U.S. Appl. No. 10/955,021, filed Sep. 30, 2004, 25 p.
Randall, Office Action Apr. 1, 2009, U.S. Appl. No. 10/955,021, filed Sep. 30, 2004, 16 p.
Randall, Office Action Oct. 17, 2008, U.S. Appl. No. 10/955,021, filed Sep. 30, 2004, 16 p.
Randall, Office Action May 1, 2008, U.S. Appl. No. 10/955,021, filed Sep. 30, 2004, 18 p.
Daley, Corrected Examiner's Answer Nov. 1, 2011, U.S. Appl. No. 11/039,000, filed Jan. 18, 2005, 2 p.
Daley, Examiner's Answer Oct. 24, 2011, U.S. Appl. No. 11/039,000, filed Jan. 18, 2005, 20 p.
Daley, Final Office Action Feb. 17, 2011, U.S. Appl. No. 11/039,000, filed Jan. 18, 2005, 15 p.
Daley, Office Action Aug. 30, 2010, U.S. Appl. No. 11/039,000, filed Jan. 18, 2005, 15 p.
Daley, Final Office Action Nov. 27, 2009, U.S. Appl. No. 11/039,000, filed Jan. 18, 2005, 14 p.
Daley, Office Action May 28, 2009, U.S. Appl. No. 11/039,000, filed Jan. 18, 2005, 13 p.
Daley, Final Office Action Dec. 3, 2008, U.S. Appl. No. 11/039,000, filed Jan. 18, 2005, 15 p.
Daley, Office Action Jun. 5, 2008, U.S. Appl. No. 11/039,000, filed Jan. 18, 2005, 25 p.
Kapadekar, Examiner's Answer Mar. 2, 2011, U.S. Appl. No. 11/552,942, filed Oct. 25, 2006, 18 p.
Kapadekar, Final Office Action Jun. 11, 2010, U.S. Appl. No. 11/552,942, filed Oct. 25, 2006, 17 p.
Kapadekar, Office Action Oct. 30, 2009, U.S. Appl. No. 11/552,942, filed Oct. 25, 2006, 15 p.
Kapadekar, Final Office Action Jul. 24, 2009, U.S. Appl. No. 11/552,942, filed Oct. 25, 2006, 12 p.
Kapadekar, Office Action Jan. 14, 2009, U.S. Appl. No. 11/552,942, filed Oct. 25, 2006, 8 p.
Logan, Examiner's Answer Jul. 28, 2011, U.S. Appl. No. 11/500,734, filed Aug. 7, 2006, 2 p.
Logan, Examiner's Answer Jun. 28, 2011, U.S. Appl. No. 11/500,734, filed Aug. 7, 2006, 25 p.
Logan, Advisory Action Feb. 17, 2011, U.S. Appl. No. 11/500,734, filed Aug. 7, 2006, 2 p.
Logan, Office Action Sep. 29, 2010, U.S. Appl. No. 11/500,734, filed Aug. 7, 2006, 24 p.
Logan, Office Action Apr. 27, 2010, U.S. Appl. No. 11/500,734, filed Aug. 7, 2006, 23 p.
Logan, Final Office Action Dec. 14, 2009, U.S. Appl. No. 11/500,734, filed Aug. 7, 2006, 22 p.
Logan, Office Action Nov. 26, 2008, U.S. Appl. No. 11/500,734, filed Aug. 7, 2006, 20 p.
Rao, Examiner's Answer Jun. 28, 2011, U.S. Appl. No. 11/385,502, filed Mar. 21, 2006, 17 p.
Rao, Final Office Action Nov. 26, 2010, U.S. Appl. No. 11/385,502, filed Mar. 21, 2006, 11 p.

Rao, Office Action Jun. 25, 2010, U.S. Appl. No. 11/385,502, filed Mar. 21, 2006, 10 p.
Rao, Final Office Action Dec. 15, 2009, U.S. Appl. No. 11/385,502, filed Mar. 21, 2006, 10 p.
Rao, Office Action May 12, 2009, U.S. Appl. No. 11/385,502, filed Mar. 21, 2006, 9 p.
Motta, Final Office Action Nov. 19, 2012, U.S. Appl. No. 11/449,259, filed Jun. 7, 2006, 25 p.
Motta, Office Action Jul. 26, 2012, U.S. Appl. No. 11/449,259, filed Jun. 7, 2006, 20 p.
Motta, Decision on Appeal Jun. 20, 2012, U.S. Appl. No. 11/449,259, filed Jun. 7, 2006, 7 p.
Motta, Examiner's Answer Jul. 23, 2009, U.S. Appl. No. 11/449,259, filed Jun. 7, 2006, 28 p.
Motta, Interview Summary Feb. 12, 2009, U.S. Appl. No. 11/449,259, filed Jun. 7, 2006, 4 p.
Motta, Advisory Action Jan. 27, 2009, U.S. Appl. No. 11/449,259, filed Jun. 7, 2006, 3 p.
Motta, Final Office Action Nov. 13, 2008, U.S. Appl. No. 11/449,259, filed Jun. 7, 2006, 18 p.
Motta, Office Action Jul. 10, 2008, U.S. Appl. No. 11/449,259, filed Jun. 7, 2006, 22 p.
Motta, Examiner's Answer Nov. 25, 2011, U.S. Appl. No. 11/590,137, filed Oct. 30, 2006, 11 p.
Motta, Final Office Action Jul. 19, 2011, U.S. Appl. No. 11/590,137, filed Oct. 30, 2006, 11 p.
Motta, Office Action Mar. 11, 2011, U.S. Appl. No. 11/590,137, filed Oct. 30, 2006, 12 p.
Daley, Final Office Action Mar. 17, 2011, U.S. Appl. No. 11/676,997, filed Feb. 20, 2007, 34 p.
Daley, Office Action Aug. 17, 2010, U.S. Appl. No. 11/676,997, filed Feb. 20, 2007, 31 p.
Daley, Office Action Feb. 22, 2010, U.S. Appl. No. 11/676,997, filed Feb. 20, 2007, 27 p.
Motta, Interview Summary Apr. 12, 2012, U.S. Appl. No. 11/829,520, filed Jul. 27, 2007, 3 p.
Motta, Final Office Action Jan. 13, 2012, U.S. Appl. No. 11/829,520, filed Jul. 27, 2007, 27 p.
Motta, Interview Summary Nov. 29, 2011, U.S. Appl. No. 11/829,520, filed Jul. 27, 2007, 3 p.
Motta, Office Action Sep. 1, 2011, U.S. Appl. No. 11/829,520, filed Jul. 27, 2007, 14 p.
Daley, Examiner's Answer Nov. 2, 2010, U.S. Appl. No. 11/839,396, filed Aug. 15, 2007, 15 p.
Daley, Final Office Action May 25, 2010, U.S. Appl. No. 11/839,396, filed Aug. 15, 2007, 16 p.
Daley, Interview Summary Feb. 25, 2010, U.S. Appl. No. 11/839,396, filed Aug. 15, 2007, 3 p.
Daley, Office Action Dec. 21, 2009, U.S. Appl. No. 11/839,396, filed Aug. 15, 2007, 14 p.
Daley, Office Action Jul. 29, 2009, U.S. Appl. No. 11/839,396, filed Aug. 15, 2007, 23 p.
Rao, Final Office Action Sep. 21, 2012, U.S. Appl. No. 11/867,370, filed Oct. 4, 2007, 14 p.
Rao, Office Action May 3, 2012, U.S. Appl. No. 11/867,370, filed Oct. 4, 2007, 13 p.
Rao, Final Office Action Dec. 22, 2010, U.S. Appl. No. 11/867,370, filed Oct. 4, 2007, 10 p.
Rao, Office Action Sep. 3, 2010, U.S. Appl. No. 11/867,370, filed Oct. 4, 2007, 11 p.
Rao, Examiner's Answer Apr. 12, 2012, U.S. Appl. No. 11/871,867, filed Oct. 12, 2007, 14 p.
Rao, Final Office Action Oct. 11, 2011, U.S. Appl. No. 11/871,867, filed Oct. 12, 2007, 14 p.
Rao, Interview Summary Aug. 5, 2011, U.S. Appl. No. 11/871,867, filed Oct. 12, 2007, 4 p.
Rao, Office Action Apr. 29, 2011, U.S. Appl. No. 11/871,867, filed Oct. 12, 2007, 13 p.
Rao, Final Office Action Sep. 30, 2010, U.S. Appl. No. 11/871,867, filed Oct. 12, 2007, 14 p.
Rao, Office Action Mar. 25, 2010, U.S. Appl. No. 11/871,867, filed Oct. 12, 2007, 11 p.
Rao, Office Action Aug. 10, 2009, U.S. Appl. No. 11/871,867, filed Oct. 12, 2007, 14 p.
Chowdhary, Decision on Appeal Nov. 1, 2012, U.S. Appl. No. 11/005,312, filed Dec. 6, 2004, 8 p.
Chowdhary, Order Apr. 27, 2009, U.S. Appl. No. 11/005,312, filed Dec. 6, 2004, 3 p.
Chowdhary, Examiner's Answer Aug. 20, 2008, U.S. Appl. No. 11/005,312, filed Dec. 6, 2004, 28 p.
Chowdhary, Office Action Sep. 5, 2006, Nov. 1, 2012, U.S. Appl. No. 11/005,312, filed Dec. 6, 2004, 29 p.
Chowdhary, Final Office Action Mar. 21, 2007, U.S. Appl. No. 11/005,312, filed Dec. 6, 2004, 27 p.
Chowdhary, Office Action Jan. 11, 2008, U.S. Appl. No. 11/005,312, filed Dec. 6, 2004, 24 p.
Rao, Final Office Action Oct. 16, 2012, U.S. Appl. No. 13/350,355, filed Jan. 13, 2012, 18 p.
Rao, Office Action May 16, 2012, U.S. Appl. No. 13/350,355, filed Jan. 13, 2012, 28 p.
Okkonen, Office Action Dec. 28, 2005, U.S. Appl. No. 10/417,285, filed Apr. 15, 2003, 21 p.
Okkonen, Final Office Action May 1, 2006, U.S. Appl. No. 10/417,285, filed Apr. 15, 2003, 41 p.
Okkonen, Office Action Jan. 29, 2007, U.S. Appl. No. 10/417,285, filed Apr. 15, 2003, 41 p.
Okkonen, Office Action Aug. 6, 2007, U.S. Appl. No. 10/417,285, filed Apr. 15, 2003, 6 p.
Okkonen, Office Action Dec. 9, 2009, U.S. Appl. No. 11/650,777, filed Jan. 8, 2007, 17 p.
Okkonen, Final Office Action May 13. 2010, U.S. Appl. No. 11/650,777, filed Jan. 8, 2007, 24 p.
O'Neill, Office Action Jun. 26, 2006, U.S. Appl. No. 10/631,567, filed Jul. 31, 2003, 18 p.
O'Neill, Final Office Action Apr. 10, 2007, U.S. Appl. No. 10/631,567, filed Jul. 31, 2003, 31 p.
O'Neill, Office Action Jan. 14, 2008, U.S. Appl. No. 10/631,567, filed Jul. 31, 2003, 41 p.
O'Neill, Office Action Jul. 9, 2008, U.S. Appl. No. 10/631,567, filed Jul. 31, 2003, 14 p.
O'Neill, Final Office Action Jan. 22, 2009, U.S. Appl. No. 10/631,567, filed Jul. 31, 2003, 14 p.
Chen, Office Action Jan. 8, 2007, U.S. Appl. No. 10/646,324, filed Aug. 22, 2003, 9 p.
Chen, Office Action May 13, 2011, U.S. Appl. No. 11/923,383, filed Oct. 24, 2007, 22 p.
Chen, Final Office Action Nov. 10, 2011, U.S. Appl. No. 11/923,383, filed Oct. 24, 2007, 27 p.
O'Neill, Office Action Oct. 23, 2006, U.S. Appl. No. 10/654,149, filed Sep. 3, 2003, 13 p.
O'Neill, Office Action May 31, 2007, U.S. Appl. No. 10/654,149, filed Sep. 3, 2003, 13 p.
O'Neill, Final Office Action Dec. 13, 2007, U.S. Appl. No. 10/654,149, filed Sep. 3, 2003, 15 p.
O'Neill, Office Action Dec. 4, 2008, U.S. Appl. No. 10/654,149, filed Sep. 3, 2003, 14 p.
O'Neill, Final Office Action May 26, 2009, U.S. Appl. No. 10/654,149, filed Sep. 3, 2003, 15 p.
Rao, Office Action Feb. 7, 2007, U.S. Appl. No. 10/654,412, filed Sep. 3, 2003, 9 p.
Rao, Final Office Action Aug. 24, 2007, U.S. Appl. No. 10/654,412, filed Sep. 3, 2003, 13 p.
Rao, Office Action Mar. 5, 2008, U.S. Appl. No. 10/654,412, filed Sep. 3, 2003, 15 p.
Chen, Office Action Nov. 20, 2006, U.S. Appl. No. 10/646,319, filed Aug. 22, 2003, 8 p.
Chen, Office Action Aug. 16, 2011, U.S. Appl. No. 12/032,809, filed Feb. 18, 2008, 20 p.
Chen, Final Office Action Jan. 19, 2012, U.S. Appl. No. 12/032,809, filed Feb. 18, 2008, 24 p.
Rao, Office Action Aug. 16, 2006, U.S. Appl. No. 10/695,713, filed Oct. 29, 2003, 12 p.
Rao, Final Office Action Dec. 20, 2006, U.S. Appl. No. 10/695,713, filed Oct. 29, 2003, 13 p.

Rao, Office Action Oct. 21, 2009, U.S. Appl. No. 11/688,820, filed Mar. 20, 2007, 10 p.
Rao, Final Office Action May 3, 2010, U.S. Appl. No. 11/688,820, filed Mar. 20, 2007, 14 p.
Rao, Office Action Dec. 30, 2004, U.S. Appl. No. 10/689,309, filed Oct. 20, 2003, 5 p.
Rao, Office Action Jun. 24, 2009, U.S. Appl. No. 11/251,046, filed Oct. 14, 2005, 8 p.
Lilley, Office Action Oct. 24, 2006, U.S. Appl. No. 10/681,861, filed Oct. 8, 2003, 24 p.
Lilley, Final Office Action Jul. 23, 2007, U.S. Appl. No. 10/681,861, filed Oct. 8, 2003, 18 p.
Lilley, Office Action Nov. 16, 2007, U.S. Appl. No. 10/681,861, filed Oct. 8, 2003, 18 p.
Lilley, Final Office Action Jun. 16, 2008, U.S. Appl. No. 10/681,861, filed Oct. 8, 2003, 24 p.
O'Neill, Office Action Mar. 22, 2007, U.S. Appl. No. 10/721,658, filed Nov. 25, 2003, 14 p.
O'Neill, Final Office Action Sep. 25, 2007, U.S. Appl. No. 10/721,658, filed Nov. 25, 2003, 9 p.
O'Neill, Final Office Action Feb. 20, 2008, U.S. Appl. No. 10/721,658, filed Nov. 25, 2003, 13 p.
Rao, Office Action Oct. 5, 2004, U.S. Appl. No. 10/701,848, filed Nov. 5, 2003, 12 p.
Rao, Final Office Action May 5, 2005, U.S. Appl. No. 10/701,848, filed Nov.5, 2003, 14 p.
Rao, Office Action Nov. 23, 2005, U.S. Appl. No. 10/701,848, filed Nov. 5, 2003, 13 p.
Rao, Final Office Action Aug. 15, 2006, U.S. Appl. No. 10/701,848, filed Nov. 5, 2003, 16 p.
Rao, Office Action Nov. 14, 2006, U.S. Appl. No. 10/706,219, filed Nov. 12, 2003, 12 p.
Rao, Final Office Action May 2, 2007, U.S. Appl. No. 10/706,219, filed Nov. 12, 2003, 17 p.
Rao, Office Action Dec. 13, 2007, U.S. Appl. No. 10/706,219, filed Nov. 12, 2003, 13 p.
Rao, Office Action Jun. 25, 2008, U.S. Appl. No. 10/706,219, filed Nov. 12, 2003, 10 p.
Rao, Final Office Action Jan. 6, 2009, U.S. Appl. No. 10/706,219, filed Nov. 12, 2003, 16 p.
Rao, Office Action Jul. 22, 2009, U.S. Appl. No. 10/706,219, filed Nov. 12, 2003, 6 p.
Rao, Office Action Mar. 26, 2009, U.S. Appl. No. 11/401,708, filed Apr. 11, 2006, 20 p.
Rao, Office Action Aug. 9, 2005, U.S. Appl. No. 10/695,524, filed Oct. 28, 2003, 19 p.
Chia, Office Action May 28, 2008, U.S. Appl. No. 10/719,114, filed Nov. 21, 2003, 10 p.
Chia, Final Office Action Dec. 2, 2008, U.S. Appl. No. 10/719,114, filed Nov. 21, 2003, 8 p.
Chia, Final Office Action May 4, 2009, U.S. Appl. No. 10/719,114, filed Nov. 21, 2003, 11 p.
Chia, Office Action Aug. 19, 2009, U.S. Appl. No. 10/719,114, filed Nov. 21, 2003, 8 p.
Chia, Final Office Action Mar. 17, 2010, U.S. Appl. No. 10/719,114, filed Nov. 21, 2003, 9 p.
Jacobi, Office Action Dec. 10, 2004, U.S. Appl. No. 10/697,458, filed Oct. 30, 2003, 16 p.
Jacobi, Final Office Action Jun. 14, 2005, U.S. Appl. No. 10/697,458, filed Oct. 30, 2003, 16 p.
Gustafson, Office Action Mar. 4, 2008, U.S. Appl. No. 10/761,735, filed Jan. 20, 2004, 25 p.
Gustafson, Office Action Sep. 8, 2008, U.S. Appl. No. 10/761,735, filed Jan. 20, 2004, 25 p.
Gustafson, Final Office Action Mar. 20, 2009, U.S. Appl. No. 10/761,735, filed Jan. 20, 2004, 27 p.
Rao, Office Action Sep. 25, 2008, U.S. Appl. No. 11/083,596, filed Mar. 18, 2005, 7 p.
Rao, Office Action Oct. 19, 2004, U.S. Appl. No. 10/765,817, filed Jan. 27, 2004, 8 p.
Rao, Office Action Feb. 4, 2008, U.S. Appl. No. 10/782,083, filed Feb. 19, 2004, 21 p.
Rao, Final Office Action Jul. 15, 2008, U.S. Appl. No. 10/782,083, filed Feb. 19, 2004, 25 p.
Gustafson, Office Action Jul. 24, 2007, U.S. Appl. No. 10/790,340, filed Mar. 1, 2004, 21 p.
Gustafson, Office Action Jun. 12, 2008, U.S. Appl. No. 10/790,340, filed Mar. 1, 2004, 20 p.
Gustafson, Office Action Dec. 23, 2008, U.S. Appl. No. 10/790,340, filed Mar. 1, 2004, 21 p.
Gustafson, Final Office Action Jul. 6, 2009, U.S. Appl. No. 10/790,340, filed Mar. 1, 2004, 21 p.
Lilley, Final Office Action Jul. 25, 2007, U.S. Appl. No. 10/646,975, filed Aug. 22, 2003, 13 p.
Lilley, Office Action Oct. 31, 2007, U.S. Appl. No. 10/646,975, filed Aug. 22, 2003, 15 p.
Lilley, Final Office Action Apr. 16, 2008, U.S. Appl. No. 10/646,975, filed Aug. 22, 2003, 14 p.
Rao, Office Action Jun. 30, 2006, U.S. Appl. No. 10/797,176, filed Mar. 10, 2004, 15 p.
Rao, Final Office Action Jul. 17, 2007, U.S. Appl. No. 10/797,176, filed Mar. 10, 2004, 26 p.
Rao, Final Office Action Oct. 31, 2007, U.S. Appl. No. 10/797,176, filed Mar. 10, 2004, 29 p.
Rao, Office Action Apr. 14, 2008, U.S. Appl. No. 10/797,176, filed Mar. 10, 2004, 31p.
Rao, Office Action Oct. 16, 2008, U.S. Appl. No. 10/797,176, filed Mar. 10, 2004, 33 p.
Rao, Final Office Action Nov. 25, 2009, U.S. Appl. No. 10/797,176, filed Mar. 10, 2004, 41 p.
Rao, Final Office Action Aug. 19, 2010, U.S. Appl. No. 10/797,176, filed Mar. 10, 2004, 5 p.
Okkonnen, Office Action Feb. 28, 2005, U.S. Appl. No. 10/807,694, filed Mar. 24, 2004, 18 p.
Okkonnen, Final Office Action Aug. 10, 2005, U.S. Appl. No. 10/807,694, filed Mar. 24, 2004, 17 p.
Okkonen, Office Action Mar. 14, 2006, U.S. Appl. No. 10/807,694, filed Mar. 24, 2004, 21 p.
Okkonen, Office Action Oct. 24, 2006, U.S. Appl. No. 10/807,694, filed Mar. 24, 2004, 16 p.
Okkonen, Office Action Jul. 10, 2007, U.S. Appl. No. 10/807,694, filed Mar. 24, 2004, 19 p.
Okkonen, Final Office Action Dec. 18, 2007, U.S. Appl. No. 10/807,694, filed 03/64/04, 22 p.
Okkonen, Office Action May 12, 2008, U.S. Appl. No. 10/807,694, filed Mar. 24, 2004, 22 p.
Okkonen, Final Office Action Nov. 20, 2008, U.S. Appl. No. 10/807,694, filed Mar. 24, 2004, 22 p.
Okkonen, Office Action Jun. 25, 2009, U.S. Appl. No. 10/807,694, filed Mar. 24, 2004, 34 p.
McGhee, Office Action Sep. 27, 2006, U.S. Appl. No. 10/797,825, filed Mar. 10, 2004, 7 p.
McGhee, Final Office Action Jun. 25, 2007, U.S. Appl. No. 10/797,825, filed Mar. 10, 2004, 6 p.
Yang, Office Action Jan. 28, 2008, U.S. Appl. No. 10/802,191, filed Mar. 17, 2004, 18 p.
Yang, Final Office Action Jun. 6, 2008, U.S. Appl. No. 10/802,191, filed Mar. 17, 2004, 19 p.
Yang, Office Action Sep. 5, 2008, U.S. Appl. No. 10/802,191, filed Mar. 17, 2004, 16 p.
Qumei, Final Office Action Nov. 23, 2007, U.S. Appl. No. 10/813,212, filed Mar. 30, 2004, 11 p.
Yang, Office Action Sep. 21, 2006, U.S. Appl. No. 10/635,991, filed Aug. 7, 2003, 10 p.
Yang, Office Action Jun. 2, 2010, U.S. Appl. No. 12/014,549, filed Jan. 15, 2008, 8 p.
Yang, Final Office Action Sep. 16, 2010, U.S. Appl. No. 12/014,549, filed Jan. 15, 2008, 7 p.
Yang, Office Action Nov. 2, 2006, U.S. Appl. No. 10/887,490, filed Jul. 8, 2004, 12 p.
Yang, Final Office Action Apr. 17, 2007, U.S. Appl. No. 10/887,490, filed Jul. 8, 2004, 13 p.
Marolia, Final Office Action Jan. 30, 2008, U.S. Appl. No. 10/852,396, filed May 24, 2004, 17 p.

Marolia, Office Action May 28, 2008, U.S. Appl. No. 10/852,396, filed May 24, 2004, 20 p.
Marolia, Office Action Dec. 8, 2008, U.S. Appl. No. 10/852,396, filed May 24, 2004, 19 p.
Marolia, Final Office Action Jun. 17, 2009, U.S. Appl. No. 10/852,396, filed May 24, 2004, 24 p.
Marolia, Office Action Dec. 14, 2009, U.S. Appl. No. 10/852,396, filed May 24, 2004, 19 p.
Marolia, Office Action Jun. 3, 2005, U.S. Appl. No. 10/888,841, filed Jul. 9, 2004, 8 p.
Marolia, Final Office Action Dec. 6, 2005, U.S. Appl. No. 10/888,841, filed Jul. 9, 2004, 10 p.
Marolia, Office Action May 4, 2006, U.S. Appl. No. 10/888,841, filed Jul. 9, 2004, 13 p.
Marolia, Final Office Action Jan. 12, 2007, U.S. Appl. No. 10/888,841, filed Jul. 9, 2004, 15 p.
Marolia, Office Action Jun. 18, 2007, U.S. Appl. No. 10/888,841, filed Jul. 9, 2004, 16 p.
Marolia, Final Office Action Nov. 27, 2007, U.S. Appl. No. 10/888,841, filed Jul. 9, 2004, 17 p.
Marolia, Office Action Apr. 28, 2009, U.S. Appl. No. 10/888,841, filed Jul. 9, 2004, 15 p.
Qumei, Office Action Apr. 21, 2008, U.S. Appl. No. 10/864,095, filed Jun. 9, 2004, 15 p.
Marolia, Office Action Dec. 11, 2007, U.S. Appl. No. 10/879,869, filed Jun. 28, 2004, 10 p.
Marolia, Final Office Action May 30, 2008, U.S. Appl. No. 10/879,869, filed Jun. 28, 2004, 15 p.
Marolia, Office Action Aug. 18, 2008, U.S. Appl. No. 10/879,869, filed Jun. 28, 2004, 17 p.
Marolia, Final Office Action Jan. 28, 2009, U.S. Appl. No. 10/879,869, filed Jun. 28, 2004, 18 p.
Rao, Office Action Jul. 25, 2007, U.S. Appl. No. 10/860,964, filed Jun. 4, 2004, 22 p.
Rao, Final Office Action Jan. 7, 2008, U.S. Appl. No. 10/860,964, filed Jun. 4, 2004, 26 p.
Rao, Office Action Apr. 30, 2008, U.S. Appl. No. 10/860,964, filed Jun. 4, 2004, 23 p.
Rao, Final Office Action Oct. 28, 2008, U.S. Appl. No. 10/860,964, filed Jun. 4, 2004, 29 p.
Yang, Office Action Jun. 27, 2007, U.S. Appl. No. 10/860,978, filed Jun. 4, 2004, 14 p.
Yang, Final Office Action Dec. 7, 2007, U.S. Appl. No. 10/860,978, filed Jun. 4, 2004, 16 p.
Yang, Office Action Jun. 20, 2008, U.S. Appl. No. 10/860,978, filed Jun. 4, 2004, 13 p.
Yang, Office Action Dec. 23, 2008, U.S. Appl. No. 10/860,978, filed Jun. 4, 2004, 13 p.
Yang, Final Office Action Jun. 19, 2009, U.S. Appl. No. 10/860,978, filed Jun. 4, 2004, 16 p.
Rao, Office Action Aug. 24, 2007, U.S. Appl. No. 10/868,050, filed Jun. 15, 2004, 15 p.
Rao, Office Action Feb. 4, 2008, U.S. Appl. No. 10/868,050, filed Jun. 15, 2004, 16 p.
Rao, Final Office Action Aug. 6, 2008, U.S. Appl. No. 10/868,050, filed Jun. 15, 2004, 18 p.
Rao, Office Action Apr. 15, 2008, U.S. Appl. No. 10/899,513, filed Jul. 26, 2004, 14 p.
Rao, Final Office Action Oct. 24, 2008, U.S. Appl. No. 10/899,513, filed Jul. 26, 2004, 16 p.
Rao, Office Action Jun. 11, 2007, U.S. Appl. No. 10/902,452, filed Jul. 29, 2004, 13 p.
Rao, Final Office Action Dec. 20, 2007, U.S. Appl. No. 10/902,452, filed Jul. 29, 2004, 10 p.
Rao, Office Action Jun. 23, 2008, U.S. Appl. No. 10/902,425, filed Jul. 29, 2004, 14 p.
Rao, Office Action Jan. 5, 2009, U.S. Appl. No. 10/902,452, filed Jul. 29, 2004, 16 p.
Rao, Final Office Action Jul. 20, 2009, U.S. Appl. No. 10/902,452, filed Jul. 29, 2004, 16 p.
Rao, Office Action May 13, 2010, U.S. Appl. No. 10/902,452, filed Jul. 29, 2004, 16 p.
Qumei, Office Action Jul. 12, 2007, U.S. Appl. No. 10/909,519, filed Aug. 2, 2004, 17 p.
Qumei, Final Office Action Dec. 20, 2007, U.S. Appl. No. 10/909,519, filed Aug. 2, 2004, 11 p.
Qumei, Office Action May 29, 2008, U.S. Appl. No. 10/909,519, filed Aug. 2, 2004, 21 p.
Qumei, Final Office Action Nov. 17, 2008, U.S. Appl. No. 10/909,519, filed Aug. 2, 2004, 24 p.
Qumei, Office Action Apr. 28, 2009, U.S. Appl. No. 10/909,519, filed Aug. 2, 2004, 23 p.
Chen, Office Action May 14, 2008, U.S. Appl. No. 10/932,175, filed Sep. 1, 2004, 18 p.
Chen, Final Office Action Feb. 6, 2009, U.S. Appl. No. 10/932,175, filed Sep. 1, 2004, 15 p.
Chen, Office Action Mar. 1, 2010, U.S. Appl. No. 10/932,175, filed Sep. 1, 2004, 16 p.
Chen, Final Office Action Sep. 21, 2010, U.S. Appl. No. 10/932,175, filed Sep. 1, 2004, 17 p.
Okkonen, Office Action Jan. 5, 2007, U.S. Appl. No. 10/945,466, filed Sep. 20, 2004, 5 p.
Okkonen, Office Action Aug. 10, 2007, U.S. Appl. No. 10/945,466, filed Sep. 20, 2004, 5 p.
Okkonen, Final Office Action Jan. 9, 2008, U.S. Appl. No. 10/945,466, filed Sep. 20, 2004, 7 p.
Okkonen, Office Action May 12, 2008, U.S. Appl. No. 10/945,466, filed Sep. 20, 2004, 6 p.
Okkonen, Office Action Nov. 12, 2008, U.S. Appl. No. 10/945,466, filed Sep. 20, 2004, 5 p.
Okkonen, Office Action Apr. 14, 2009, U.S. Appl. No. 10/945,466, filed Sep. 20, 2004, 5 p.
Rao, Office Action Aug. 27, 2007, U.S. Appl. No. 10/950,764, filed Sep. 27, 2004, 14 p.
Rao, Final Office Action Mar. 4, 2008, U.S. Appl. No. 10/950,746, filed Sep. 27, 2004, 17 p.
Rao, Office Action Nov. 3, 2008, U.S. Appl. No. 10/950,764, filed Sep. 27, 2004, 12 p.
Rao, Final Office Action Jun. 30, 2009, U.S. Appl. No. 10/950,764, filed Sep. 27, 2004, 15 p.
Chen, Office Action Jan. 29, 2008, U.S. Appl. No. 10/958,148, filed Oct. 4, 2004, 16 p.
Chen, Final Office Action Aug. 20, 2008, U.S. Appl. No. 10/958,148, filed Oct. 4, 2004, 19 p.
Chen, Office Action Apr. 14, 2009, U.S. Appl. No. 10/958,148, filed Oct. 4, 2004, 11 p.
Chen, Final Office Action Nov. 25, 2009, U.S. Appl. No. 10/958,148, filed Oct. 4, 2004, 12 p.
Chen, Office Action Apr. 1, 2010, U.S. Appl. No. 10/958,148, filed Oct. 4, 2004, 13 p.
Gustafson, Office Action Sep. 11, 2007, U.S. Appl. No. 11/010,913, filed Dec. 13, 2004, 27 p.
Gustafson, Office Action Feb. 1, 2008, U.S. Appl. No. 11/010,913, filed Dec. 13, 2004, 29 p.
Gustafson, Final Office Action Feb. 18, 2010, U.S. Appl. No. 11/010,913, filed Dec. 13, 2004, 31 p.
Ren, Office Action Jan. 22, 2008, U.S. Appl. No. 10/989,628, filed Nov. 16, 2004, 8 p.
Ren, Office Action Aug. 18, 2008, U.S. Appl. No. 10/989,628, filed Nov. 16, 2004, 7 p.
Ren, Final Office Action Nov. 24, 2009, U.S. Appl. No. 10/989,628, filed Nov. 16, 2004, 9 p.
Slyz, Office Action Mar. 1, 2010, U.S. Appl. No. 11/874,102, filed Oct. 17, 2007, 13 p.
Qumei, Office Action Apr. 9, 2007, U.S. Appl. No. 10/698,665, filed Oct. 30, 2003, 22 p.
Qumei, Office Action Jul. 29, 2010, U.S. Appl. No. 11/852,933, filed Sep. 10, 2007, 14 p.
Qumei, Final Office Action Feb. 17, 2011, U.S. Appl. No. 11/852,933, filed Sep. 10, 2007, 19 p.
Chen, Office Action Apr. 19, 2007, U.S. Appl. No. 10/903,394, filed Jul. 30, 2004, 31 p.
Chen, Final Office Action Oct. 18, 2007, U.S. Appl. No. 10/903,394, filed Jul. 30, 2004, 34 p.

Chen, Office Action May 13, 2008, U.S. Appl. No. 10/903,394, filed Jul. 30, 2004, 14 p.
Chen, Office Action Nov. 26, 2008, U.S. Appl. No. 10/903,394, filed Jul. 30, 2004, 14 p.
Chen, Final Office Action Apr. 21, 2009, U.S. Appl. No. 10/903,394, filed Jul. 30, 2004, 21 p.
Chen, Office Action Oct. 30, 2009, U.S. Appl. No. 10/903,394, filed Jul. 30, 2004, 19 p.
Chen, Final Office Action Apr. 29, 2010, U.S. Appl. No. 10/903,394, filed Jul. 30, 2004, 24 p.
Rao, Office Action Feb. 4, 2008, U.S. Appl. No. 11/047,212, filed Jan. 31, 2005, 9 p.
Rao, Final Office Action Sep. 3, 2008, U.S. Appl. No. 11/047,212, filed Jan. 31, 2005, 8 p.
Rao, Office Action Feb. 2, 2009, U.S. Appl. No. 11/047,212, filed Jan. 31, 2005, 8 p.
Rao, Final Office Action Sep. 25, 2009, U.S. Appl. No. 11/047,212, filed Jan. 31, 2005, 9 p.
Rao, Office Action Jan. 22, 2010, U.S. Appl. No. 11/047,212, filed Jan. 31, 2005, 9 p.
Rao, Final Office Action Jun. 10, 2010, U.S. Appl. No. 11/047,212, filed Jan. 31, 2005, 11 p.
Rao, Office Action Jan. 14, 2011, U.S. Appl. No. 11/047,212, filed Jan. 31, 2005, 9 p.
Kokkinen, Office Action Feb. 23, 2007, U.S. Appl. No. 10/688,640, filed Oct. 17, 2003, 23 p.
Kokkinen, Office Action Aug. 21, 2007, U.S. Appl. No. 10/688,640, filed Oct. 17, 2003, 23 p.
Kokkinen, Office Action Jul. 18, 2008, U.S. Appl. No. 10/688,640, filed Oct. 17, 2003, 28 p.
Kokkinen, Office Action Dec. 30, 2008, U.S. Appl. No. 10/688,640, filed Oct. 17, 2003, 29 p.
Kokkinen, Office Action Jul. 21, 2009, U.S. Appl. No. 10/688,640, filed Oct. 17, 2003, 30 p.
Kokkinen, Office Action Feb. 24, 2010, U.S. Appl. No. 10/688,640, filed Oct. 17, 2003, 33 p.
Kokkinen, Office Action Aug. 6, 2010, U.S. Appl. No. 10/688,640, filed Oct. 17, 2003, 26 p.
Okkonen, Office Action Apr. 19, 2007, U.S. Appl. No. 10/788,768, filed Feb. 27, 2004, 14 p.
Okkonen, Final Office Action Oct. 2, 2007, U.S. Appl. No. 10/788,768, filed Feb. 27, 2004, 18 p.
Okkonen, Office Action Mar. 20, 2008, U.S. Appl. No. 10/788,768, filed Feb. 27, 2004, 16 p.
Okkonen, Office Action Oct. 2, 2008, U.S. Appl. No. 10/788,768, filed Feb. 27, 2004, 17 p.
Okkonen, Final Office Action Apr. 14, 2009, U.S. Appl. No. 10/788,768, filed Feb. 27, 2004, 18 p.
Qumei, Final Office Action Sep. 7, 2007, U.S. Appl. No. 10/770,983, filed Feb. 3, 2004, 15 p.
Qumei, Office Action Jan. 25, 2008, U.S. Appl. No. 10/770,983, filed Feb. 3, 2004, 18 p.
Qumei, Office Action Jul. 3, 2008, U.S. Appl. No. 10/770,983, filed Feb. 3, 2004, 22 p.
Qumei, Office Action Dec. 19, 2008, U.S. Appl. No. 10/770,983, filed Feb. 3, 2004, 19 p.
Qumei, Final Office Action Jun. 11, 2009, U.S. Appl. No. 10/770,983, filed Feb. 3, 2004, 21 p.
Hamasaki, Office Action Jan. 9, 2008, U.S. Appl. No. 10/748,053, filed Dec. 30, 03, 18 p.
Hamasaki, Final Office Action Aug. 20, 2008, U.S. Appl. No. 10/748,053, filed Dec. 30, 2003, 21 p.
Hamasaki, Office Action Feb. 27, 2009, U.S. Appl. No. 10/748,053, filed Feb. 30, 2003, 19 p.
Hamasaki, Final Office Action Sep. 11, 2009, U.S. Appl. No. 10/748,053, filed Dec. 30, 2003, 19 p.
Hamasaki, Final Office Action May 17, 2010, U.S. Appl. No. 10/748,053, filed Dec. 30, 2003, 21 p.
Rao, Office Action Feb. 6, 2009, U.S. Appl. No. 10/754,378, filed Jan. 9, 2004, 14 p.
Rao, Final Office Action Jul. 13, 2009, U.S. Appl. No. 10/754,378, filed Jan. 9, 2004, 25 p.
Rao, Office Action May 17, 2010, U.S. Appl. No. 10/754,378, filed Jan. 9, 2004, 43 p.
Marolia, Office Action Oct. 17, 2006, U.S. Appl. No. 10/754,313, filed Jan. 9, 2004, 16 p.
Marolia, Office Action Feb. 20, 2008, U.S. Appl. No. 10/754,313, filed Jan. 9, 2004, 11 p.
Gustafson, Office Action Jan. 4, 2007, U.S. Appl. No. 10/756,103, filed Jan. 13, 2004, 10 p.
Gustafson, Office Action Aug. 10, 2007, U.S. Appl. No. 10/756,103, filed Jan. 13, 2004, 11 p.
Gustafson, Office Action Jan. 22, 2008, U.S. Appl. No. 10/756,103, filed Jan. 13, 2004, 11 p.
Gustafson, Office Action Jul. 8, 2009, U.S. Appl. No. 10/756,103, filed Jan. 13, 2004, 21 p.
Gustafson, Final Office Action filed Dec. 18, 2009, U.S. Appl. No. 10/756,103, filed Jan. 13, 2004, 22 p.
Chen, Office Action Jul. 23, 2007, U.S. Appl. No. 10/646,230, filed Aug. 22, 2003, 14 p.
Chen, Final Office Action Dec. 28, 2007, U.S. Appl. No. 10/646,230, filed Aug. 22, 2003, 14 p.
Chen, Office Action Dec. 23, 2008, U.S. Appl. No. 10/646,230, filed Aug. 22, 2003, 25 p.
Chen, Final Office Action May 27, 2009, U.S. Appl. No. 10/646,230, filed Aug. 22, 2003, 28 p.
Chen, Office Action Dec. 2, 2009, U.S. Appl. No. 10/646,230, filed Aug. 22, 2003, 15 p.
Chen, Office Action May 27, 2010, U.S. Appl. No. 10/646,230, filed Aug. 22, 2003, 17 p.
Chen, Final Office Action Nov. 10, 2010, U.S. Appl. No. 10/646,230, filed Aug. 22, 2003, 17 p.
Chen, Office Action Aug. 23, 2011, U.S. Appl. No. 10/646,230, filed Aug. 22, 2003, 6 p.
Marolia, Office Action Aug. 17, 2007, U.S. Appl. No. 10/852,396, filed May 24, 2004, 17 p.
Qumei, Office Action Jun. 20, 2007, U.S. Appl. No. 10/813,212, filed Mar. 30, 2004, 10 p.
Chen, Office Action Jun. 12, 2008, U.S. Appl. No. 10/646,230, filed Aug. 22, 2003, 14 p.
Chen, Office Action Dec. 7, 2005, U.S. Appl. No. 10/411,784, filed Apr. 11, 2003, 15 p.
Chen, Final Office Action Nov. 6, 2007, U.S. Appl. No. 11/125,974, filed May 9, 2005, 10 p.
Gustafson, Office Action Jan. 22, 2009, U.S. Appl. No. 10/756,103, filed Jan. 13, 2004, 15.p.
Qumei, Office Action, Apr. 13, 2007, U.S. Appl. No. 10/770,983, filed Feb. 3, 2004, 11 .p.
Muller, N. J., "Focus on OpenView a guide to Hewlett-Packard's Network and Systems Management Platform," pp. 1-291, CBM Books, published 1995.
ILOG, "ILOG Delivers Enterprise-Wide Business Rule Management with ILOG Jrules 4.5," Press Release [Online] <http://www.ilog.com/corporate/releases/us/030610_jrules45.cfm>.
ILOG, "ILOG Jrules—Complete business rule management," [Online] <http://www.ilog.com/products/jrules/datasheet> (May 2003).
Verbauwhede et al., "Low power DSP's for wireless communications (embedded tutorial session)", Aug. 2000, pp. 303-310. [Online] <http://delivery.acm.org/10.1145/350000/344647/p303-verbauwhede. pdf>.
"Over the Air User Initiated Provisioning Recommended Practice for the Mobile Information Device Profile", Version 1.0, May 7, 2001.
Oma, "SyncML Device Management Tree and Description, Version 1.1.2," Dec. 2, 2003, pp. 1-44.
Lucent Technologies, "Wireless Intelligent Network Over-the-Air Service Provisioning," Technical Brochure, [Online] <http://www.lucent.com/livelink/146175-Brochure.pdf>, 1997.
3GPP2 C:R1001-A 2.0: Administration of Parameter Value Assignments for cdma2000 Spread Spectrum Standards, Release A: Jul. 14, 2000.
Albright, Brian, "Managing the force: Planning makes the difference," Frontline Solutions, Jan. 2001, retrieved from scholar.google.com search Jun. 15, 2006.

Bailey, E. C., "Maximum RPM: Taking the Red Hat Package Manager to the Limit," Copyright 2000 by Red Hat, Inc., 14 p.
Baker et al., "Compressing Differences of Executable Code," Apr. 22, 1999.
Bokun et al. (Active Badges—The Next Generation, Linux Journa, Oct. 1998, Issue 54).
Brown, Michael et al., PGP in Constrined Wireless Devices, 1-23, 9th USENIX Security Symposium Paper 2000, retrieved Apr. 16, 2007.
Burns et al., "In-Place Reconstruction of Delta Compressed Files," Univ of California, Santa Cruz, darrell@cs.scsc.edu; 12 pgs.
Ortiz, C. Enrique, "Introduction to OTA Application Provisioning," Nov. 2002, [Online] http://developers.sun.com/techtopics/mobility/midparticles/ota/ retrieved on Mar. 29, 2007.
Microsoft, "Computer Dictionary," Microsoft Press Third Edition, pp. 88, 190, 1997.
Deitel & Deitel, "C How to Program," 1994, Prentice-Hall, Inc., Second Edition, Chapter 5.
Digital Cellular Telecomminications System (Phase 2+) AT Command Set for GSM Mobile Equipment (ME) (GSM 07.07 version 7.4.0 Release 1998), ETSI TS 100 916 V7.4.0 (Nov. 1999), 126 p.
Engstrom, Don, "Two Clicks to a Rejuvenated Mac: A Review of UpdateAgent—CD Edition," Feb. 20, 2002, pp. 1-3.
Eppstein, D., "Fast Hierarchical Clustering and Other Applications of Dynamic Closest Pairs," Jan. 31, 2001, pp. 1-10. [Online] http://www.ics.uci.edu/-eppstein/projects/pairs/Papers/Epp-SODA-98.pdf>.
Euroloader, "Technical Specification" Dec. 2001, ECCA Euroloader Specificaion, pp. 1-60.
Fowler et al., "Lossless Compression of Volumne Data," 1995, IEEE, pp. 43-50.
Funambol Inc., "Funambol DM Server Developer's Guide Version 3.0," Sep. 2006.
Guanluca, Moro, "On the Event Coordination in Multi-Component Systems," published 2002, pp. 315-322.
Hicks et al., Dynamic Software Updating, Jun. 2001. [Online] <citeseer.ist.psu.edu/336947.html>.
IEEE Lan Man Standards Committee, "Draft Amendment to IEEE Standard for Local and Metropolitan Area Networks; Part 16: Air Interface for Fixed and Mobile Broadband Wireless Access Systems—Amendment to IEE Standards for Local and Metorpolitian Area Networks—Management Plane Procedures and Services," IEEE Draft Standards, No. 802. 16g-04/03, Dec. 2004, pp. 1-8, XP002469853.
Jansen et al., "Approx 2000, LNCS 1913," pp. 84-95, 2000, Springer-Verlag, Berlin Heidelberg 2000.
Luculli, Gabriele, "Efficient and Effective Simulation of Memory Maps for System-on-Chip," 11th IEEE Int'l. Conference and Workshop on the Engineering of Computer Baseed Systems, May 24-27, 2004, pp. 242-247.
Open Mobile Alliance, "Firmware Update Management Object," 2006.
Open Mobile Alliance, "OMA Device Management Security," Jul. 2005, Candidate Version 1.2.
Open Mobile Alliance, "SyncML Device Management Bootstrap," 2003.
Open Mobile Alliance, "Firmware Update Management Object," OMA-DM-V0_14-Oct. 28, 2004-D.
Open Mobile Alliance, "OMA Device Management Tree and Description_ver 1.2," Jun. 15, 2005 (OMA-TS-DM-TND-V1_2-20050615-C).
Paila et al. "FLUTE-File Delivery Over Unidirectional Transport," Network Working Group Request for Comments; 3926 Category; Experimental; Oct. 2004.
"Part 16: Air Interface for Fixed Broadband Wireless Access Systems," Sep. 22, 2005, pp. 1-257, XP007904329.
"Problem Tracking Task Reference," Continuus Software Corporation, Whole Manual, Part No. PTTR-041-011, 1996.
Riel, "Object-Oriented Design Heuristics," Apr. 30, 1996, Addison-Wesley Professional, Section 10.1.
Rodriguez et al., "TCP/IP Tutorial and Technical Overview," Copyright 2002, pp. 489-490.
Shapira et al., "In Place Differential File Compression," The Author 2005; Published by Oxford University Press on behalf of the British Computer Society; Advance Access published on Aug. 26, 2005; 15 p.
Starlin, Mark, UpdateAgent 8, Nov. 19, 2002, pp. 1-2.
Symbian, "Symbian OS powered Sony Ericsson P800 Smartphone to ship in Q32003" Mar. 2002 pp. 1-2.
Tansley, "Linux and Unix Shell Programming," Dec. 27, 1999, Addison-Wesley Professional, 2 p.
The Mac Observer, Update Agent Scouts Out an Update for Itself, May 9, 2000, pp. 1-3.
TIA/EIA/IS-683-A: Over-the-Air Service Provisioning of Mobile Stations in Spread Spectrum Systems: May 1998.
Veeraraghavan et al., "A distributed control strategy for wireless ATM networks," pp. 323-339, Wireless Networks 1995, retrieved from ACM database search Jun. 15, 2006.
Yang et al., "Reuse Linux Device Drivers in Embedded Systems," 1998 International Computer Symposium Workshop on Software Engineering and Database Systems Dec. 17-19, 1998.
Yau et al., "An approach to distributed component-based real-time application software development," 1998, pp. 275-283.

* cited by examiner

FIG. 5

CENTRALIZED RULES REPOSITORY FOR SMART PHONE CUSTOMER CARE

Priority is claimed to U.S. Provisional Patent Application No. 60/602,017, filed in the U.S. Patent and Trademark Office on Aug. 17, 2004.

BACKGROUND

Recent advances in mobile wireless devices and telecommunications networks have permitted significant computing power to become available at the end user's device. With the proliferation of next generation smartphones and wireless PDAs, significant intelligence can be pushed out to the subscriber terminal. In addition, mobile data networks have been deployed around the world. These networks provide fast reliable packet data to subscriber's mobile devices. At the same time, intelligent mobile devices (smartphones) have emerged as capable computing platforms with considerable processing power, onboard storage and memory.

Smartphones are devices running feature rich operating systems such as Symbian, PalmOS, Microsoft WinCE, BREW (Binary Runtime Environment for Wireless) and Java MIDP compliant devices. Due to the complex nature and multitude of new features, these smartphone devices are difficult to configure; compounded with limited keyboards, entering information such as personal details and configuration settings is not only difficult but also highly prone to human errors. A combination of feature complexity and configuration requirements has increased the difficulty of providing customer support for these types of devices.

With the wide availability of downloadable services and applications available for smartphone users, and the increasing costs of customer care, ensuring efficient and less-cumbersome support when problems arise is an increasing necessity. In contrast to traditional customer service applications that are available in contact centers today, CSRs (Customer Service Representatives) must undertake the extensive and time-consuming task of asking customer's complex questions pertaining to their wireless devices for problem diagnosis. This requires CSRs to be experts on smartphones and their applications, and also requires customers to spend an increasing amount of time on the telephone to receive support for their applications. The result is increased support costs, increased call handling times, complex diagnostic processes and overall frustration.

The current method of gathering and obtaining smartphone information required for diagnostics is manual and therefore complex, time consuming and prone to human errors. These methods leave both the subscribers and customer support staff frustrated. In addition, obtaining diagnostic information requires a specialized support staff and contact centers must therefore hire and train specialized staff for specific tasks. For the service provider the customer support process is increasing in complexity. Once device-specific profiles have been obtained from subscriber devices, inconsistencies are identified in the subscriber's configuration data in order to diagnose and resolve problems. The level of expertise required by the CSR to understand numerous smartphone devices and to search for up-to-date configuration data leads to increased costs in training, call-durations, and the overall operational costs. Thus a need currently exists for improvements in providing customer support that is more efficient and economical for the service provider and faster and simpler for the subscriber.

SUMMARY

Accordingly, embodiments of the present invention relate to centralizing customer support information so that multiple customer support representatives can access this information when providing customer support and diagnostics to various subscribers. Additionally the systems and methods described herein contemplate distribution of this information to local storage repositories from a central repository and vice versa.

In particular, one aspect of the present invention relates to a telecommunications network for providing mobile device diagnostic services. According to this aspect, the network includes a respective local rules repository associated with one or more wireless operators providing wireless service, wherein each respective rules repository is configured to store a respective set of local rules. Also included in the network is a centralized rules repository in communication with each of the respective local rules repositories to, thereby, bi-directionally exchange one or more rules, wherein the centralized rules repository is configured to store a set of centralized rules. Additionally, the network includes a respective computer-implemented customer service application associated with the one or more wireless operators and in communication with the respective local rules repository of the associated wireless operator, wherein the customer service application is configured to access the respective local rules repository to provide mobile device diagnostic services.

Another aspect of the present invention relates to a centralized rules repository. In accordance with this aspect of the invention, the rules repository includes a computer-implemented storage configured to store a first set of rules and distribute a second set of rules. Also the rules repository includes a respective first communications link with each of one or more wireless operators, wherein each respective first communications link is configured to receive first incoming rules from a particular wireless operator and to transmit outgoing rules to that particular wireless operator.

Yet another aspect of the present invention relates to a method for providing customer service diagnostics. In accordance with this method, a set of rules are stored at a central repository, and selected ones of these rules are distributed to each of a plurality of wireless operators. In accordance with this method, the wireless operators can also transmit rules to the central repository.

Still another aspect of the present invention relates to a customer service system that includes an analytics engine configured to diagnose a mobile device based on a plurality of rules and a computer-implemented local rules repository in communication with the analytics engine and configured to store the plurality of rules. The system also includes a communications link between the local rules repository and a centralized rules repository, wherein the centralized rules repository includes computer-implemented storage to store additional rules.

Although a smartphone is used in embodiments of the present application, other types of mobile devices can also be used, such as a personal data assistant (PDA), or any type of wireless-networked computer, including a computer embedded in an appliance. For instance, the "smartphone" could in fact comprise a PDA or advanced PDA, a mobile terminal, a camera, a toy, a gaming station, a vending machine, a vehicle, an appliance (such as a microwave oven or a coffee maker), or practically any kind of device capable of using data transmission means for communication. In addition to operation within a wireless environment, aspects of the present invention also provide benefits within other environments where complex device configuration is part of a customer service program. For example, customer service operations of broadband Internet connection providers, e.g., cable TV companies, would also benefit from the availability of a centralized rules repository in accordance with the principles of the present invention.

DRAWINGS

FIGS. 3 through 5 illustrate example screens of a graphical user interface for creating and editing rules.

DESCRIPTION

Figure 1:
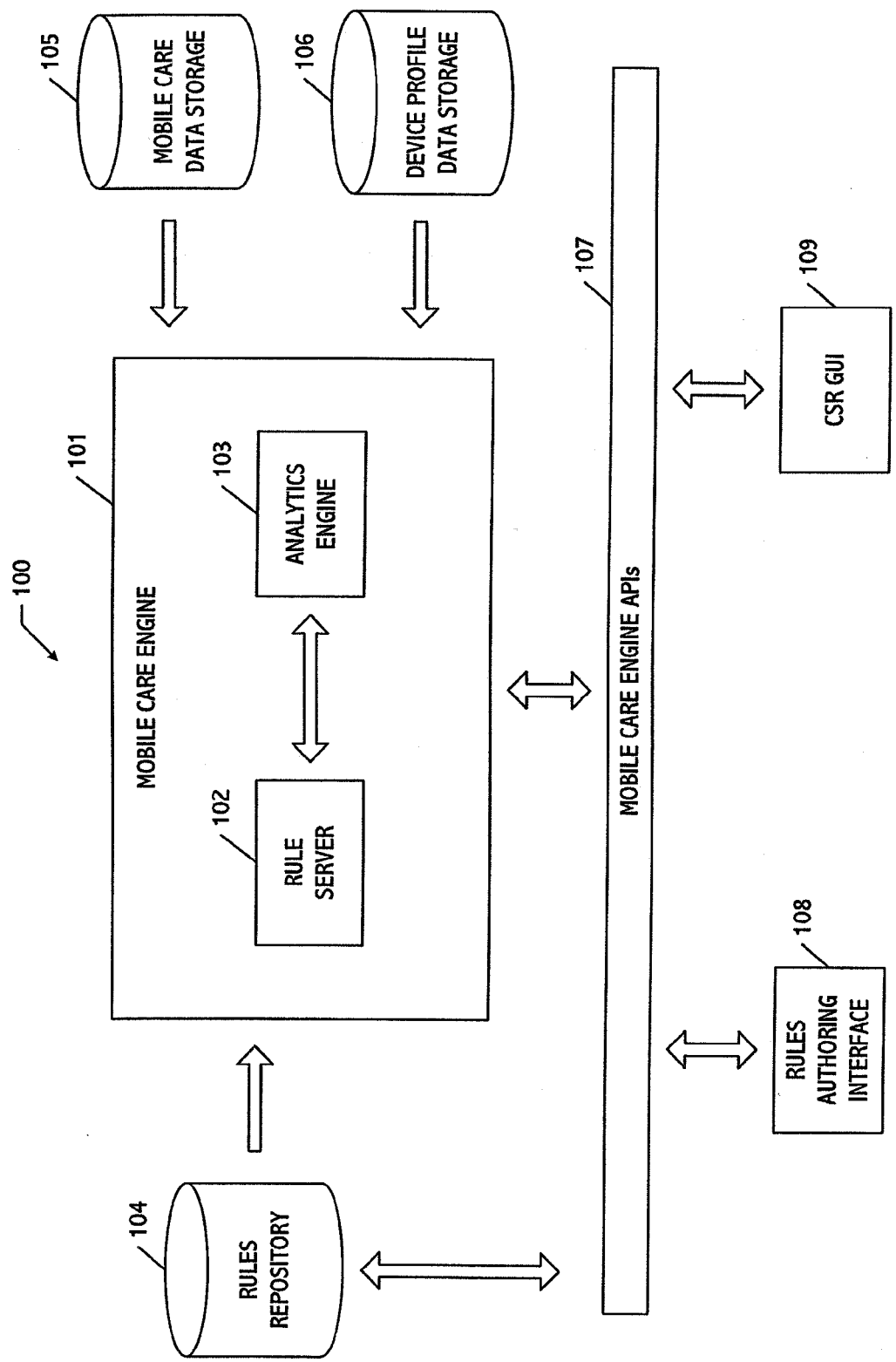
FIG. 1 illustrates an overview of a computer-implemented environment for providing customer care in accordance with embodiments of the present invention.

The diagram in FIG. 1 shows an example high-level architecture overview of the present system 100. This system is described briefly herein as an example environment in which a rules repository may be implemented in accordance with the embodiments of the present invention. One of ordinary skill will recognize that a variety of different computer platforms, software, and peripherals can be used to implement the example system 100.

The system component referred to in this detailed description and the figures as the "Mobile Care Engine" 101 has the logic to apply rules from the Rules Repository 104 and compare device profile data with the "reference values" to identify inaccuracies and inconsistencies. The Mobile Care Engine 101 consists of a Rule Server 102 and Analytics Engine 103.

The Rules Repository 104 contains the domain knowledge coded in the form of rules. The rules may be written in a high-level business language that relates to the domain, storing the rules in the repository 104. Both the Mobile Care Engine 101 and the Rules Authoring Interface 108 employ the Rules Repository 104.

Data Stores 105, 106 include one or more databases used to: (1) store the "Reference Values" (i.e. actual, required values for different fields) (e.g. SMTP Server, Gateway IP addresses, User name, Passwords etc.); and (2) gather, classify and store device profile data that has been collected from various devices over a period of time.

In embodiments, illustrated in FIG. 1, the system 100 includes two data stores: (1) a Mobile Care Data Store 105 to store device "Reference Values" as they should be; and (2) a Device Profile Data Store 106 to store device profiles as "Gathered Values" gathered from individual devices 106.

Preferably, the Data Stores 105, 106 are hosted by a JDBC-compliant database system. Within such an environment, as would be understood by one of ordinary skill, connection from an application server (not shown) may be handled by a connection pool (not shown) where a set number of connections are established by the application server and distributed to threads requiring a database connection. Connection from the Mobile Care Engine 101 may be handled by a dedicated connection for each analytics engine 103 process.

Once device data is collected 106, the Analytics Engine 103 compares the data against the "Reference Values" 105 for validation purposes and highlights the inconsistencies in the profile. For example, if the firmware version collected from the subscriber's device is v1.0 and the Analytics Engine 103 identifies the latest version to be 1.1, it is highlighted in the CSR-GUI 109. This leads to easier resolution of a customer's problem and the issue can further be resolved by uploading the latest version of the firmware to the subscriber's device.

The Mobile Care Engine (MCE) APIs 107 expose the mobile care engine 101 for connecting with external components. As shown in FIG. 1, the Mobile Care Engine 101 exposes an API for connectivity with any external applications either synchronously preferably using Remote Method Invocation (RMI) or asynchronously preferably using Java Message Service (JMS). As an example, both the Rules Authoring Interface 108 and the CSR-GUI 109 use the MCE-APIs 107 for interaction with the internal components.

The Rules Authoring Interface 108 is the mechanism of creating, deleting, and modifying rules that are stored in the Rules Repository 104.

The CSR-GUI 109 is a graphical user interface used by the Customer Service Representative for viewing and analysis of the smartphone's device profile data. The CSR-GUI 109 is preferably a web-based XML-driven dynamic system. It displays the inconsistencies found by the Analytics Engine 103 highlighting the areas of incorrect information.

The CSR-GUI 109 presents the incorrect values as highlighted items thus allowing the CSR to quickly diagnose and resolve problems. This automated process reduces the time spent manually collecting information and therefore reduces the amount of time a subscriber and a CSR spend on a call, thereby promoting reduced customer care expenses.

An example high level description of the process followed by the present system 100 is as follows: (1) The smartphone setting profile is gathered from the device. (2) This profile is put in the Device Profile Data Store 106. (3) Using the rule set this profile is compared with the reference data in the Mobile Care Data Store 105. (4) Rules and analytics are applied to this profile. (5) The inconsistencies in this profile are highlighted. (6) These inconsistencies are preferably presented to the CSR via the CSR-GUI 109.

The Analytics Engine 103 is a component of the Mobile Care Engine 101 that applies business intelligence and rules-based scenario/symptoms to identify common or known problems/inconsistencies with a subscriber's smartphone.

The Analytics Engine 103 may work in conjunction with other application logic to present and identify current and required device information. Such application logic may include the Smartphone Profiler described in more detail in the previously incorporated patent applications. This method of analytics and presentation greatly simplifies the overall customer care process by automatically identifying inconsistencies in a smartphone subscriber's device settings.

Using a flexible rules-based approach, the Analytics Engine 103 can process device-specific data and correlate device profile characteristics with known problems. The Analytics Engine 103 preferably runs on its own process to connect to the main application server (not shown). The independent process enables the Analytics Engine 103 to be upgraded, load-balanced and failed-over transparently and separately from the application engine. The Analytics Engine 103 may use its own rule-compiler to allow for complex rules and filters.

The Analytics Engine 103 compares the latest information pertaining to data applications 105—for example, latest version numbers, device configuration settings and other configuration data required for operation of data services with the ones gathered from the device 106. The inconsistencies are then highlighted and presented in the CSR-GUI 109. Alternatively, or in addition, the inconsistencies may be highlighted on a display on the device itself, or otherwise presented or communicated to the subscriber, for instance, using a web application, phone, or interactive voice response (IVR) system. The transaction may be CSR-assisted or by selfcare.

The above described system 100 is useful by a single operator. However, a service provider or carrier may have operators in many different countries or geographical locations. Additionally, other operators or service providers may also be available in a particular geographical location. Accordingly, embodiments of the present invention contemplate a rules repository arrangement that benefits from the knowledge and information of numerous different operators.

Figure 2:
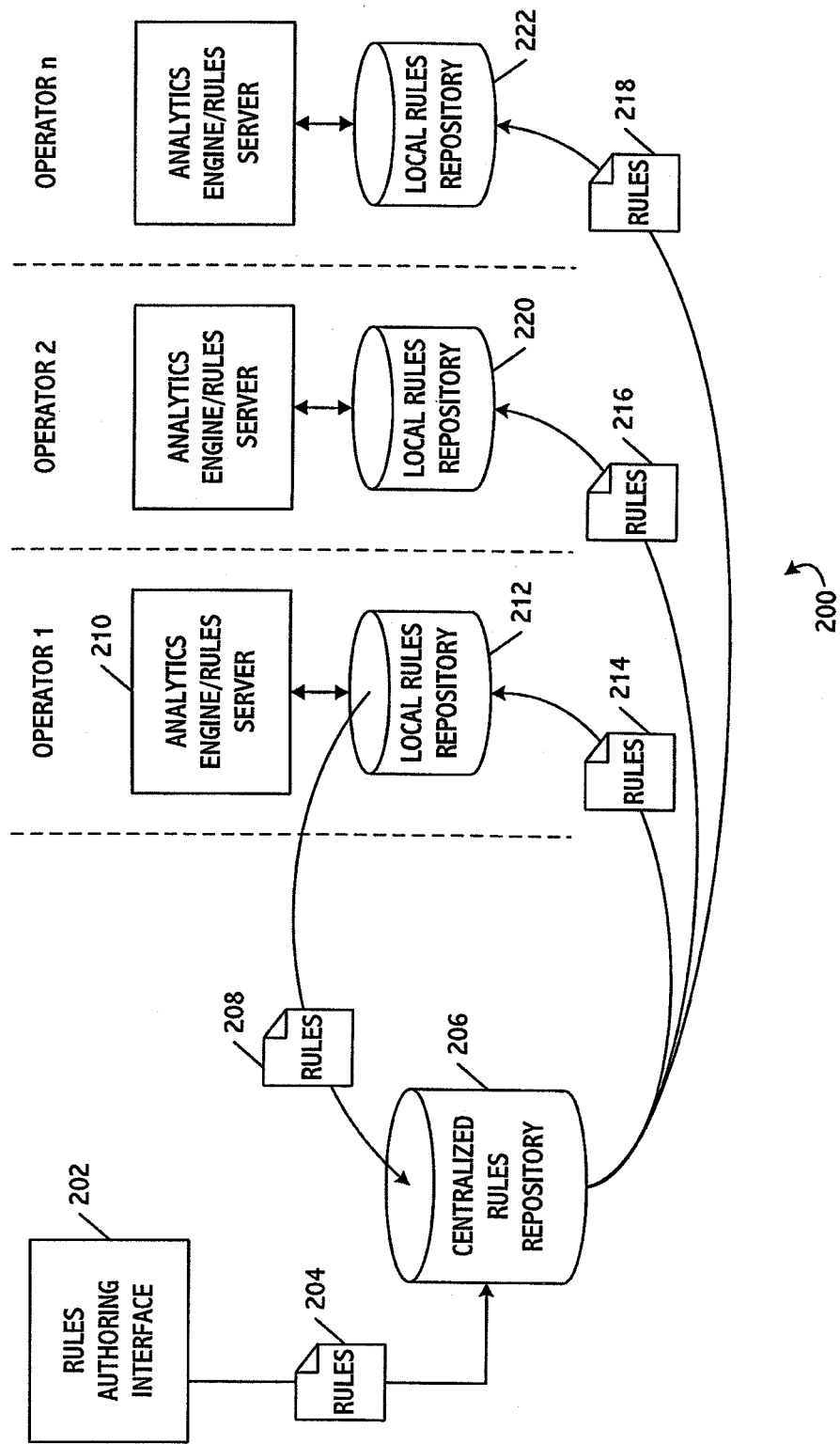
FIG. 2 illustrates a schematic view of a centralized rules repository in communication with multiple operators in accordance with embodiments of the present invention.

In FIG. 2, an example environment 200 is illustrated in which there are n operators each with their own analytics engine/rules server 210 and respective local rules repositories 212, 220, 222. The operation of these components at each operator location is similar to that described with reference to system 100 of FIG. 1. The environment 200 also includes a centralized rules repository 206 that is in communication with the local rules repositories 212, 220, 222. One of ordinary skill will recognize that the communications path between the rules repositories may be implemented in a variety of equivalent ways without departing from the scope of the present invention. The communications link may be dedicated or, alternatively, be created on a periodic basis or "as-needed". For example, connecting the rules repositories via the Internet is expressly contemplated by the present invention.

In operation, there are a variety of different ways that rules may be created or edited. The example environment 200 of FIG. 2 depicts a single rules authoring interface 202 separate from the operators. Embodiments of the present invention expressly contemplate multiple such rule authoring interfaces even though they are not explicitly depicted in FIG. 2. The rules authoring interface 202 may, for example, be used by device manufacturers or software application developers to write rules 204 for the centralized rules repository 206. In this way, the manufacturers and developers, who have detailed information about their products and their updates, can provide technical information to the operators. This reduces the expertise needed on the part of the operator's CSR personnel and eliminates the need for each operator to independently discover a problem that might exist. Additionally, if the rules relates to a problem (e.g. a particular version of an operating system being incompatible with a particular application), then the manufacturers and vendors can also provide solution information such as re-configuration setting details, patches, or software updates that fix the problem. These additional technical resources can be provided to the centralized rules repository 206 and stored there when updates are needed. Alternatively, a URL or other resource identifier may be stored within the centralized rules repository 206 which allows indirect access to the update or solution information. FIG. 2 illustrates that rules 214, 216, 218 are communicated from the centralized rules repository 206 to the respective local rules repositories 212, 220, 222 where they are stored for use by the local CSR personnel.

In addition the rules authoring interface 202, each operator may have its own rules authoring interface as depicted in FIG. 1. Using such an interface, the operator creates its own rules in addition to those received from the centralized rules repository 206. In FIG. 2, rules 208 generated by Operator 1 are shown being communicated to the centralized rules repository 206. Once the rules 208 are received, they can be incorporated into the centralized rules repository 206 and subsequently be included in the distributed rules 214, 216, 218.

FIG. 2 does not explicitly show all the possible communications paths between the different rules repositories. For example, each of the local rules repositories 212, 220, 222 may communicate rules to the centralized rules repository 206. Furthermore, in some instances, rules propagated to one local rules repository (e.g., 220) may be unneeded by another local rules repository e.g., 222) and, therefore, not propagated there.

In embodiments of the present invention the rules are advantageously "checked" or "validated" before being propagated between the different rules repositories. For example, certain rules may only apply to a specific technology (e.g., GSM, CDMA, etc.); other rules may only apply to certain specific devices or certain manufacturers; while other rules may only apply to certain language environments. Thus, for example, if operator 1, uses GSM as its underlying technology, it would be uninterested in rules to pertain to CDMA technology. Similarly, if a rule applied only to Motorola devices and an operator did not support such devices, then it would be uninterested in that particular rule. Conversely, one operator's rule may be specific to their network and, therefore, would not be useful to other operators.

Accordingly, the centralized rules repository 206 may check rules received from different operators against a variety of criteria to ensure they have some usefulness to other operators. If not, then the received rules are not necessarily added to the centralized rules repository 206. As an additional step, received rules may be "quarantined" until their validity is confirmed before being added to the centralized rules repository 206. In the other direction, the rules received from the centralized rules repository 206 at the local locations may be checked to see if they are applicable to the devices and technology used by that particular operator. Those rules that are not of interest can be discarded while those rules that are of interest can be stored.

One of ordinary skill will recognize that such selective rules propagation can be performed in a variety of functionally equivalent ways. For example, the central rules repository 206 may maintain a list of applicable devices and technologies for each operator. The central rules repository 206, then would be responsible for sending only pertinent rules to the appropriate operator. Alternatively, a protocol may be developed in which a request for updated rules received from an operator includes within itself an identification of which types of rules it is interested in. Another alternative is for the rule filtering process to be implemented at each local rules repository while the centralized rules repository 206 sends all new rules to each operator. Various combinations of these and other communications schemes can be used to selectively propagate rules between the repositories 206, 212, 220, 222 without departing from embodiments of the present invention.

Thus, in general, rules can be broadly classified into different categories. Three such categories are described below, merely by way of example. Other rule categorization scheme are contemplated within the scope of the invention that may provide more or less levels of specificity.

These are the type of rules that can be applied across a broad spectrum of situations and their efficacy remains the same. Preferably these would be authored by software application vendors. As an example a known problem with a particular application version having a memory leak across various supported platforms can be implemented as a Global Rule. Preferably, such a rule could be propagated to various wireless operators where these applications may be in use by their respective subscribers.

These are the type of rules that can be applied to only specific devices. Their applicability scope may be narrower than the Global Rules, but since the same device may be used by more than one wireless operator, they are still usable in more than one situation. Preferably, the device specific rules would be authored by device or software manufacturers. As an example a device firmware issue with a specific model of wireless data device having a problem may be implemented as a Device Specific Rule. Such a rule would be propagated to only those wireless operators who support this particular model of device.

These are the type of rules that can only be applied to specific wireless carriers/operators since these may be dependent on certain installed infrastructure. Their applicability scope is quite narrow and they can not be used every where. Preferably, these would be authored by an operator's personnel. As an example a rule to check certain "feature codes" for service activation can be implemented as a Carrier/Operator Specific Rule. Such a rule would only be of use to the wireless carrier/operator for whom it was created, and may not be shared with other operators because of its lack of applicability.

As a result of the environment depicted in FIG. 2 and described above, the centralized rules repository 206 includes a collection of rules that have been created by device manufacturers, software vendors, and various operators' CSR's. Each operator has a local rules repository (e.g., 212, 220, 222) that includes its own self-generated rules but also rules received from the centralized rules repository 206. As a result, the CSR personnel at each operator can benefit from the knowledge, experience, and information available through the centralized rules repository.

Figure 3:
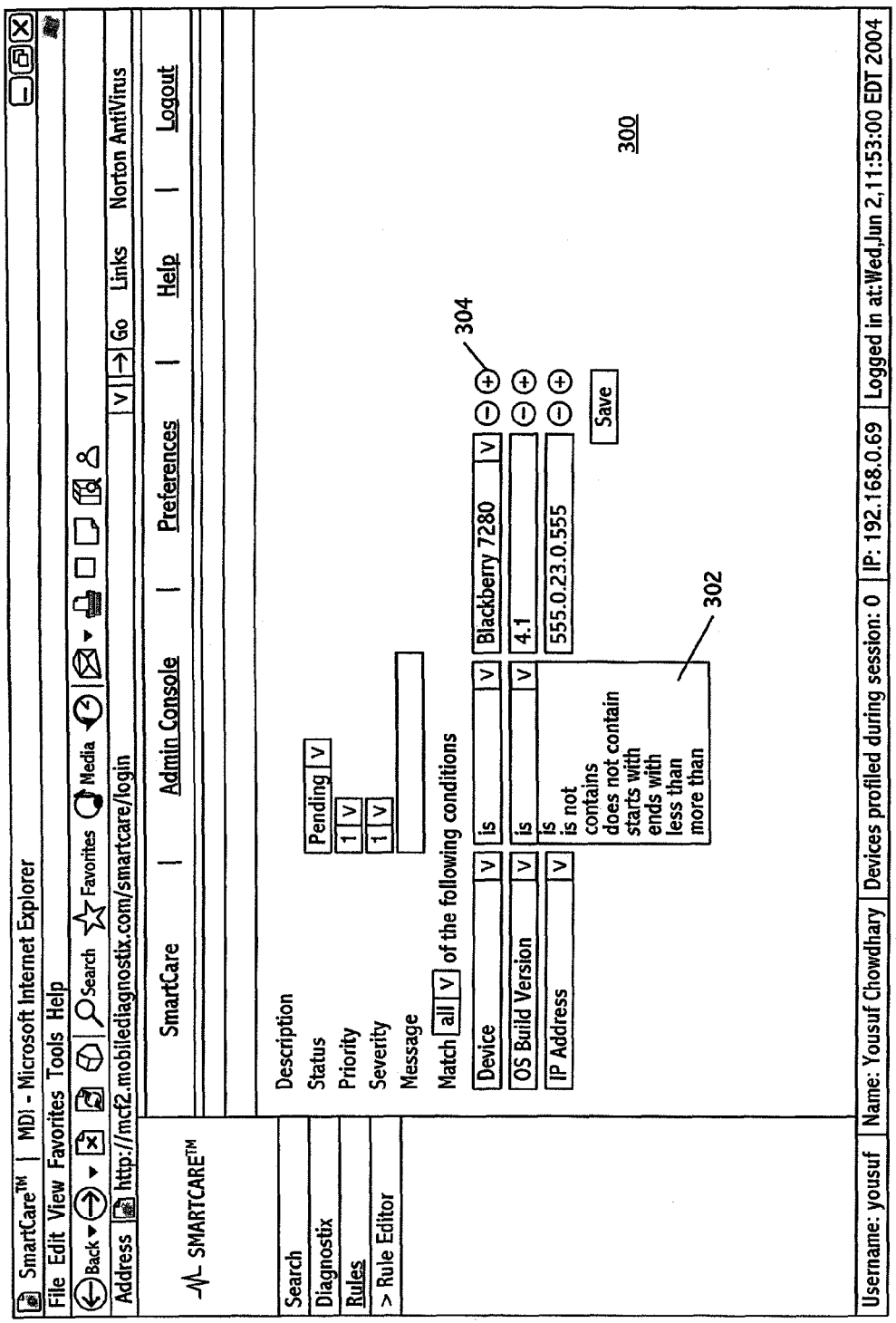
Figure 4:
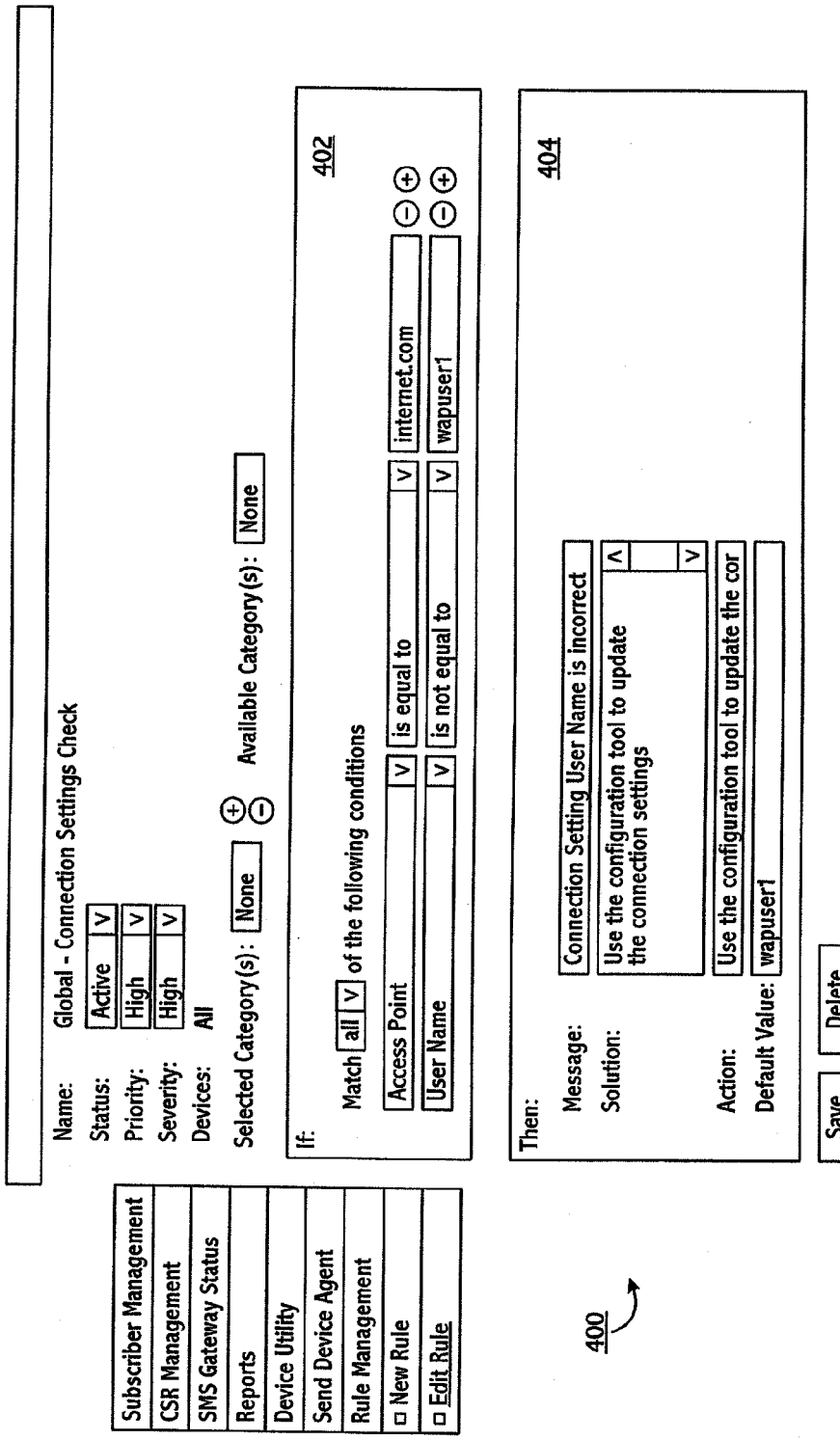
Figure 5:
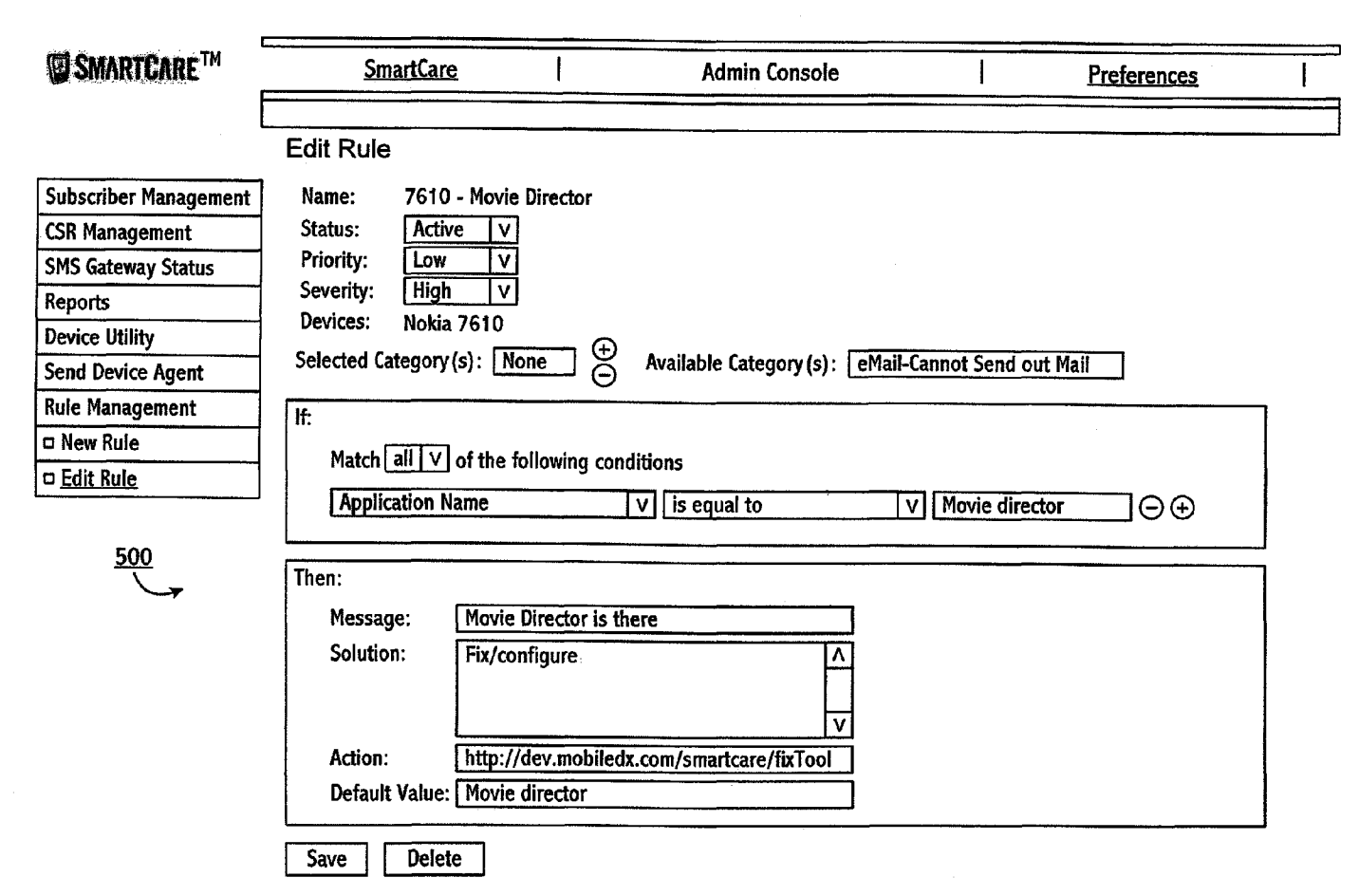

FIGS. 3-5 depict example interface screens for generating a rule using the rules authoring interface. Embodiments of the present invention are not intended to be limited to the specific example rules described herein but, rather, are intended to include any of the numerous different type of rules that can be used to capture business logic useful within a wireless customer care environment.

The example interface screen 300 of FIG. 3 includes a number of different components. For example, during rule creation, information regarding the rules status, priority, severity, and other characteristics can be specified. The screen 300 depicts drop down lists; however, other methods for receiving input can be used as well. In the example rule being created, three conditions are specified that must be satisfied: (1) the device is a "Blackberry 7280", (2) the OS version is "4.1", and (3) the IP address is "555.0.23.0.555". If these conditions are satisfied, then the rule can specify some action or result. The drop down box 302 shows the variety of different conditions that can be specified when defining a rule. One of ordinary skill will appreciate that other types and numbers of conditions can be specified within a rule. For example, the "+" and "−" buttons 304 can be used to add an additional condition within a rule or to delete a condition from the rule.

FIG. 4 depicts another example rule editing interface screen 400. This screen 400 includes an "if" portion 402 of the rule and a "then" portion 404. This example rule is used by the analytics engine to determine if the "Access Point" is "internet.com" and the "User Name" is not "wapuser1". If these conditions are met, then the analytics engine determines the User Name is incorrect and can facilitate its correction. This rule is not device specific but is applied to all devices. The setting within the "if" portion 402 specifies that "all" of the conditions must be met; one alternative would be to specify that "any" of the conditions must be met. The "if" portion 402 can be considered as defining a problem, while the "then" portion 404 defines a solution.

FIG. 5 depicts an interface screen 500 for editing yet another rule. This rule applies to Nokia 7610 devices and checks whether the application "Movie Director" is present. If so, then the rule specifies the URL for locating a solution. The interface screens and example rules just described are intended to show the variety of information that can be specified by a rule and the variety of ways of defining a rule. One of ordinary skill will recognize that other formats, computer languages, and data objects can be used to implement similar rules without departing from the scope of the present invention. Similarly, almost any customer care problem can be defined in terms of a "rule" using the example rules creation interface described herein.

Figure 6:
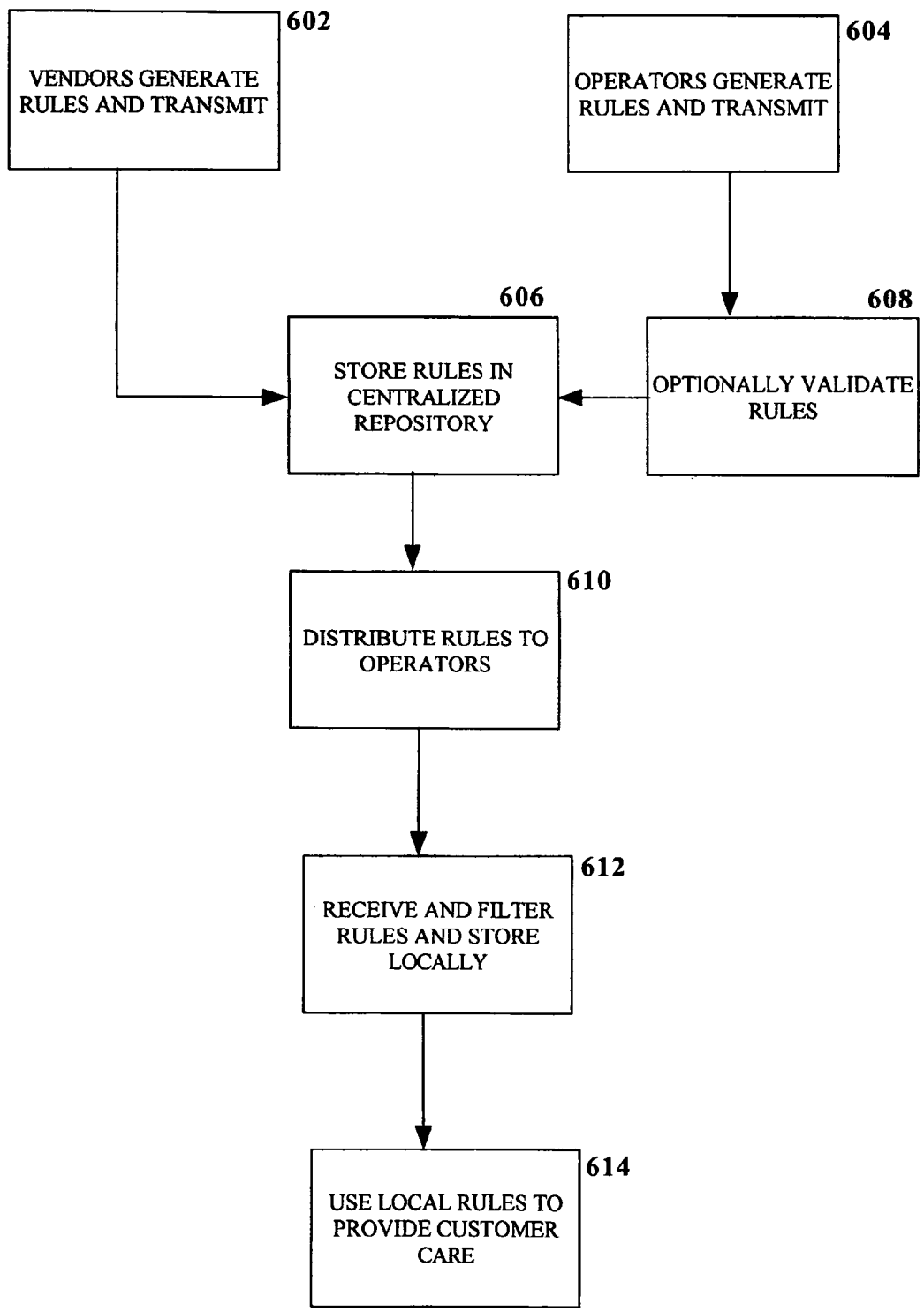
FIG. 6 depicts a flowchart of an example method for centralizing and distributing rules in accordance with the principles of the present invention.

FIG. 6 depicts a flowchart of an example method for sharing and distributing rules within a wireless customer care environment. In step 602, hardware manufacturers and/or software vendors create rules that relate to their products. These rules are then transmitted to a centralized rules repository. This gives the vendors a centralized mechanism to distribute and disseminate rules and bug fixes. Concurrently, in step 604, one or more operators generate rules as well based on their service personnel's knowledge and experiences. These rules are transmitted to the centralized rules repository also. This allows different operators to benefit from one another's knowledge and experience. Because some of these rules may not be applicable to all operators, a validation 608, or filtering, step may optionally be performed. This step can be performed at the operator's system to prevent any non-global rules from being transmitted out or can be performed at the centralized repository to eliminate any non-global rules that are received from an operator.

In step 606, the centralized repository stores all the rules from both the vendors and the operators. A number of different entities may host the centralized rules repository. For example, a wireless operator headquarters (or other administrative location), a software vendor, a hardware manufacturer, or a third party business entity are all entities that could host the centralized rules repository. In addition to the different host entities, the computer platform and technology to host the rules repository can vary as well. The centralized rules repository may resemble the technology of the local rules repositories described earlier or be implemented using functionally similar database systems and organizational structure.

The rules from the centralized rules repository are distributed or replicated to the various operators in step 610. The replication can occur in a "push model" where the centralized rules repository initiates the distribution of rules or in a "pull model" where each local rules repository initiates the transfer. One of ordinary skill will appreciate that a number of various schemes (e.g., timestamps, file flags, etc.) may be implemented to ensure new rules, or updated rules, are replicated in a timely manner to the local rules repositories without wasting bandwidth exchanging old rules. In step 612, the rules are received from the centralized rules repository and, if desired, filtered so that only rules pertinent to that particular operator are retained for storage. Ultimately, in step 614, the local rules repository is used in conjunction with other components of the customer care system to help efficiently diagnose and fix subscribers' problems.

The foregoing is considered as illustrative only of embodiments of the invention. Further, since numerous modifications and changes will readily occur to those skilled in the art, it is not desired to limit the invention to the exact processes, components and applications shown and described, and accordingly, all suitable modifications and equivalents may be resorted to, falling within the scope of the invention and the appended claims and their equivalents. For instance, the "smartphone" could in fact comprise a PDA or advanced PDA, a mobile terminal, a camera, a toy, a gaming station, a vending machine, a vehicle, an appliance (such as a microwave oven or a coffee maker), or practically any kind of device capable of using data transmission means for communication. Thus, by operation of embodiments of the present invention, most wireless customer care scenarios no longer require the same problem to be solved over and over again by a different CSR from ab initio.

By having a mechanism where business logic can be translated into rules that can be reused, shared and modified on the fly, tremendous efficiency can be achieved. This way once a problem has been solved, the next time a different subscriber calls with the same issue the CSR does not have to start from scratch; instead he leverages the already existing solution that his colleague may have come up with earlier. Furthermore, a centralize repository for business rules is created such that different operators can share and leverage the individual solutions that they each came up with as well as a centralized mechanism for software and hardware vendors to distribute solutions. A centralized rules repository also allows easy rule life cycle management and thus improves response time; thereby increasing overall customer satisfaction.

The present application is also related to the following pending U.S. patent applications all of which are incorporated herein by reference in their entirety: U.S. patent application Ser. No. 10/822,092 filed Apr. 9, 2004 entitled, MOBILE CARE FRAMEWORK; U.S. patent application Ser. No. 10/999,606 filed Nov. 29, 2004 entitled, SMARTPHONE PROFILER SYSTEM AND METHOD (based on U.S. Provisional Patent Application No. 60/525,794); and U.S. patent application Ser. No. 10/889,693 filed Jul. 12, 2004 entitled, MOBILE CARE ENGINE SYSTEM.

The foregoing embodiments (e.g. centralized rules repository for smart phone customer care) and advantages are merely examples and are not to be construed as limiting the appended claims. The above teachings can be applied to other apparatuses and methods, as would be appreciated by one of ordinary skill in the art. Many alternatives, modifications, and variations will be apparent to those skilled in the art.

What is claimed is:

1. A telecommunications network for providing mobile device diagnostic services, comprising:
   a respective local rules repository associated with one or more wireless operators providing wireless service, wherein each respective rules repository is configured to store a respective set of local rules;
   a centralized rules repository in communication with each of the respective local rules repositories to, thereby, bi-directionally exchange one or more rules, said centralized rules repository configured to store a set of centralized rules; and
   a respective computer-implemented customer service application associated with the one or more wireless operators and in communication with the respective local rules repository of the associated wireless operator, said customer service application configured to access the respective local rules repository to provide mobile device diagnostic services.

2. The network of claim 1, wherein the set of centralized rules includes one or more rules provided by one or more software developers or device manufacturers.

3. The network of claim 2, wherein the centralized rules repository is configured to transmit to the one or more wireless operators the one or more rules provided by one or more software developers or device manufacturers.

4. The network of claim 1, wherein each of the local rules repositories is configured to transmit a subset of the respective set of local rules, the subset being limited to rules that are applicable to another one of the one or more wireless operators.

5. The network of claim 4, wherein the centralized repository is configured to transmit one or more of the subset of the respective set of local rules to the one or more wireless operators.

6. A centralized rules repository in a telecommunications network for providing mobile device diagnostic services, the repository comprising:
   a computer-implemented storage configured to store a first set of rules and distribute a second set of rules; and
   a respective first communications link with each of one or more wireless operators, wherein each respective first communications link is configured to receive first incoming rules from a particular wireless operator and to transmit outgoing rules to that particular wireless operator.

7. The centralized rules repository of claim 6, further comprising:
   a second communications link configured to receive second incoming rules from one or more device manufacturers or software vendors.

8. The centralized rules repository of claim 6, further comprising:
   an incoming rules checker configured to determine which of the first incoming rules are applicable to more than one wireless operator and to store those rules in the computer-implemented storage.

9. The centralized rules repository of claim 6, further comprising:
   an outgoing rules checker configured to determine which of the outgoing rules to that particular wireless operator are applicable to that particular wireless operator and transmitting those rules so determined.

10. The centralized rules repository of claim 6, further comprising:
    a rules replicator configured to initiate transmitting outgoing rules to a specific wireless operator, wherein said rules replicator is configured to select which of the stored first set of rules to transmit as outgoing rules.

11. A method for providing customer service diagnostics in a wireless telecommunications network, the method comprising the steps of:
    storing at a central rules repository a set of rules;
    distributing a respective subset of the set of rules to each of a plurality of wireless operators;
    receiving incoming rules from a particular wireless operator; and
    transmitting outgoing rules to the particular wireless operator.

12. The method of claim 11, further comprising the steps of:
    receiving first rules from one or more software vendors or device manufacturers; and
    including the first rules in the stored set of rules.

13. The method of claim 11, further comprising the steps of:
    receiving, from one of the plurality or wireless operators, second rules; and
    including the second rules in the stored set of rules.

14. The method of claim 13, further comprising the steps of:
    determining which of the second rules are operator-specific rules,
    discarding the operator-specific rules; and storing any remaining second rules in the stored set of rules.

15. The method of claim 11, wherein the step of distributing further includes the step of:
   selecting the subset of rules to distribute to a particular wireless operator based on characteristics of that particular wireless operator.

16. The method of claim 15, wherein the characteristics include at least one of:
   a technology infrastructure; an identity of one or more supported devices;
   a list of supported languages; and
   an identity of rules previously distributed to the particular wireless operator.

17. The method of claim 11, wherein the step of distributing further includes the steps of:
   determining an updated set of rules, the updated set of rules including those rules in the stored set of rules that have changed since a previous distribution to a particular wireless operator;
   determining an applicable set of rules, the applicable set of rules including those rules in the updated set of rules that are applicable to the particular wireless operator; and
   distributing the applicable set of rules to the particular wireless operator.

18. A customer service system of a wireless operator for providing mobile device diagnostic services, comprising:
   an analytics engine configured to diagnose a mobile device based on a plurality of rules;
   a computer-implemented local rules repository in communication with the analytics engine and configured to store the plurality of rules; and
   a communications link between the local rules repository and a centralized rules repository, wherein the centralized rules repository includes computer-implemented storage to store additional rules, and wherein the communications link is to receive incoming rules from the local rules repository and to transmit outgoing rules to the local rules repository.

19. The customer service system of claim 18, further comprising:
   a rules transmitter configured to use the communications link to transmit a subset of the local rules to the centralized rules repository.

20. The customer service system of claim 19, wherein the subset includes rules that are applicable to another wireless operator.

21. The customer service system of claim 18, further comprising:
   a rules receiver configured to use the communications link to receive an incoming set of rules from the centralized rules repository.

22. The customer service system of claim 21, wherein the rules receive is further configured to:
   determine which of the incoming rules are applicable to the wireless operator and to store those rules in the local rules repository.

23. The customer service system of claim 18, further comprising:
   a rules authoring interface configured to create or edit rules in the local rules repository.

24. The customer service system of claim 18, wherein the additional rules in the centralized rules repository include rules generated by another wireless operator.

25. The customer service system of claim 18, wherein the additional rules in the centralized rules repository include rules generated by a device manufacturer or software vendor.

26. A centralized rules repository used by a plurality of service providers to provide customer support, comprising:
   a computer-implemented storage configured to store a first set of rules and distribute a second set of rules; and
   a respective communications link with each of the plurality of service providers, wherein each respective communications link is configured to receive incoming rules from a local rules repository of a particular service provider and to transmit outgoing rules to the local rules repository of that particular service provider.

27. The centralized rules repository of claim 26, wherein the first set of rules includes rules provided by one or more of the plurality of service providers.

28. The centralized rules repository of claim 26, wherein the first set of rules includes rules applicable to all of the plurality of service providers.

29. The centralized rules repository of claim 26, wherein the outgoing set of rules for a particular service provider is comprised of those rules in the centralized rule repository that are applicable to that particular service provider.

* * * * *